(12) United States Patent
Kartholl et al.

(10) Patent No.: US 12,508,130 B2
(45) Date of Patent: Dec. 30, 2025

(54) GLENOID IMPLANT COMPONENTS AND INSTRUMENTS THEREFOR

(71) Applicant: HOWMEDICA OSTEONICS CORP., Mahwah, NJ (US)

(72) Inventors: Matthew Victor Kartholl, Fort Wayne, IN (US); Charles L. Penninger, Warsaw, IN (US); Austin Wyatt Mutchler, Warsaw, IN (US); Ryan D. Koepke, Fort Wayne, IN (US); Anne Schlamb, Leesburg, IN (US)

(73) Assignee: HOWMEDICA OSTEONICS CORP., Mahwah, NJ (US)

( * ) Notice: Subject to any disclaimer, the term of this patent is extended or adjusted under 35 U.S.C. 154(b) by 141 days.

(21) Appl. No.: 18/274,083

(22) PCT Filed: Jan. 5, 2022

(86) PCT No.: PCT/US2022/011217
§ 371 (c)(1),
(2) Date: Jul. 25, 2023

(87) PCT Pub. No.: WO2022/182426
PCT Pub. Date: Sep. 1, 2022

(65) Prior Publication Data
US 2024/0415662 A1    Dec. 19, 2024

Related U.S. Application Data

(60) Provisional application No. 63/200,288, filed on Feb. 26, 2021.

(51) Int. Cl.
*A61F 2/30* (2006.01)
*A61F 2/40* (2006.01)
*A61F 2/46* (2006.01)

(52) U.S. Cl.
CPC ........ *A61F 2/30749* (2013.01); *A61F 2/4081* (2013.01); *A61F 2/4612* (2013.01); *A61F 2/4637* (2013.01); *A61F 2002/4627* (2013.01)

(58) Field of Classification Search
CPC ................. A61F 2/4612; A61F 2/4609; A61F 2002/4625; A61F 2002/4627; A61F 2002/4628; A61F 2/4637
See application file for complete search history.

(56) References Cited

U.S. PATENT DOCUMENTS 4,550,450 A    11/1985    Kinnett
4,725,280 A    2/1988    Laure
(Continued)

FOREIGN PATENT DOCUMENTS

AU    2012204090 A1    8/2012
DE    10123517 C1    11/2002
(Continued)

OTHER PUBLICATIONS

Extended European Search Report for EP Appl. No. 16161842.6 dated Sep. 30, 2016 in 7 pages.
(Continued)

*Primary Examiner* — Matthew J Lawson
(74) *Attorney, Agent, or Firm* — DUANE MORRIS LLP

(57) ABSTRACT

A glenosphere handling tool, which can be an inserter, is provided that includes an elongate body and a retention portion. The retention portion is disposed at a distal end of the elongate body. The retention portion includes a plurality of wall segments of the elongate body separated from each other by one or more slots. The slot(s) extends proximally from the distal end of the elongate body. The retention portion also includes an enlarged periphery at the distal end of the elongate body. The enlarged periphery comprising a proximally facing edge configured to engage an inner wall
(Continued)

surface of a glenosphere. The retention portion is configured such that when the retention portion is in a free state the proximally facing edge faces and may contact a surface of a glenosphere to retain the glenosphere. The retention portion is configured to be deflected at the distal end of the elongate body such that the enlarged periphery has a reduced profile for separating the handling tool from a glenosphere.

20 Claims, 34 Drawing Sheets

(56) References Cited

U.S. PATENT DOCUMENTS

| | | | |
|---|---|---|---|
| 4,986,833 | A | 1/1991 | Worland |
| 4,990,161 | A | 2/1991 | Kampner |
| 5,032,132 | A | 7/1991 | Matsen, III et al. |
| 5,033,036 | A | 7/1991 | Ohmori et al. |
| 5,080,673 | A | 1/1992 | Burkhead et al. |
| 5,108,446 | A | 4/1992 | Wagner et al. |
| 5,458,637 | A | 10/1995 | Hayes |
| 5,489,309 | A | 2/1996 | Lackey et al. |
| 5,489,311 | A | 2/1996 | Cipolletti |
| 5,531,973 | A | 7/1996 | Sarv |
| 5,662,657 | A | 9/1997 | Carn |
| 5,683,399 | A * | 11/1997 | Jones .................. A61F 2/4609 606/91 |
| 5,702,447 | A | 12/1997 | Walch et al. |
| 5,800,551 | A | 9/1998 | Williamson et al. |
| 5,954,722 | A | 9/1999 | Bono |
| 6,102,951 | A | 8/2000 | Sutter et al. |
| 6,102,954 | A | 8/2000 | Albrektsson et al. |
| 6,139,550 | A | 10/2000 | Michelson |
| 6,171,342 | B1 | 1/2001 | O |
| 6,228,119 | B1 | 5/2001 | Ondrla et al. |
| 6,228,120 | B1 | 5/2001 | Leonard et al. |
| 6,406,495 | B1 | 6/2002 | Schoch |
| 6,508,841 | B2 | 1/2003 | Martin et al. |
| 6,514,287 | B2 | 2/2003 | Ondrla et al. |
| 6,673,115 | B2 | 1/2004 | Resch et al. |
| 6,679,916 | B1 | 1/2004 | Frankle et al. |
| 6,699,289 | B2 | 3/2004 | Iannotti et al. |
| 6,761,740 | B2 | 7/2004 | Tornier |
| 6,783,549 | B1 | 8/2004 | Stone et al. |
| 6,790,234 | B1 | 9/2004 | Frankle et al. |
| 6,860,903 | B2 | 3/2005 | Mears et al. |
| 6,911,047 | B2 | 6/2005 | Rockwood, Jr. et al. |
| 6,942,699 | B2 | 9/2005 | Stone et al. |
| 6,953,478 | B2 | 10/2005 | Bouttens et al. |
| 6,969,406 | B2 | 11/2005 | Tornier |
| 7,160,328 | B2 | 1/2007 | Rockwood, Jr. et al. |
| 7,169,184 | B2 | 1/2007 | Dalla Pria |
| 7,175,663 | B1 | 2/2007 | Stone |
| 7,175,665 | B2 | 2/2007 | German et al. |
| 7,204,854 | B2 | 4/2007 | Guederian et al. |
| 7,316,715 | B2 | 1/2008 | Plaskon |
| 7,431,736 | B2 | 10/2008 | Maroney et al. |
| 7,462,197 | B2 | 12/2008 | Tornier et al. |
| 7,462,199 | B2 | 12/2008 | Justin et al. |
| 7,527,631 | B2 | 5/2009 | Maroney et al. |
| 7,604,665 | B2 | 10/2009 | Iannotti et al. |
| 7,608,109 | B2 | 10/2009 | Dalla Pria |
| 7,611,539 | B2 | 11/2009 | Bouttens et al. |
| 7,621,961 | B2 | 11/2009 | Stone |
| 7,637,928 | B2 | 12/2009 | Fernandez |
| 7,648,530 | B2 | 1/2010 | Habermeyer et al. |
| 7,666,522 | B2 | 2/2010 | Justin et al. |
| 7,753,959 | B2 | 7/2010 | Berelsman et al. |
| 7,766,969 | B2 | 8/2010 | Justin et al. |
| 7,854,768 | B2 | 12/2010 | Wiley et al. |
| 7,883,653 | B2 | 2/2011 | Smith et al. |
| 7,892,287 | B2 | 2/2011 | Deffenbaugh |
| 7,922,769 | B2 | 4/2011 | Deffenbaugh et al. |
| 7,927,335 | B2 | 4/2011 | Deffenbaugh et al. |
| 7,993,408 | B2 | 8/2011 | Meridew et al. |
| 8,007,523 | B2 | 8/2011 | Wagner et al. |
| 8,007,538 | B2 | 8/2011 | Gunther |
| 8,038,719 | B2 | 10/2011 | Gunther |
| 8,048,161 | B2 | 11/2011 | Guederian et al. |
| 8,062,376 | B2 | 11/2011 | Shultz et al. |
| 8,070,820 | B2 | 12/2011 | Winslow et al. |
| 8,080,063 | B2 | 12/2011 | Ferrand et al. |
| 8,092,545 | B2 | 1/2012 | Coon et al. |
| 8,206,453 | B2 | 6/2012 | Cooney, III et al. |
| 8,231,683 | B2 | 7/2012 | Lappin et al. |
| 8,241,365 | B2 | 8/2012 | Williams, Jr. et al. |
| 8,287,600 | B2 | 10/2012 | Angibaud |
| 8,308,807 | B2 | 11/2012 | Seebeck et al. |
| 8,357,201 | B2 | 1/2013 | Mayer et al. |
| 8,361,157 | B2 | 1/2013 | Bouttens et al. |
| 8,425,614 | B2 | 4/2013 | Winslow et al. |
| 8,444,680 | B2 | 5/2013 | Dooney, Jr. et al. |
| 8,449,617 | B1 | 5/2013 | McDaniel et al. |
| 8,454,702 | B2 | 6/2013 | Smits et al. |
| 8,465,548 | B2 | 6/2013 | Long |
| 8,480,750 | B2 | 7/2013 | Long |
| 8,532,806 | B1 | 9/2013 | Masson |
| 8,556,901 | B2 | 10/2013 | Anthony et al. |
| 8,556,902 | B2 | 10/2013 | Ek et al. |
| 8,556,980 | B2 | 10/2013 | Deffenbaugh |
| 8,556,981 | B2 | 10/2013 | Jones et al. |
| 8,591,591 | B2 | 11/2013 | Winslow et al. |
| 8,597,334 | B2 | 12/2013 | Mocanu |
| 8,632,597 | B2 | 1/2014 | Lappin |
| 8,690,951 | B2 | 4/2014 | Baum et al. |
| 8,690,952 | B2 | 4/2014 | Dallmann |
| 8,753,402 | B2 | 6/2014 | Winslow et al. |
| 8,778,028 | B2 | 7/2014 | Gunther et al. |
| 8,790,402 | B2 | 7/2014 | Monaghan et al. |
| 8,840,676 | B2 | 9/2014 | Belew et al. |
| 8,864,834 | B2 | 10/2014 | Boileau et al. |
| 8,870,886 | B2 | 10/2014 | Burgi |
| 8,961,611 | B2 | 2/2015 | Long |
| 9,044,344 | B2 | 6/2015 | Nelson et al. |
| 9,114,017 | B2 | 8/2015 | Lappin |
| 9,233,003 | B2 | 1/2016 | Roche et al. |
| 9,498,334 | B2 | 11/2016 | Lappin et al. |
| 9,498,345 | B2 | 11/2016 | Burkhead, Jr. et al. |
| 9,512,445 | B2 | 12/2016 | Iannotti |
| 9,529,650 | B2 | 12/2016 | Zheng et al. |
| 9,610,166 | B2 | 4/2017 | Gunther et al. |
| 9,629,725 | B2 | 4/2017 | Gargac et al. |
| 9,693,784 | B2 | 7/2017 | Gunther |
| 9,763,682 | B2 | 9/2017 | Bettenga |
| 9,782,208 | B2 | 10/2017 | Martin |
| 9,839,436 | B2 | 12/2017 | Kehres et al. |
| 9,848,990 | B2 | 12/2017 | Winslow et al. |
| 10,034,757 | B2 | 7/2018 | Kovacs et al. |
| 10,064,734 | B2 | 9/2018 | Burkhead, Jr. et al. |
| 10,172,714 | B2 | 1/2019 | Hatzidakis et al. |
| 10,251,755 | B2 | 4/2019 | Boileau et al. |
| 10,342,669 | B2 | 7/2019 | Hopkins |
| 10,357,373 | B2 | 7/2019 | Gargac et al. |
| 10,463,499 | B2 | 11/2019 | Emerick et al. |
| 10,583,012 | B1 | 3/2020 | Longobardi |
| 10,722,374 | B2 | 7/2020 | Hodorek et al. |
| 10,799,952 | B2 | 10/2020 | Kulinsky et al. |
| 10,918,492 | B2 | 2/2021 | Burkhead, Jr. et al. |
| 10,945,862 | B2 | 3/2021 | Roby et al. |
| 2001/0037153 | A1 | 11/2001 | Rockwood, Jr. et al. |
| 2002/0022884 | A1 | 2/2002 | Mansmann |
| 2002/0095214 | A1 | 7/2002 | Hyde, Jr. |
| 2003/0055507 | A1 | 3/2003 | McDevitt et al. |
| 2003/0149485 | A1 | 8/2003 | Torier |
| 2004/0030394 | A1 | 2/2004 | Horber |
| 2004/0059424 | A1 | 3/2004 | Guederian et al. |
| 2004/0106928 | A1 | 6/2004 | Ek |
| 2004/0122519 | A1 | 6/2004 | Wiley et al. |
| 2004/0220673 | A1 | 11/2004 | Pria |
| 2004/0220674 | A1 | 11/2004 | Pria |
| 2004/0225367 | A1 | 11/2004 | Glien et al. |
| 2005/0049709 | A1 | 3/2005 | Tornier |
| 2005/0060039 | A1 | 3/2005 | Cyprien |

(56) References Cited

U.S. PATENT DOCUMENTS

| | | |
|---|---|---|
| 2005/0085915 A1* | 4/2005 | Steinberg ................ A61F 2/32 623/23.72 |
| 2005/0143831 A1 | 6/2005 | Justin et al. |
| 2005/0149044 A1 | 7/2005 | Justin et al. |
| 2005/0256583 A1 | 11/2005 | Bouttens et al. |
| 2005/0261775 A1 | 11/2005 | Baum et al. |
| 2005/0278030 A1 | 12/2005 | Tornier et al. |
| 2006/0069443 A1 | 3/2006 | Deffenbaugh et al. |
| 2006/0069444 A1 | 3/2006 | Deffenbaugh |
| 2006/0069445 A1 | 3/2006 | Ondrla et al. |
| 2006/0074353 A1 | 4/2006 | Deffenbaugh et al. |
| 2006/0074430 A1 | 4/2006 | Deffenbaugh et al. |
| 2006/0100714 A1 | 5/2006 | Ensign |
| 2006/0111787 A1 | 5/2006 | Bailie et al. |
| 2006/0122705 A1 | 6/2006 | Morgan |
| 2006/0142865 A1 | 6/2006 | Hyde, Jr. |
| 2006/0200248 A1 | 9/2006 | Beguin et al. |
| 2006/0200249 A1 | 9/2006 | Beguin et al. |
| 2007/0016304 A1 | 1/2007 | Chudik |
| 2007/0055380 A1 | 3/2007 | Berelsman et al. |
| 2007/0100458 A1 | 5/2007 | Dalla Pria |
| 2007/0142917 A1 | 6/2007 | Roche et al. |
| 2007/0142921 A1 | 6/2007 | Lewis et al. |
| 2007/0142922 A1 | 6/2007 | Lewis et al. |
| 2007/0156246 A1 | 7/2007 | Meswania et al. |
| 2007/0179624 A1 | 8/2007 | Stone et al. |
| 2007/0219638 A1 | 9/2007 | Jones et al. |
| 2007/0244563 A1 | 10/2007 | Roche et al. |
| 2007/0244564 A1 | 10/2007 | Ferrand et al. |
| 2007/0260321 A1 | 11/2007 | Stchur |
| 2008/0183297 A1 | 7/2008 | Boileau et al. |
| 2008/0195115 A1* | 8/2008 | Oren .................... A61F 2/4618 81/488 |
| 2008/0255568 A1 | 10/2008 | Tornier et al. |
| 2008/0269906 A1 | 10/2008 | Iannotti et al. |
| 2008/0294268 A1 | 11/2008 | Baum et al. |
| 2008/0306601 A1 | 12/2008 | Dreyfuss |
| 2009/0112219 A1* | 4/2009 | Daniels ................ A61F 2/4607 606/99 |
| 2009/0125113 A1 | 5/2009 | Guederian et al. |
| 2009/0149961 A1 | 6/2009 | Dallmann |
| 2009/0164021 A1 | 6/2009 | Dallmann |
| 2009/0204225 A1 | 8/2009 | Meridew et al. |
| 2009/0216332 A1 | 8/2009 | Splieth et al. |
| 2009/0281630 A1 | 11/2009 | Delince et al. |
| 2009/0281632 A1 | 11/2009 | Naidu |
| 2009/0292364 A1 | 11/2009 | Linares |
| 2010/0016975 A1 | 1/2010 | Iannotti et al. |
| 2010/0023068 A1 | 1/2010 | Bouttens et al. |
| 2010/0049327 A1 | 2/2010 | Isch et al. |
| 2010/0087927 A1 | 4/2010 | Roche et al. |
| 2010/0161066 A1 | 6/2010 | Iannotti et al. |
| 2010/0217399 A1 | 8/2010 | Groh |
| 2010/0228352 A1 | 9/2010 | Courtney, Jr. et al. |
| 2010/0234959 A1 | 9/2010 | Roche et al. |
| 2010/0274359 A1 | 10/2010 | Brunnarius et al. |
| 2010/0291401 A1 | 11/2010 | Medina et al. |
| 2010/0331990 A1 | 12/2010 | Mroczkowski et al. |
| 2011/0029089 A1 | 2/2011 | Giuliani et al. |
| 2011/0035013 A1 | 2/2011 | Winslow et al. |
| 2011/0106266 A1 | 5/2011 | Schwyzer et al. |
| 2011/0118846 A1 | 5/2011 | Katrana et al. |
| 2011/0144758 A1 | 6/2011 | Deffenbaugh |
| 2011/0144760 A1 | 6/2011 | Wong et al. |
| 2011/0152869 A1 | 6/2011 | Ek et al. |
| 2011/0190899 A1 | 8/2011 | Pierce et al. |
| 2011/0224673 A1 | 9/2011 | Smith |
| 2011/0276144 A1 | 11/2011 | Wirth et al. |
| 2011/0282393 A1 | 11/2011 | Gerlach et al. |
| 2012/0004733 A1 | 1/2012 | Hodorek et al. |
| 2012/0029647 A1 | 2/2012 | Winslow et al. |
| 2012/0059383 A1 | 3/2012 | Murphy |
| 2012/0078258 A1 | 3/2012 | Lo et al. |
| 2012/0109320 A1 | 5/2012 | Walch et al. |
| 2012/0123419 A1 | 5/2012 | Purdy et al. |
| 2012/0130498 A1 | 5/2012 | Long |
| 2012/0165954 A1 | 6/2012 | Nimal |
| 2012/0191201 A1 | 7/2012 | Smits et al. |
| 2012/0209392 A1 | 8/2012 | Angibaud et al. |
| 2012/0221111 A1 | 8/2012 | Burkhead, Jr. et al. |
| 2012/0221112 A1 | 8/2012 | Lappin |
| 2012/0232670 A1 | 9/2012 | Bojarski et al. |
| 2012/0239051 A1 | 9/2012 | de Wilde et al. |
| 2012/0239156 A1 | 9/2012 | de Wilde et al. |
| 2012/0253467 A1 | 10/2012 | Frankle |
| 2012/0277880 A1 | 11/2012 | Winslow et al. |
| 2013/0018483 A1 | 1/2013 | Li et al. |
| 2013/0053968 A1 | 2/2013 | Nardini et al. |
| 2013/0066433 A1 | 3/2013 | Veronesi et al. |
| 2013/0096631 A1 | 4/2013 | Leung et al. |
| 2013/0110116 A1 | 5/2013 | Kehres et al. |
| 2013/0110470 A1 | 5/2013 | Vanasse et al. |
| 2013/0144393 A1 | 6/2013 | Mutchler et al. |
| 2013/0150972 A1 | 6/2013 | Iannotti et al. |
| 2013/0150973 A1 | 6/2013 | Splieth et al. |
| 2013/0150975 A1 | 6/2013 | Iannotti et al. |
| 2013/0226186 A1 | 8/2013 | Burgi |
| 2013/0226309 A1 | 8/2013 | Daigo et al. |
| 2013/0231754 A1 | 9/2013 | Daigo et al. |
| 2013/0253656 A1 | 9/2013 | Long |
| 2013/0261629 A1* | 10/2013 | Anthony .......... A61B 17/32053 606/80 |
| 2013/0261751 A1 | 10/2013 | Lappin |
| 2013/0261752 A1 | 10/2013 | Lappin et al. |
| 2013/0264749 A1 | 10/2013 | Jones et al. |
| 2013/0282135 A1 | 10/2013 | Sun et al. |
| 2013/0331849 A1* | 12/2013 | Splieth ................ A61F 2/4612 606/99 |
| 2013/0338675 A1* | 12/2013 | Nelson ................ A61F 2/4612 606/104 |
| 2014/0005641 A1* | 1/2014 | Slade .................... A61F 2/4609 606/1 |
| 2014/0005789 A1 | 1/2014 | Chavarria et al. |
| 2014/0012266 A1 | 1/2014 | Bonin, Jr. et al. |
| 2014/0018927 A1 | 1/2014 | de Wilde et al. |
| 2014/0025173 A1 | 1/2014 | Cardon et al. |
| 2014/0142711 A1 | 5/2014 | Maroney et al. |
| 2014/0163564 A1 | 6/2014 | Bollinger |
| 2014/0188231 A1 | 7/2014 | Poncet et al. |
| 2014/0194995 A1 | 7/2014 | Koka |
| 2014/0243986 A1 | 8/2014 | Frankle |
| 2014/0257499 A1 | 9/2014 | Winslow et al. |
| 2014/0277180 A1 | 9/2014 | Paolino et al. |
| 2014/0277517 A1 | 9/2014 | Winslow |
| 2014/0277518 A1 | 9/2014 | Iannotti |
| 2014/0277520 A1 | 9/2014 | Chavarria et al. |
| 2014/0316416 A1 | 10/2014 | Liu et al. |
| 2014/0371863 A1 | 12/2014 | Vanasse et al. |
| 2015/0059383 A1 | 3/2015 | Sakamoto et al. |
| 2015/0073424 A1 | 3/2015 | Couture et al. |
| 2015/0094819 A1 | 4/2015 | Iannotti et al. |
| 2015/0142122 A1 | 5/2015 | Bickley et al. |
| 2015/0150688 A1 | 6/2015 | Vanasse et al. |
| 2015/0265292 A1 | 9/2015 | Olson |
| 2015/0265411 A1* | 9/2015 | Deransart .............. A61B 17/56 623/19.14 |
| 2015/0272741 A1 | 10/2015 | Taylor et al. |
| 2015/0305877 A1 | 10/2015 | Gargac et al. |
| 2016/0045323 A1 | 2/2016 | Kovacs et al. |
| 2016/0051368 A1 | 2/2016 | Wiley et al. |
| 2016/0151164 A1 | 6/2016 | Taylor et al. |
| 2016/0166392 A1 | 6/2016 | Vanasse et al. |
| 2016/0199074 A1 | 7/2016 | Winslow et al. |
| 2016/0206436 A1 | 7/2016 | Chavarria et al. |
| 2016/0228262 A1* | 8/2016 | Bailey ...................... A61F 2/34 |
| 2016/0256222 A1 | 9/2016 | Walch |
| 2016/0256287 A1 | 9/2016 | Isch |
| 2016/0270922 A1 | 9/2016 | Pressacco et al. |
| 2016/0287266 A1 | 10/2016 | Sikora et al. |
| 2016/0287400 A1 | 10/2016 | Muir et al. |
| 2016/0287401 A1 | 10/2016 | Muir et al. |
| 2016/0310285 A1 | 10/2016 | Kovacs et al. |
| 2016/0324649 A1 | 11/2016 | Hodorek et al. |
| 2016/0354209 A1 | 12/2016 | Van Kampen et al. |

(56) References Cited

U.S. PATENT DOCUMENTS

| | | |
|---|---|---|
| 2016/0367375 A1 | 12/2016 | Boulris |
| 2017/0027709 A1 | 2/2017 | Winslow et al. |
| 2017/0042687 A1 | 2/2017 | Boileau et al. |
| 2017/0042690 A1 | 2/2017 | Burkhead, Jr. et al. |
| 2017/0049574 A1 | 2/2017 | Hopkins |
| 2017/0172764 A1 | 6/2017 | Muir et al. |
| 2017/0202674 A1 | 7/2017 | Gunther et al. |
| 2017/0273795 A1 | 9/2017 | Neichel et al. |
| 2017/0273801 A1 | 9/2017 | Hodorek |
| 2017/0273806 A1 | 9/2017 | Cardon et al. |
| 2017/0319348 A1 | 11/2017 | Goldberg |
| 2017/0367836 A1 | 12/2017 | Cardon et al. |
| 2018/0014941 A1 | 1/2018 | Frankle et al. |
| 2018/0064537 A1 | 3/2018 | Pressacco et al. |
| 2018/0078377 A1 | 3/2018 | Gargac et al. |
| 2018/0085226 A1 | 3/2018 | Baumgarten |
| 2018/0092747 A1 | 4/2018 | Hopkins |
| 2018/0161169 A1 | 6/2018 | Cardon et al. |
| 2018/0243102 A1 | 8/2018 | Burkhead, Jr. et al. |
| 2018/0303618 A1 | 10/2018 | Kovacs et al. |
| 2018/0368982 A1 | 12/2018 | Ball |
| 2019/0015116 A1 | 1/2019 | Gargac et al. |
| 2019/0015117 A1 | 1/2019 | Neichel et al. |
| 2019/0015221 A1 | 1/2019 | Neichel et al. |
| 2019/0076261 A1 | 3/2019 | Mutchler et al. |
| 2019/0336293 A1 | 11/2019 | Kehres |
| 2019/0388241 A1* | 12/2019 | Nelson ............ A61F 2/4657 |
| 2020/0030108 A1 | 1/2020 | Orphanos et al. |
| 2020/0179126 A1 | 6/2020 | Courtney, Jr et al. |
| 2020/0188121 A1 | 6/2020 | Boux De Casson et al. |
| 2020/0188124 A1 | 6/2020 | Hodorek et al. |
| 2020/0188125 A1 | 6/2020 | Hodorek et al. |
| 2020/0237519 A1 | 7/2020 | Ball et al. |
| 2020/0289180 A1 | 9/2020 | Martin et al. |
| 2020/0289275 A1 | 9/2020 | Miniaci et al. |
| 2020/0289282 A1 | 9/2020 | Lefebvre et al. |
| 2020/0315662 A1 | 10/2020 | Adam et al. |
| 2020/0368031 A1 | 11/2020 | Hodorek et al. |
| 2020/0405491 A1 | 12/2020 | Cleveland et al. |
| 2021/0030552 A1 | 2/2021 | Terrill |
| 2021/0030553 A1 | 2/2021 | Terrill |
| 2021/0045895 A1* | 2/2021 | Sapio ............ A61F 2/4003 |
| 2021/0298910 A1 | 9/2021 | Gargac et al. |
| 2021/0307911 A1 | 10/2021 | Metcalfe et al. |
| 2021/0338456 A1 | 11/2021 | Wolfe et al. |
| 2021/0369465 A1 | 12/2021 | Simoes et al. |
| 2022/0110757 A1 | 4/2022 | Paterson |
| 2022/0142789 A1 | 5/2022 | Axelson, Jr. et al. |
| 2022/0151793 A1 | 5/2022 | Deransart et al. |
| 2022/0151794 A1 | 5/2022 | Fattori et al. |
| 2022/0151795 A1 | 5/2022 | Running et al. |
| 2022/0175543 A1 | 6/2022 | Ball |
| 2022/0202580 A1 | 6/2022 | Wilkins et al. |
| 2022/0202583 A1 | 6/2022 | Axelson, Jr. et al. |
| 2022/0241077 A1 | 8/2022 | Hodorek et al. |
| 2022/0265434 A1 | 8/2022 | Hodorek et al. |
| 2022/0280306 A1 | 9/2022 | Metcalfe et al. |
| 2022/0296381 A1 | 9/2022 | Ek et al. |
| 2022/0313440 A1 | 10/2022 | Metcalfe et al. |
| 2022/0395376 A1 | 12/2022 | Poon et al. |
| 2023/0000636 A1 | 1/2023 | Dalla Pria et al. |
| 2023/0114073 A1 | 4/2023 | Perego |
| 2023/0172730 A1* | 6/2023 | Kartholl ............ A61F 2/4081 606/99 |
| 2023/0285154 A1 | 9/2023 | Picha et al. |
| 2024/0225858 A1* | 7/2024 | DeLeon ............ A61B 17/8872 |

FOREIGN PATENT DOCUMENTS

| | | |
|---|---|---|
| EP | 0581667 A1 | 2/1994 |
| EP | 1013246 | 6/2000 |
| EP | 0776636 B1 | 9/2000 |
| EP | 1323395 | 7/2003 |
| EP | 1013246 B1 | 10/2003 |
| EP | 1064890 B1 | 9/2005 |
| EP | 1488764 B1 | 12/2006 |
| EP | 1762201 A1 | 3/2007 |
| EP | 1639949 B1 | 8/2007 |
| EP | 1639966 B1 | 9/2007 |
| EP | 1639967 B1 | 7/2008 |
| EP | 1515758 B1 | 3/2009 |
| EP | 1776935 B1 | 8/2009 |
| EP | 2201912 A1 | 6/2010 |
| EP | 1927328 | 1/2011 |
| EP | 1927328 B1 | 1/2011 |
| EP | 1902689 B1 | 11/2011 |
| EP | 2564814 A1 | 3/2013 |
| EP | 1996125 B1 | 5/2013 |
| EP | 2335655 B1 | 7/2013 |
| EP | 1951161 B1 | 4/2014 |
| EP | 1973498 B1 | 4/2014 |
| EP | 2481376 B1 | 4/2014 |
| EP | 2057970 B1 | 1/2016 |
| EP | 2601912 B1 | 7/2016 |
| EP | 1323395 B1 | 8/2016 |
| EP | 2962650 | 8/2017 |
| EP | 3291768 B1 | 11/2019 |
| EP | 3412252 B1 | 2/2020 |
| EP | 3679900 A1 | 7/2020 |
| EP | 3756625 A1 | 12/2020 |
| FR | 2567019 A1 | 1/1986 |
| FR | 2739151 B1 | 11/1997 |
| FR | 2776506 B1 | 8/2000 |
| FR | 2790662 B1 | 6/2001 |
| FR | 2825263 A1 | 12/2002 |
| FR | 2821545 B1 | 8/2003 |
| FR | 2955248 B1 | 3/2012 |
| FR | 2971144 A1 | 8/2012 |
| FR | 2977791 B1 | 7/2014 |
| GB | 2297257 A | 7/1996 |
| JP | 2006095300 A | 4/2006 |
| JP | 2015516835 A | 6/2015 |
| JP | 2015532863 A | 11/2015 |
| JP | 2018516634 | 6/2018 |
| WO | 9529650 | 11/1995 |
| WO | 2001054561 A2 | 8/2001 |
| WO | 2011044879 A1 | 4/2011 |
| WO | 2011073169 A1 | 6/2011 |
| WO | 2011150180 A2 | 12/2011 |
| WO | 2013064569 A1 | 5/2013 |
| WO | 2015051476 A1 | 4/2015 |
| WO | 2015068035 A1 | 5/2015 |
| WO | 2015103090 A1 | 7/2015 |
| WO | 2015130006 A1 | 9/2015 |
| WO | 2016025712 A2 | 2/2016 |
| WO | 2017007565 A2 | 1/2017 |
| WO | 2019014278 A1 | 1/2019 |
| WO | 2019079104 A2 | 4/2019 |
| WO | 2020033911 A1 | 2/2020 |
| WO | 2020154611 A1 | 7/2020 |
| WO | 2020219962 A1 | 10/2020 |
| WO | 2020231657 A1 | 11/2020 |
| WO | 2021030146 A1 | 2/2021 |
| WO | 2021178418 A1 | 9/2021 |
| WO | 2021216405 A3 | 12/2021 |
| WO | 2022076504 A1 | 4/2022 |
| WO | 2022147376 A1 | 7/2022 |
| WO | 2022261508 A1 | 12/2022 |
| WO | 2023018485 A1 | 2/2023 |

OTHER PUBLICATIONS

EP Search Report and Written Opinion issued in European Patent Application No. 12153346.7, dated Mar. 8, 2012, in 6 pages.

Extended European Search Report for EP Appl. No. 19209370.6, dated May 12, 2020 in 9 pages.

International Search Report and Written Opinion issued in PCT/US2022/016106, May 11, 2022, 12 pages.

French Search Report and Written Opinion issued in Application. No. FR1150994, mailed May 27, 2011, in 7 pages.

International Search Report and Written Opinion issued in PCT/EP2010/069585, mailed Apr. 11, 2011, 9 pages.

(56) References Cited

OTHER PUBLICATIONS

International Search Report and Written Opinion issued in PCT Application No. PCT/US2014/072442, dated Mar. 11, 2015, in 13 pages.
International Search Report and Written Opinion issued in PCT Application No. PCT/US2016/036500, dated Mar. 22, 2017, in 18 pages.
International Search Report and Written Opinion issued in PCT Application No. PCT/US2018/055490, dated Jun. 11, 2019, in 21 pages.
International Search Report and Written Opinion issued in PCT Application No. PCT/US2020/031134, dated Sep. 30, 2020, in 15 pages.
International Search Report and Written Opinion issued in PCT Application No. PCT/US2020/045211, dated Dec. 17, 2020, in 18 pages.
International Search Report and Written Opinion issued in PCT Application No. PCT/US2022/034245, dated Sep. 23, 2022.
Anatomical ShoulderTM Inverse/Reverse System Surgical Technique, Product Brochure, Zimmer, Inc., published 2006, in 32 pages.
Arthrex, "Arthrex Releases Univers ReversTM Shoulder Arthroplasty System in the United States—First Surgery Successfully Performed in Chillicothe, OH", Jun. 18, 2013.
Biomet, "Comprehensive® Reverse Shoulder System", 2013.
Boileau et al., "Cemented polyethylene versus uncemented metal-backed glenoid components in total shoulder arthroplasty: A prospective, double-blind, randomized study," Journal of Shoulder and Elbow Surgery, Jul./Aug. 2002, vol. 11, Issue 4, pp. 351-359.
Boileau et al., "Metal-backed glenoid implant with polyethylene insert is not a viable long-term therapeutic option," Journal of Shoulder and Elbow Surgery, Feb. 2015, pp. 1-10.
Cementless Fixation Using a Polyethyene Oseo-Integration Peg as Used on the Freeman-Samuelson Knee brochure, produced by Finsbury Instruments Limited London in conjunction with Adrian Tuke Limited, 1982.
Castagna et al., "Mid-term results of a metal-backed glenoid component in total shoulder replacement," The Journal of Bone and Joint Surgery, Oct. 2010, vol. 92-B, No. 10, pp. 1410-1415.
Clement et al., "An uncemented metal-backed glenoid component in total shoulder arthroplasty for osteoarthritis: factors affecting survival and outcome," The Japanese Orthopaedic Association, published online Sep. 26, 2012, vol. 18, pp. 22-28.
DJO Surgical, Reverse® shoulder prosthesis Surgical Technique, Feb. 2008.
EclipseTM Stemless Shoulder Prosthesis, Surgical Technique Guide, Anthrex GmbH, 2014, in 12 pages.
Epoca Shoulder Arthroplasty System, Synthes, Inc., Apr. 2008, in 4 pages.
Epoca Shoulder Arthroplasty System—Stem and Glenoid Technique Guide, Synthes, Inc., Apr. 2008, in 56 pages.
Innovative Design Orthopaedics, "Verso® Shoulder Surgical Technique", 2013.
Kany et al., "A convertible shoulder system: is it useful in total shoulder arthroplasty revisions?" International Orthopaedics, published online Oct. 16, 2014, vol. 39, pp. 299-304.
Katz et al., "New design of a cementless glenoid component in unconstrained shoulder arthroplasty: a prospective medium-term analysis of 143 cases," published online Oct. 27, 2012, vol. 23, pp. 27-34.
Montoya et al., "Midterm results of a total shoulder prosthesis fixed with a cementless glenoid component," Journal of Shoulder and Elbow Surgery, May 2013, vol. 22, Issue 5, pp. 628-635.
SMR Axioma® TT Metal Back Surgical Technique, Product Brochure, Lima Corporate, dated Sep. 2013, in 48 pages.
Taunton et al., "Total Shoulder Arthroplasty with a Metal-Backed, Bone-Ingrowth Glenoid Component," The Journal of Bone and Joint Surgery, Oct. 2008, vol. 90-A, Issue 10, pp. 2180-2188.
Teissier et al., "The TESS reverse shoulder arthroplasty without a stem in the treatment of cuff-deficient shoulder conditions: clinical and radiographic results," Journal of Shoulder and Elbow Surgery, Jan. 2015, vol. 24, Issue 1, pp. 45-51.
The Anatomical ShoulderTM: A true system approach, Product Brochure, Zimmer UK Ltd, printed 2006, in 6 pages.
Univers ReversTM Total Shoulder System, Surgical Technique Guide, Anthrex Inc., Version D, revised Jul. 2, 2015, in 28 pages.
International Search Report and Written Opinion issued in connection with PCT/US2021/071653, Feb. 7, 2022, 9 pages.
International Search Report and Written Opinion issued in connection with PCT/US2022/016106, May 11, 2022, 12 pages.
Maksimkin et al., "Ultra-High Molecular Weight Polyethylene/ Titanium Hybrid Implant for Bone-Defect Replacement", Jul. 13, 2020, 12 pages.
Extended European Search Report issued in connection with European Patent Application No. 24191670.9, Feb. 20, 2025, 13 pages.
Communication Under Rule 164(2)(b) issued in connection with European Patent Application No. 20758408.7, Feb. 28, 2025, 9 pages.
International Search Report and Written Opinion issued in connection with International Patent Application No. PCT/ US2024/ 050431, Feb. 11, 2025, 7 pages.
International Search Report issued in connection with International Patent Application No. PCT/US2021/071653, Feb. 7, 2022, 10 pages.
First Office Action issued in connection with Japanese Patent Application No. 2023-532755, Jul. 9, 2024, 4 pages.
Examination Report issued in connection with Australian Patent Application No. 202143348, Jun. 28, 2024, 6 pages.
Non-Final Office Action issued in connection with U.S. Appl. No. 17/597,486, Jul. 16, 2024, 8 pages.
Non-Final Office Action issued in connection with U.S. Appl. No. 17/149,308, filed May 23, 2023, 12 pages.
Second Office Action issued in connection with Japanese Patent Application No. 2022-507908, Jun. 20, 2023, 7 pages.
Office Action issued in connection with Japanese Patent Application No. 2023-547279, Jul. 2, 2024, 3 pages.
International Search Report and Written Opinion issued in connection with International Patent Application No. PCT/US2023/ 070118, Mar. 1, 2024, 15 pages.
Extended European Search Report issued in connection with European Patent Application No. 22760169.7, Oct. 29, 2024, 9 pages.
Partial European Search Report issued in connection with European Patent Application No. 24191670.9, Oct. 18, 2024, 11 pages.
Second Examination Report issued in connection with Australian Patent Application No. 2022227496, Aug. 29, 2024, 7 pages.
Non-Final Office Action issued in connection with U.S. Appl. No. 18/539,598, Sep. 17, 2024, 9 pages.
First Examination Report issued in connection with Australian Patent Application No. 2023216766, Aug. 30, 2024, 3 pages.
Notice of Grant issued in connection with Japanese Patent Application No. 2023-547279, Dec. 10, 2024, 3 pages.
Advisory Action issued in connection with U.S. Appl. No. 17/432,228, Dec. 31, 2024, 3 pages.
First Examination Report issued in connection with Australian Patent Application No. 2022227496, May 16, 2024, 5 pages.
Notice of Allowance issued in connection with U.S. Appl. No. 17/172,789, Jul. 20, 2023, 8 pages.
International Search Report and Written Opinion issued in connection with International Patent Application No. PCT/US2023/ 064983, Sep. 29, 2023, 10 pages.
Extended European Search Report issued in connection with European Patent Application No. 21916574.3, Jul. 4, 2024, 8 pages.
Extended European Search Report issued in connection with European Patent Application No. 22753403.9, Jul. 4, 2024, 8 pages.
First Office Action issued in connection with Chinese Patent Application No. 202080069827.1, Jul. 16, 2024, 10 pages.
Extended European Search Report issued in connection with European Patent Application No. 22846386.5, Mar. 12, 2025, 7 pages.
Extended European Search Report issued in connection with European Patent Application No. 22856384.7, Mar. 18, 2025, 5 pages.
Extended European Search Report issued in connection with European Patent Application No. 24219566.7, Mar. 27, 2025, 8 pages.

(56) References Cited

OTHER PUBLICATIONS

International Search Report and Written Opinion issued in connection with International Patent Application No. PCT/US2025/016710, Apr. 8, 2025, 11 pages.
Non-Final Office Action issued in connection with U.S. Appl. No. 17/635,747, Jul. 15, 2022, 7 pages.
Non-Final Office Action issued in connection with Japanese Patent Application No. 2024-106684, Aug. 12, 2025, 4 pages.
Extended European Search Report issued in connection with European Patent Application No. 22899583.3, Oct. 16, 2025, 15 pages.

* cited by examiner

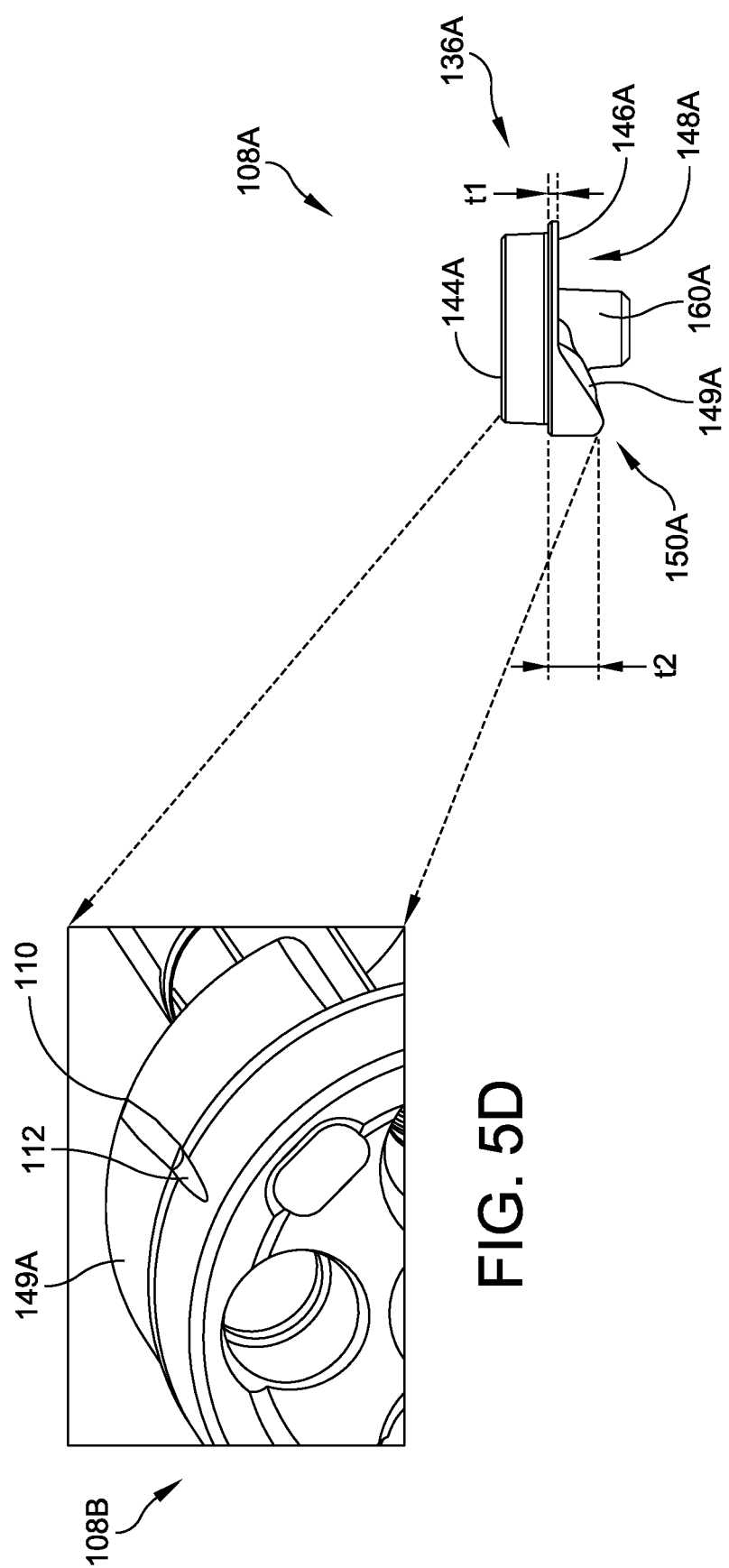

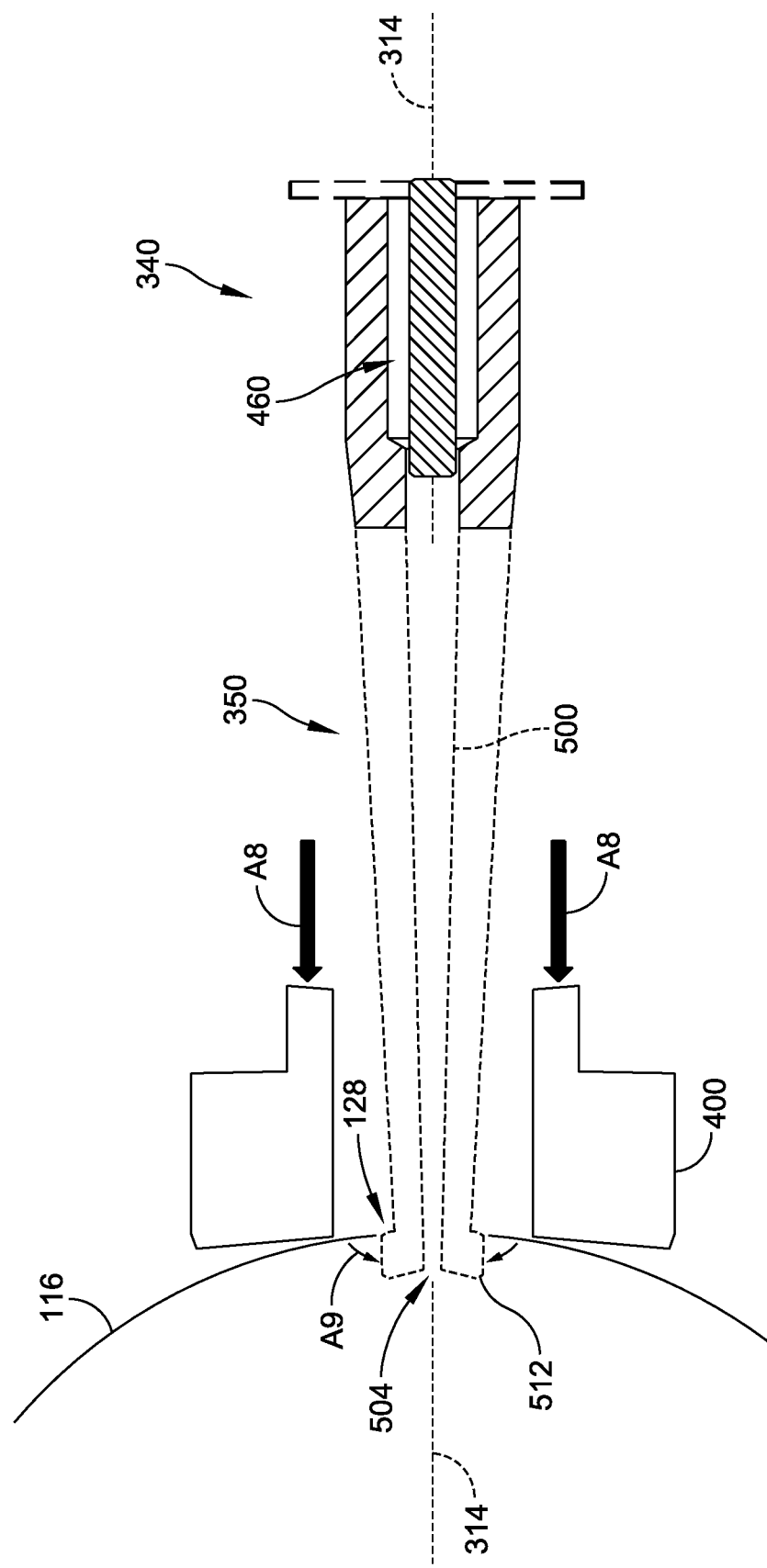

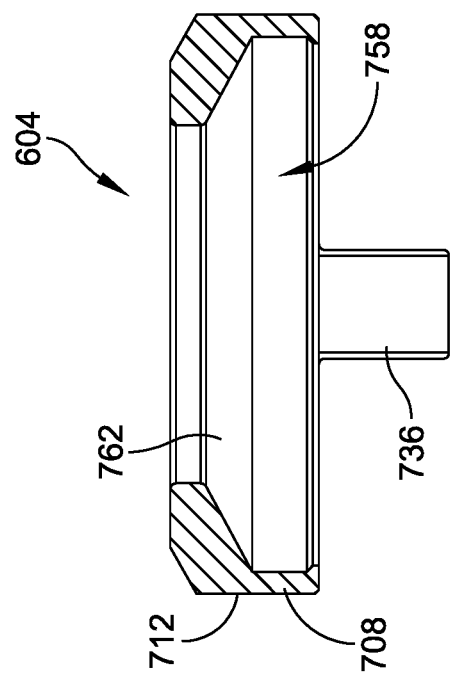
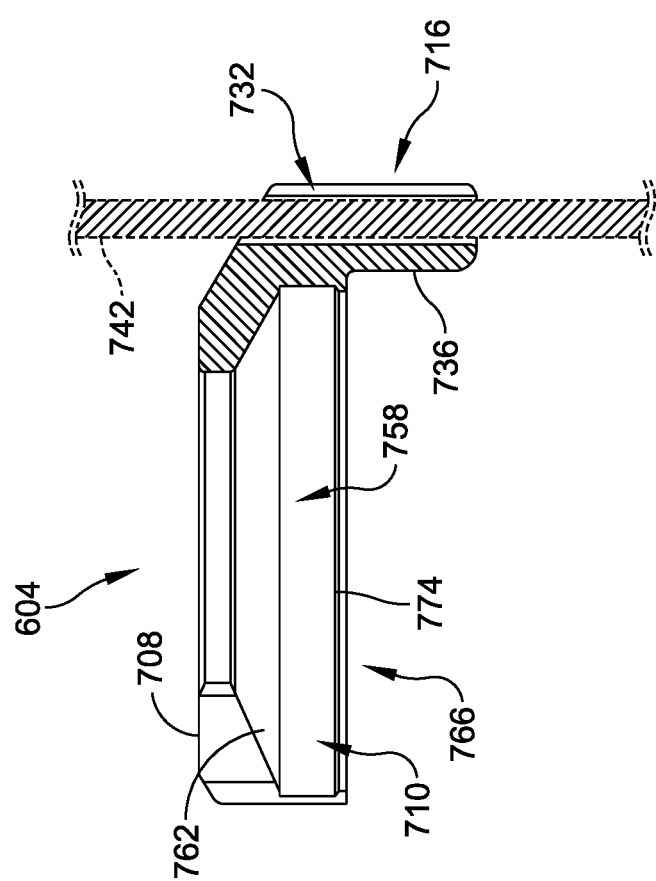

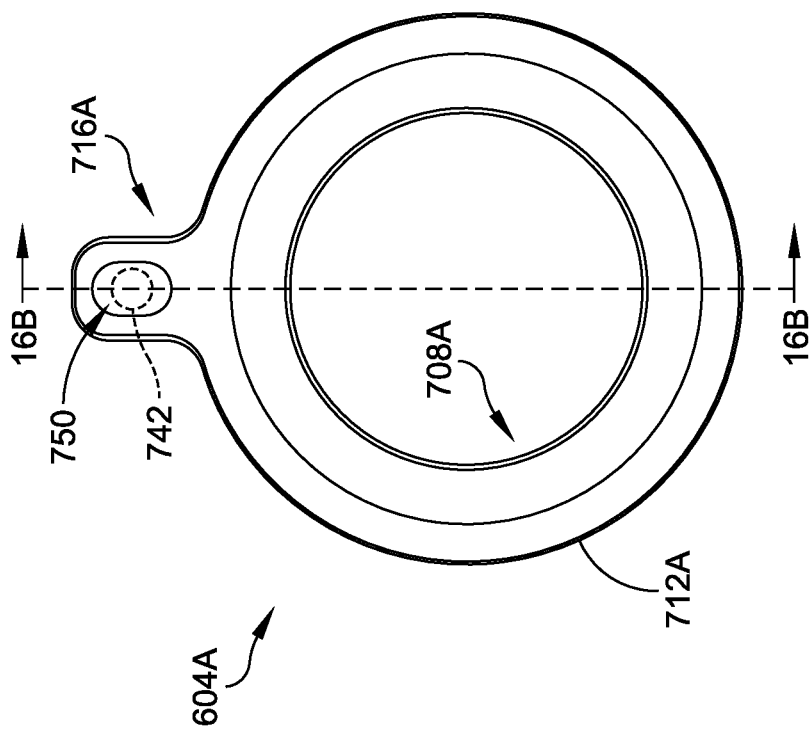

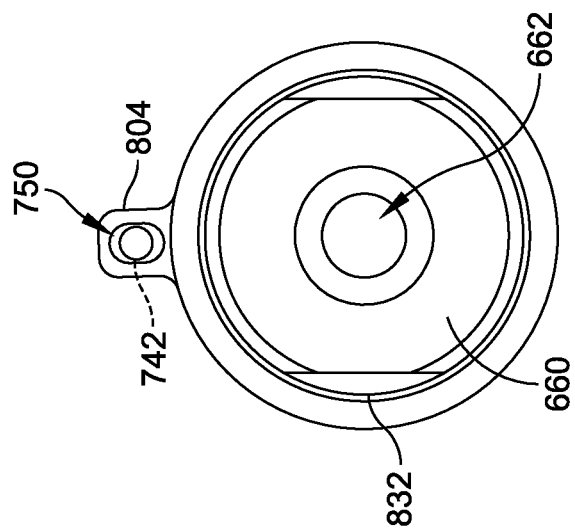
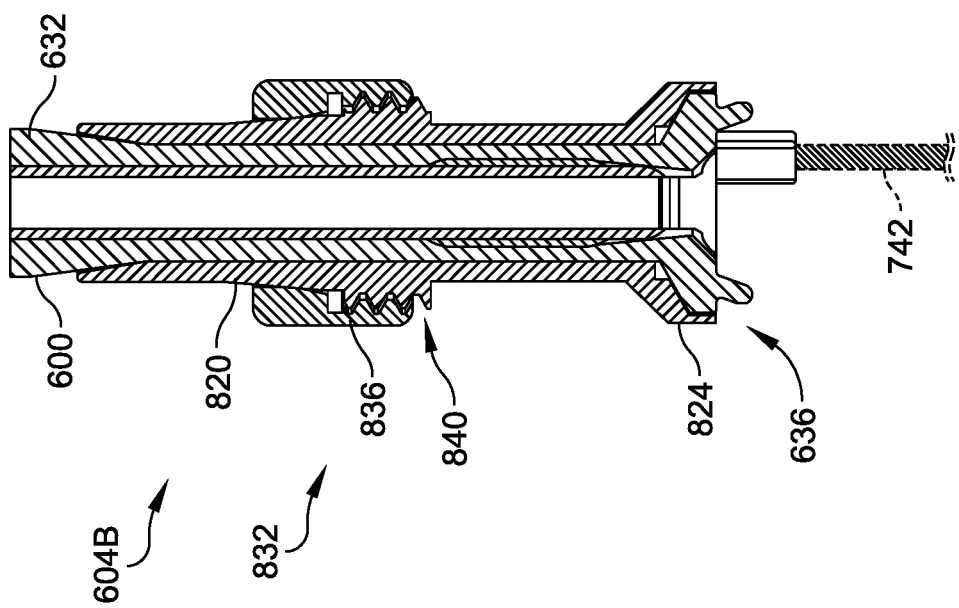

ns and instruments for handling, delivering and/or implanting glenoid implant components, such as a convex articular component (e.g., a glenosphere), and/or a glenoid baseplate during a shoulder arthroplasty procedure.

GLENOID IMPLANT COMPONENTS AND INSTRUMENTS THEREFOR

INCORPORATION BY REFERENCE TO ANY PRIORITY APPLICATIONS

This application is a National Stage Application, filed under 35 U.S.C. 371, of International Application No. PCT/US2022/011217, filed on Jan. 5, 2022, which claims priority to U.S. provisional application No. 63/200,288, filed on Feb. 26, 2021. Any and all applications for which a foreign or domestic priority claim is identified in the Application Data Sheet as filed with the present application are hereby incorporated by reference under 37 C.F.R. § 1.57.

BACKGROUND OF THE INVENTION

Field of the Invention

This application is directed to glenoid implant components and instruments for handling, delivering and/or implanting glenoid implant components, such as a convex articular component (e.g., a glenosphere), and/or a glenoid baseplate during a shoulder arthroplasty procedure.

Description of the Related Art

Arthroplasty is the standard of care for the treatment of advanced shoulder joint problems, such as severe arthritis. Shoulder arthroplasty can replicate the anatomical form of a joint, with a spherical component mounted on the proximal humerus and a concave surface mounted on the glenoid region of the scapula. Certain patients benefit from a reverse shoulder reconstruction in which a spherical component is mounted to the scapula and a concave surface is positioned on the proximal humerus.

The spherical component can be supported on a baseplate that is secured to the scapula. The baseplate can be rotationally symmetric or can be rotationally asymmetric. Where the baseplate is rotationally asymmetric, a surgeon may attempt to implant the baseplate in a particular rotational orientation.

A surgical procedure to install the baseplate can involve coupling the baseplate to an instrument for positioning the baseplate on the scapula. The surgical procedure may be followed by a step of installing the spherical component on the baseplate. Reducing the complexity and time involved in these surgical steps is to be desired. Surgical tools for handling, delivering and/or implanting articular components should be simple to use, should provide placement accuracy and thereby provide improved patient outcomes.

SUMMARY OF THE INVENTION

Accordingly, there is a need for improved surgical tools for handling and implanting glenoid baseplates and for handling and impacting, glenospheres and other joint arthroplasty articular bodies.

In one embodiment, an inserter is provided for coupling a glenosphere to a baseplate disposed in or on a human scapula. The inserter has a handle assembly that has a proximal end and a distal end. The handle assembly also includes an outer elongate body, an inner elongate body and an actuator. The outer elongate body extends between the proximal end and the distal end. The inner elongate body extends between the proximal end and the distal end. The inner elongate body is slideably disposed within the outer elongate body. The inner elongate body has a lumen disposed therethrough and a deflectable tip portion disposed at a distal end thereof. The actuator is configured to slide the inner elongate body relative to the outer elongate body to extend the deflectable tip portion from a retracted position, e.g., relative to a distal end of the outer elongate body. The deflectable tip portion is configured to be un-deflected within a cavity of a glenosphere and to apply a force to the glenosphere, e.g., a radially outward and/or a proximally oriented force.

In another embodiment, a glenosphere inserter is provided that includes an outer assembly, an inner assembly, a lumen disposed through the inner elongate body, and an actuator. The outer assembly has an outer elongate body, a handle disposed at a proximal portion of the glenosphereinseter, and an impaction tip at a distal portion of the glenosphereinserter. The inner assembly has an inner elongate body and a deflectable distal portion. The inner elongate body is slideably disposed within the outer elongate body. The lumen is disposed through the inner elongate body and the deflectable distal portion disposed at a distal end thereof. The actuator is configured to slide the inner elongate body relative to the outer elongate body to extend the deflectable distal portion distally from the impaction tip. The deflectable distal portion is configured to be deflected within a cavity of a glenosphere and to apply a force to the glenosphere toward the handle of the outer assembly.

In another embodiment, a glenosphere handling tool is provided that includes an elongate body and a retention portion. The elongate body has a proximal end and a distal end. The retention portion is disposed at the distal end of the elongate body. The retention portion includes a plurality of wall segments of the elongate body separated from each other by a slot. The slot extends from a proximal end of the slot to a distal end of the slot at the distal end of the elongate body. The retention portion also includes an enlarged periphery at the distal end of the elongate body. The enlarged periphery comprising a proximally facing edge configured to engage an inner wall surface of a glenosphere. The retention portion is configured such that the when the retention portion is in a free state the proximally facing edge faces and may contact a surface of a glenosphere to retain the glenosphere. The retention portion is configured to be deflected at the distal end of the elongate body such that the enlarged periphery has a reduced profile for separating the handling tool from a glenosphere.

In another embodiment, a method of handling a glenosphere is provided. A glenosphere is provided that has a convex articular surface, a concave interior space, and an opening providing access from the convex articular surface to the concave interior space. A tip of an elongate member of a handling tool is extended through the opening while a distal portion of the tip is in a lower profile configuration. The tip of the elongate member is actuated such that a proximally facing surface thereof has a profile larger than the opening. A proximally oriented force is applied to the glenosphere to hold the glenosphere against a tip of the handling tool.

In another embodiment a glenoid implant is provided that includes a baseplate and an anchor member. The anchor member can extend medially from a medial side of the baseplate. The anchor member can be configured to be embedded in a scapula medially of the glenoid surface of the scapula. The glenoid implant includes a lumen disposed through the anchor member. The lumen extends from a lateral portion to a medial portion. The lumen can extend entirely from a lateral side to a medial side. The lumen can provide access for a glenosphere inserter tool control member, such as a surgical wire. The glenosphere inserter tool control member can be advanced from a lateral side of the glenoid implant, e.g., from a lateral side of the baseplate, to a medial side of the glenoid implant, e.g., to a medial side of the anchor member. In some variations the lumen extends medially from a lateral side and may extend to a terminus forming a blind hole. The glenoid implant can have a locking screw that is pre-assembled with a glenosphere. The locking screw can have a lumen disposed therethrough, e.g., from a lateral side to a medial side. The locking screw can provide access to a lumen in the anchor member of the glenoid implant.

In another embodiment, an instrument for implanting a glenoid baseplate is provided. The instrument can include a first end, a second end, and an elongate body disposed therebetween. The instrument can include a glenoid implant retention feature disposed at or adjacent to the first end. The glenoid implant retention feature can include a release configuration for disengaging a glenoid baseplate and a retention configuration for engaging and retaining a glenoid baseplate. The instrument can include a rotation guide. The rotation guide can include a peripheral body. The peripheral body can include an inner periphery, an outer periphery, and an orientation feature. The orientation feature can be disposed outward of the inner periphery, e.g., within the thickness of the peripheral body or adjacent to or on the outer periphery. The orientation feature can be configured to be aligned with a position corresponding to an augmented portion of a glenoid baseplate. A position corresponding to an augmented position of the glenoid baseplate can be a same position as the augmented position on the periphery of the glenoid baseplate. A position corresponding to an augmented position of the glenoid baseplate can be at an angular offset from the augmented portion, which offset can be pre-operatively determined. The inner periphery can be configured to be disposed around the glenoid implant retention feature when the glenoid implant retention feature is in the retention configuration. The instrument can include a baseplate inserter.

In one or more variations, an access gap can be disposed from the outer periphery to the inner periphery to allow the elongate body of the instrument to be passed therethrough transversely to a longitudinal axis of the elongate body.

In one or more variations, the orientation feature comprises an open channel disposed on the outer periphery. The orientation feature can comprise a distal projection configured to engage a guide wire. The distal projection can comprise an open channel facing away from the peripheral body. In one or more variations, the distal projection comprises an enclosed aperture.

The inner periphery can be configured to slidable over the glenoid implant retention feature when the glenoid implant retention feature is in the release configuration. The inner periphery can be secured to the glenoid implant retention feature when the glenoid implant retention feature is in the retention configuration.

In one or more variations, the inner periphery of the rotation guide comprises a profile configured to match an outer profile of the glenoid implant retention feature. A proximal face of the inner periphery of the rotation guide can comprise a distal-facing conical surface. A distal portion of the inner periphery can comprise a lip configured to be disposed over a distal edge (e.g., a distal facing edge) of the glenoid implant retention feature.

In one or more variations, the inner periphery of the rotation guide can comprise serrations configured to engage an outer surface of the glenoid implant retention feature. The serrations can be a continuous periphery of serrations disposed about, e.g., continuously about, a central space of the rotation guide. The inner periphery of the rotation guide comprises a continuous periphery. The serrations can extend continuously and entirely around the continuous periphery.

In one or more variations, the inner periphery is configured to be positioned at any position over a continuous range of positions over the glenoid implant retention feature.

In one or more variations, the rotation guide has a sleeve that comprises a collet portion. The sleeve and the collet portion are disposed proximally of the peripheral body. The collet portion of the sleeve is configured to engage an outer surface of the elongate body away from the glenoid implant retention feature. The rotation guide can also include a clamping ring. The clamping ring can have inner threads. The sleeve can have outer threads, e.g., a threaded outer surface, configured to engage the clamping ring. The collet portion can have an outer tapered surface. In use, advancing the clamping ring along the outer threads, e.g., the tapered surface, creates frictional engagement between an inner surface of the collet portion of the sleeve and the elongate body of the instrument. The inner threads of the clamping ring are configured to engage the outer threads as the clamping ring is advanced by engagement of the inner threads and the outer threads to create enhanced force, and in some cases compression, of the collet portion of the sleeve against an outer surface of the elongate body.

In another embodiment, an instrument for implanting a glenoid baseplate is provided. The instrument incudes a first end, a second end, and an elongate body disposed therebetween. The instrument includes an expandable glenoid implant retention feature disposed at or adjacent to the first end. The expandable glenoid implant retention feature comprising an expandable retention end portion for expanding into engagement with a glenoid baseplate in an expanded state. The instrument includes a rotation guide that includes a peripheral body. The peripheral body includes an inner surface, an outer surface, and an orientation feature disposed adjacent to or on the outer surface. The inner surface is configured to restrain rotation of the rotation guide about the glenoid implant retention feature when the glenoid implant retention feature is expanded.

In at least one variation, a lip is disposed at a distal portion of the rotation guide to restrain proximal-distal motion of the rotation guide relative to the glenoid implant retention feature. In use the instrument may be advanced in a lateral-to-medial direction. Thus, proximal-distal may correspond to lateral-medial in use.

In another embodiment, a method of aligning a rotationally asymmetric glenoid component to a glenoid of a specific patient is provided. A glenoid of the specific patient is exposed. A pin is placed in the scapula at or adjacent to the glenoid. The rotationally asymmetric glenoid component is coupled to a glenoid component inserter. A rotation guide is coupled to the glenoid component inserter. After coupling the rotation guide to the glenoid component inserter, the rotation guide is rotationally positioned to align the rotation guide relative to an augmented portion of the rotationally asymmetric glenoid component. The rotationally asymmetric glenoid component is advanced onto the glenoid by referencing an orientation feature of the rotation guide with the anatomy at or adjacent to the glenoid to align the rotationally asymmetric glenoid component to the glenoid in a prescribed rotational orientation for the specific patient.

The rotationally asymmetric glenoid component is secured to the glenoid in the prescribed rotational orientation for the specific patient.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 5C shows a baseplate with an augmented thickness on a portion of a periphery thereof.

FIG. 5D shows an embodiment of a baseplate that includes a rotational position indicating mark to aid a surgeon in positioning the baseplate.

FIG. 10G illustrates how the inserter of FIG. 6 applies an impaction load to the glenosphere to couple the glenosphere to a baseplate.

FIG. 14B is a cross-sectional view of the rotation guide of FIG. 14 taken at the section plane 14B-14B in FIG. 14A.

FIG. 14C is a cross-sectional view of the rotation guide of FIG. 14 taken at the section plane 14C-14C in FIG. 14A.

FIG. 16A is a top view of the rotation guide of FIG. 15.

FIG. 17A is a longitudinal cross-section of the baseplate inserter of FIG. 17.

FIG. 17B is a proximal end view of the baseplate inserter of FIG. 17.

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Figure 1:
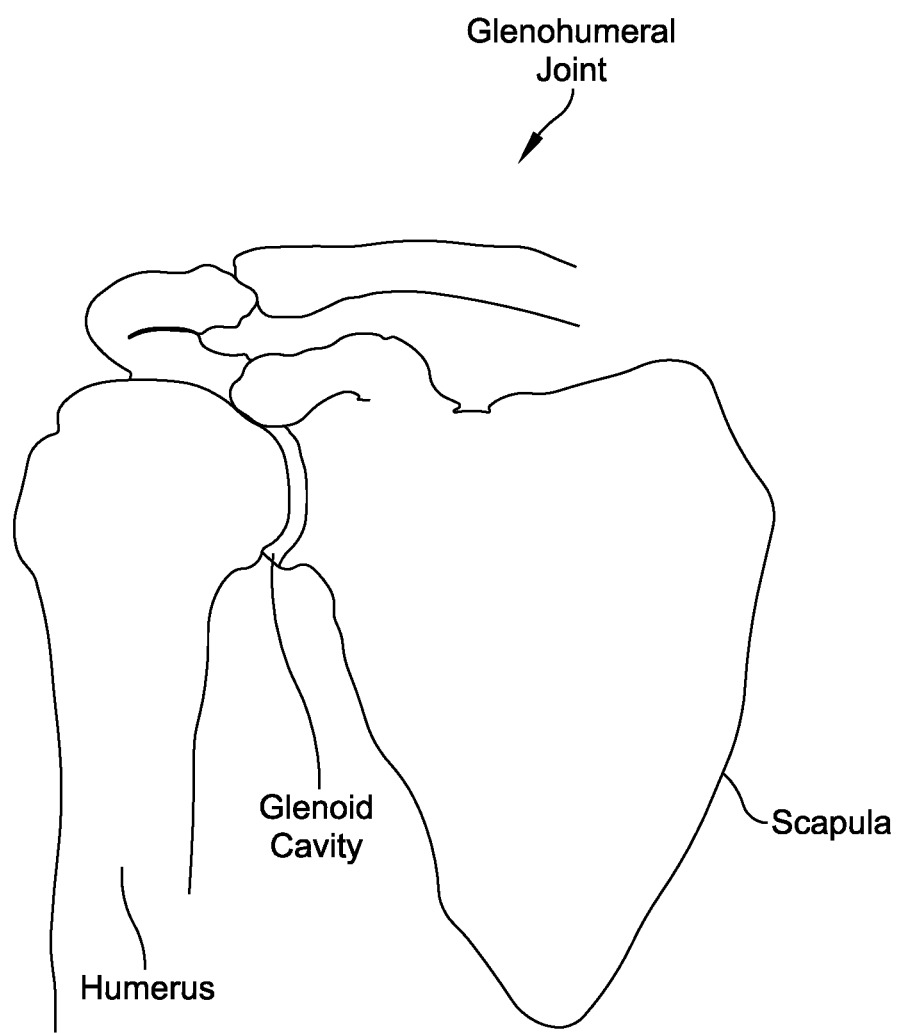
FIG. 1 is a schematic view of the human shoulder.

FIG. 1 depicts the human shoulder joint, which is also called the glenohumeral joint. The glenoid cavity is an articular surface of the shoulder joint, which is located on the scapula. The glenoid cavity articulates with the humeral head to permit arm motion at the glenohumeral joint. Total shoulder arthroplasty replaces the articular surfaces of the glenohumeral joint with prosthetic articular surfaces that replicate the naturally occurring concave and convex surfaces of the body. Typically, in total shoulder arthroplasty, a humeral articular component is provided that has a surface that replaces the natural humeral head and a glenoid articular component is provided that has a surface that replaces cartilage in the glenoid cavity. In a typical reverse total shoulder arthroplasty, a glenoid articular component with a convex, e.g., spherical, configuration is coupled with the scapula at or in the glenoid cavity and a complimentary concave articular structure is placed on the humerus. Reverse total shoulder arthroplasty thus reverses the naturally occurring convexity and concavity orientation of the glenohumeral joint.

Figure 2:
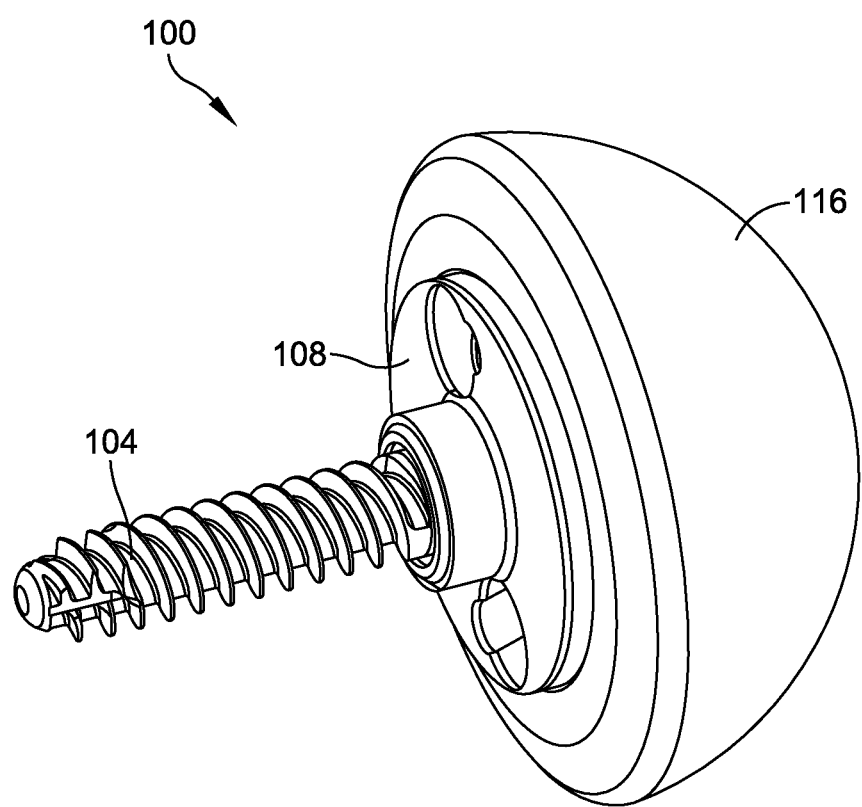
FIG. 2 is a perspective view of a glenoid implant in an assembled configuration.
Figure 3:
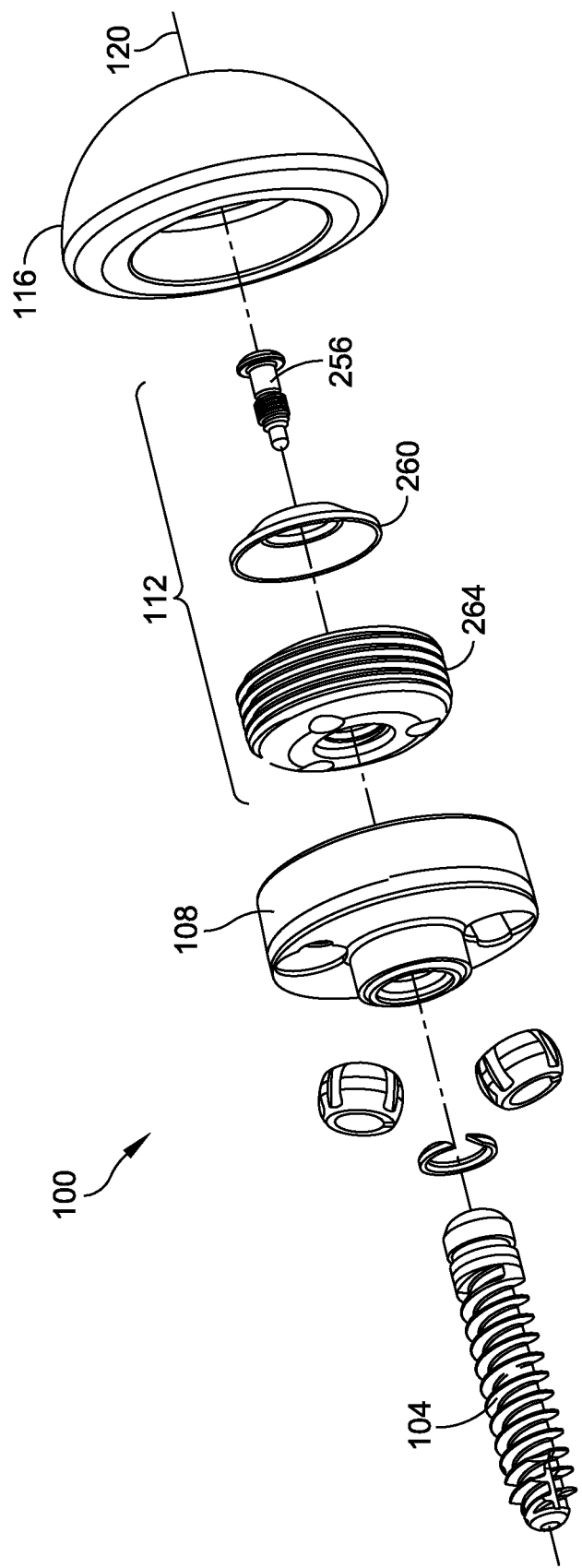
FIG. 3 is an exploded view of the glenoid implant shown in FIG. 2.
Figure 4:
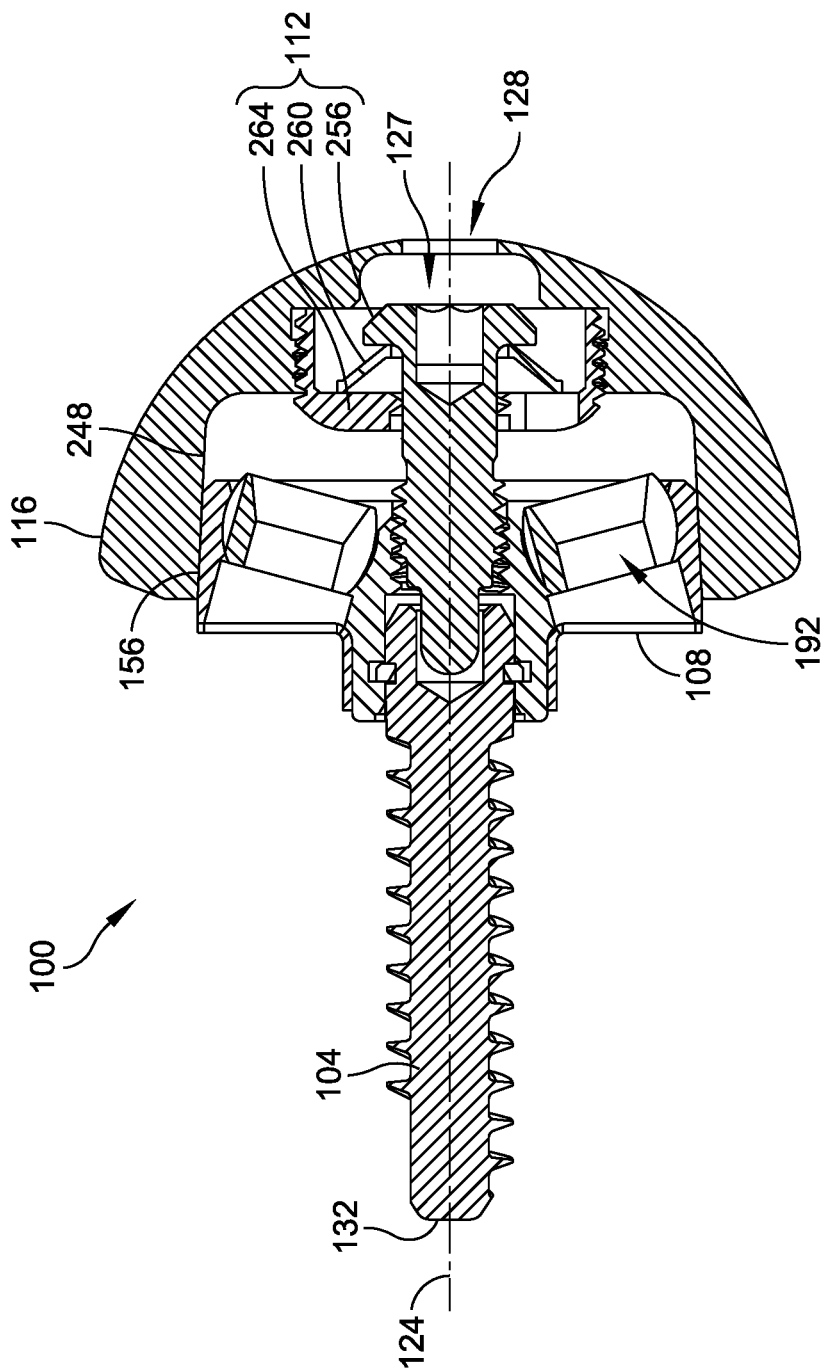
FIG. 4 is a cross-sectional side view of the glenoid implant shown in FIG. 2.

FIGS. 2-4 show an articular component assembly or implant 100 configured to be implanted in the glenoid cavity of a patient, in other words in reverse of anatomic configuration. The glenoid implant 100 includes an anchor member 104 for anchoring the implant 100 in the scapula, a baseplate 108, a locking structure 112 configured to deter rotation of the anchor member relative to the baseplate. The reverse glenoid implant assembly 100 also includes a glenosphere 116 providing a convex (e.g., spherical) articular surface. The glenosphere 116 is configured to couple to a concave surface of or on a humerus (not shown) to provide shoulder joint motion in the patient. The glenoid implant 100 and a corresponding humeral component provide a replacement for the natural glenohumeral joint.

As used herein, the terms "distal" and "proximal" are used to refer to the orientation of the glenoid implant as shown in FIG. 2-4. As shown in FIG. 3, a longitudinal axis 120 of the glenoid implant 100 extends through a central longitudinal axis 124 of anchor member 104 (shown in FIG. 4). The end of the glenoid implant 100 with the glenosphere 116 is referred to as the proximal end along the longitudinal axis 120 and the end with the anchor member 104 is referred to as the distal end along the longitudinal axis 120. In other words, an element is proximal to another element if it is closer to a central aperture 128 (shown in FIG. 4) of the glenosphere 116 than the other element, and an element is distal to another element if it closer to a distal tip 132 (shown in FIG. 4) of the anchor member 104 than the other element. A cavity 127 of the glenosphere 116 is located immediately distal to the aperture 128. The cavity 127 can be considered to extend to a distal side of the glenosphere 116. At some points below, reference may be made to the anatomical location. In use when the implant is delivered into a patient's scapula, the distal tip 132 of the anchor member 104 is more medial on the patient, whereas the articular surface of the glenosphere 116 is more lateral on the patient.

Figure 5:
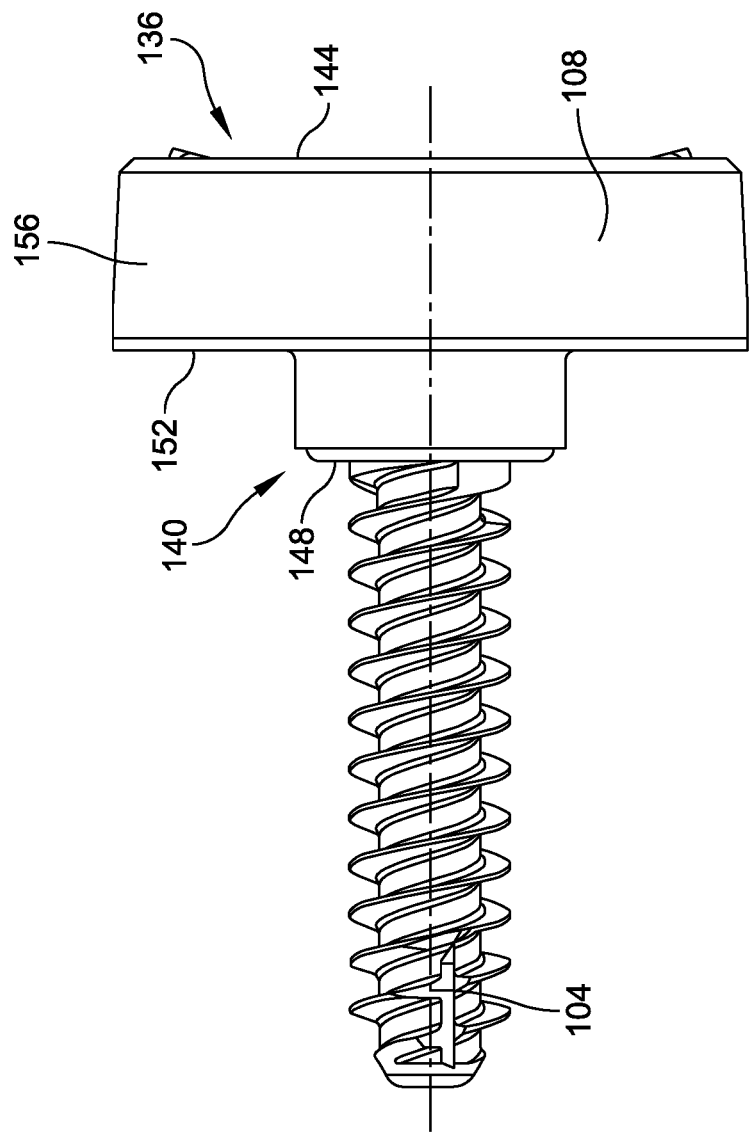
FIG. 5 is a side view of a baseplate and an anchor member of a glenoid implant.

FIGS. 3 and 4 show that the baseplate 108 is oriented substantially perpendicular to the longitudinal axis 120 of the glenoid implant 100. The baseplate 108 is shown coupled to the anchor member 104 in FIG. 4 and FIG. 5 shows just the anchor member 104. The baseplate 108 also has a proximal end 136 and a distal end 140. The proximal end 136 comprises a proximal surface 144 and the distal end 140 comprises a distal surface 148. The proximal surface 144 can be substantially parallel to the distal surface 148. The baseplate 108 can also include a bone engaging surface 152. The thickness of the baseplate 108 defined between the proximal surface 144 and the bone engaging surface 152 may correspond to the amount that the baseplate 108 extends above a bone surface when implanted in the scapula. The thickness can be in a range between about 2 mm and about 12 mm, e.g., between about 4 mm and about 9 mm, e.g., about 6 mm. Thicknesses of about 3 mm, 5 mm, 7 mm, 8 mm, 10 mm and 11 mm are also contemplated. The bone engaging surface 152 can be lateralized in some embodiments. The bone engaging surface 152 can be substantially parallel to the proximal surface 144 and/or the distal surface 148.

FIGS. 2-4 illustrate a case where the baseplate 108 is rotationally symmetric about a central axis, e.g., the axis 120, of the reverse glenoid implant assembly 100. As a result, the baseplate 108 can be positioned at any position of rotation about the axis 120 and then coupled with the scapula. FIG. 5C shows a more complex case of a baseplate 108A that is asymmetric about the axis 120 of a reverse glenoid implant assembly into which it can be incorporated. The bone engaging surface 152 can be angled, forming a wedge or other non-parallel structure that can serve to augment bone erosion in the glenoid. The bone engaging surface 152 can be patient specific. The baseplate 108A can be configured with one or more medial extensions to supplement or fill a worn area of the scapula, which can reduce, minimize or eliminate a need for reaming the bone to prepare the surface. As such, the baseplate 108A can help preserve bone stock.

The baseplate 108 also has a peripheral surface 156 that spans between the proximal surface 144 of the baseplate 108 and the bone engaging surface 152 of the baseplate 108. The surface 156 is disposed lateral with regard to the center of the implant 100 and also is disposed lateral of the mid-plane of the patient when the implant 100 is applied to the patient. The peripheral surface 156 can have a circular profile when viewed in a cross-section plane extending parallel to the proximal surface 144. The diameter of the circular profile can be between about 20 mm and about 40 mm, e.g., between about 25 mm and about 35 mm, e.g. about 30 mm. In some embodiments, the lateral surface 156 of the baseplate 108 is configured to form a portion of a friction lock engagement, such as a Morse taper. In one embodiment, the lateral surface 156 of the baseplate 108 is tronconical. The term tronconical, as used herein, refers to a shape or surface that is or is similar to a truncated cone. In some embodiments, the lateral surface 156 is configured with a gradually increasing perimeter in a direction from proximal surface 144 toward the bone engaging surface 152. The surface 156 is configured to mate with an interior surface 248 that is tapered or tronconical or otherwise configured to create high friction with the baseplate 108. Some, e.g., a majority of the thickness of the baseplate 108 can be received in the cavity 127 in some cases as the surfaces 156, 248 engage.

Figure 5A:
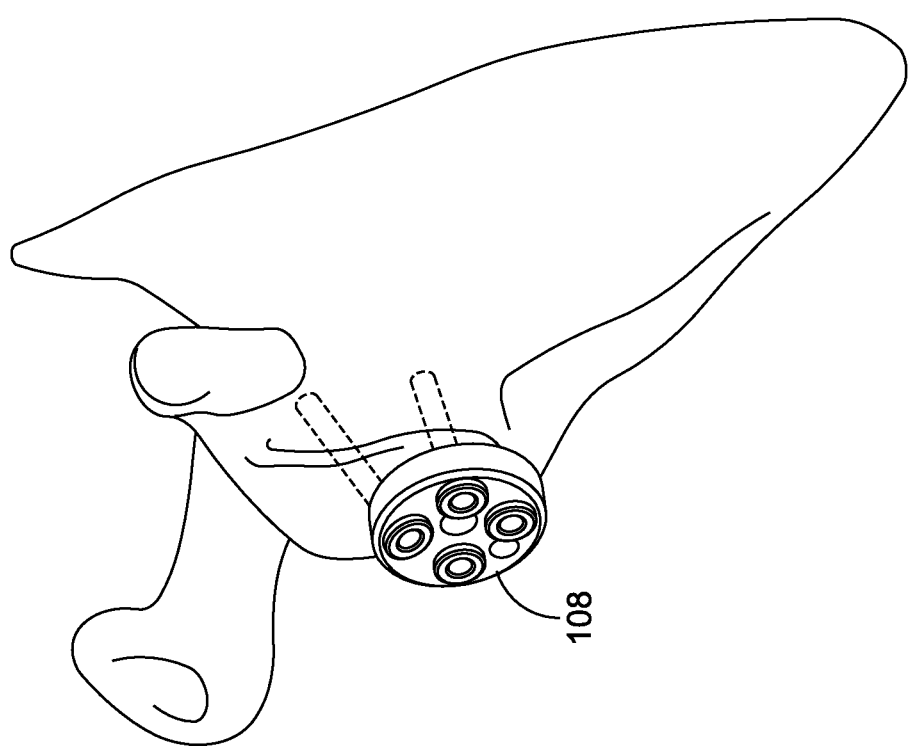
FIG. 5A shows a baseplate secured to a glenoid region of a scapula.
Figure 5B:
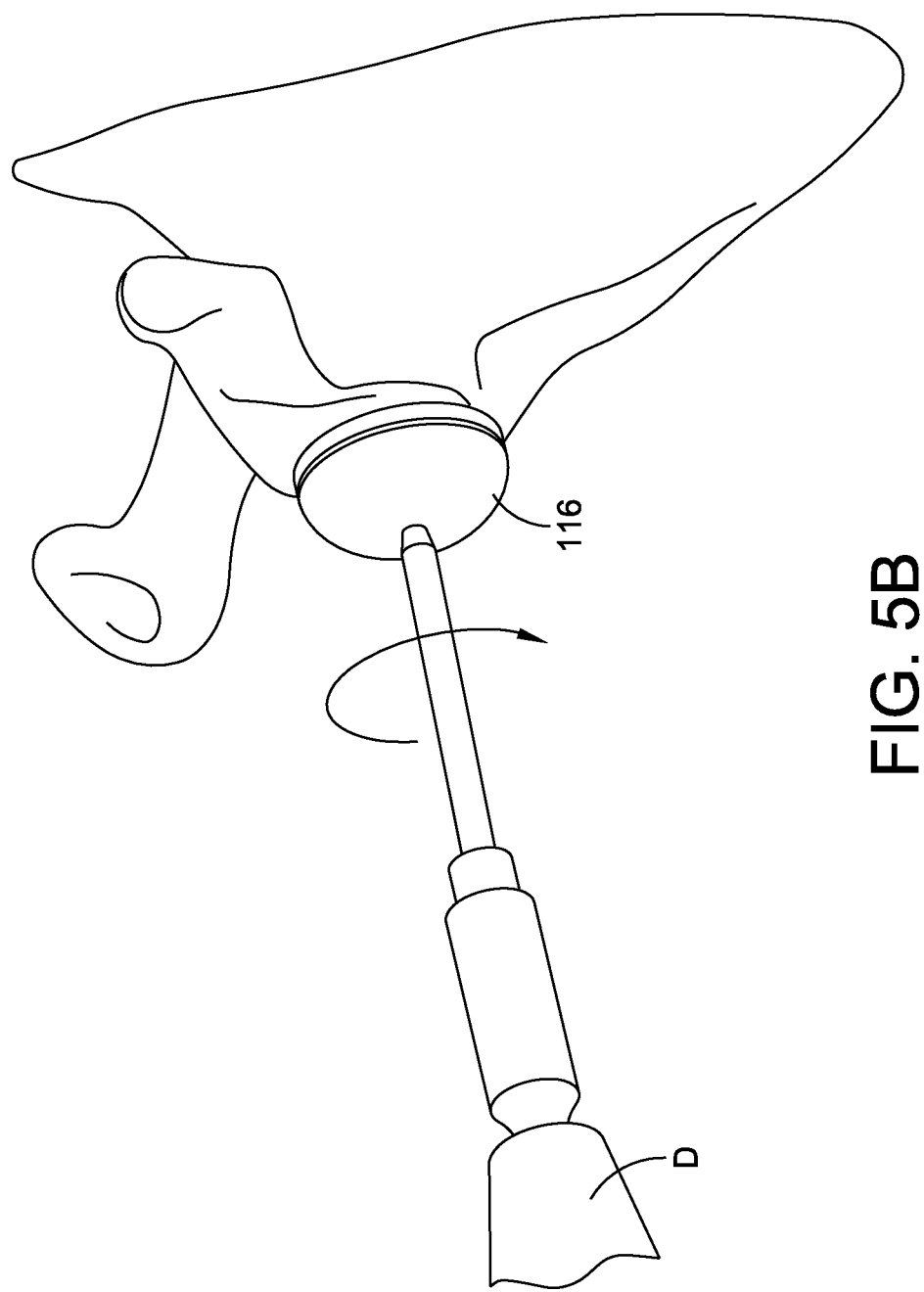
FIG. 5B shows a glenosphere attached to the baseplate at a glenoid region of a scapula.
Figure 6:
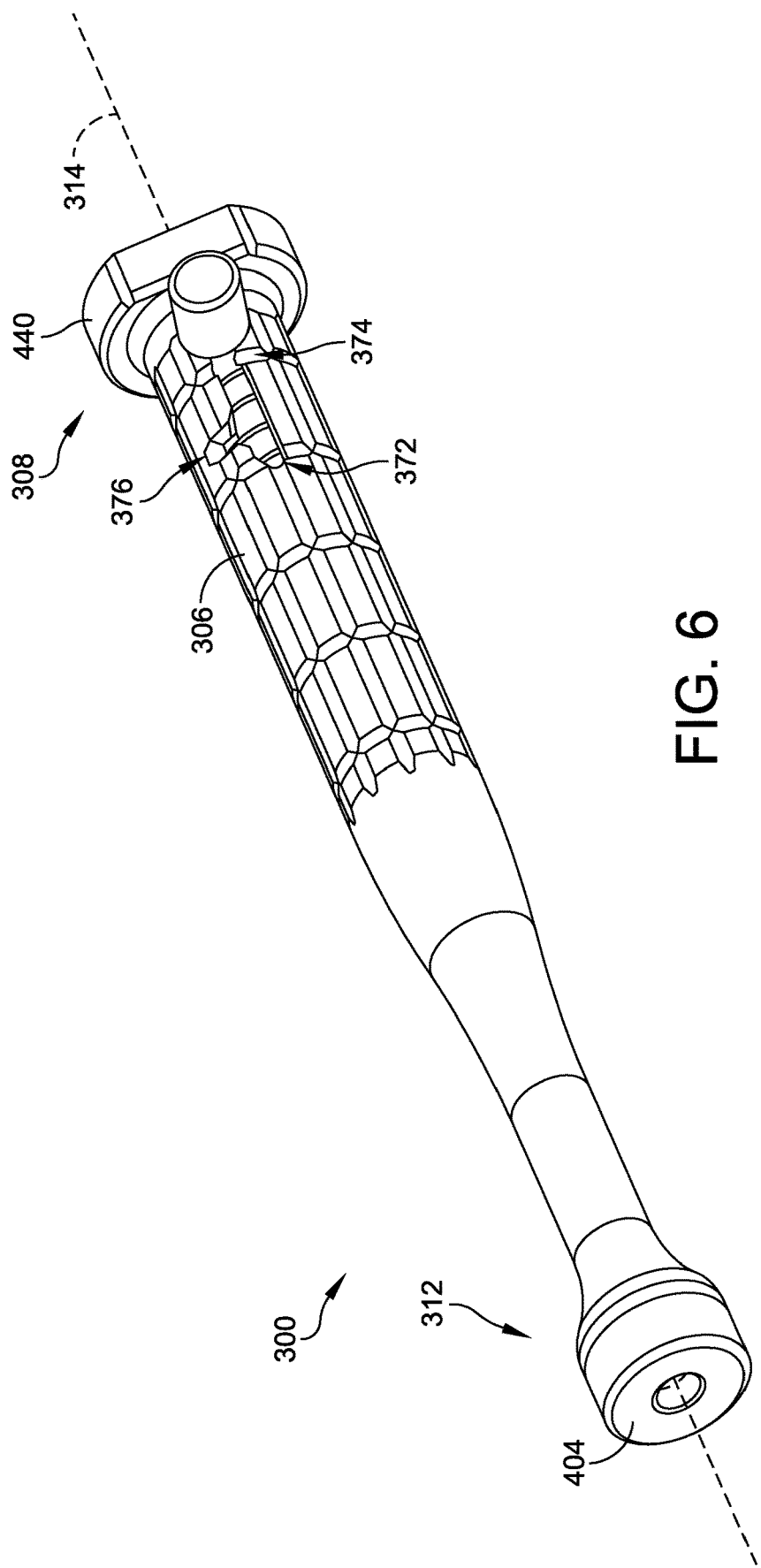
FIG. 6 is a perspective view of an inserter that can be used as a handling tool and can be used to impact a glenosphere onto a glenoid baseplate.
Figure 7:
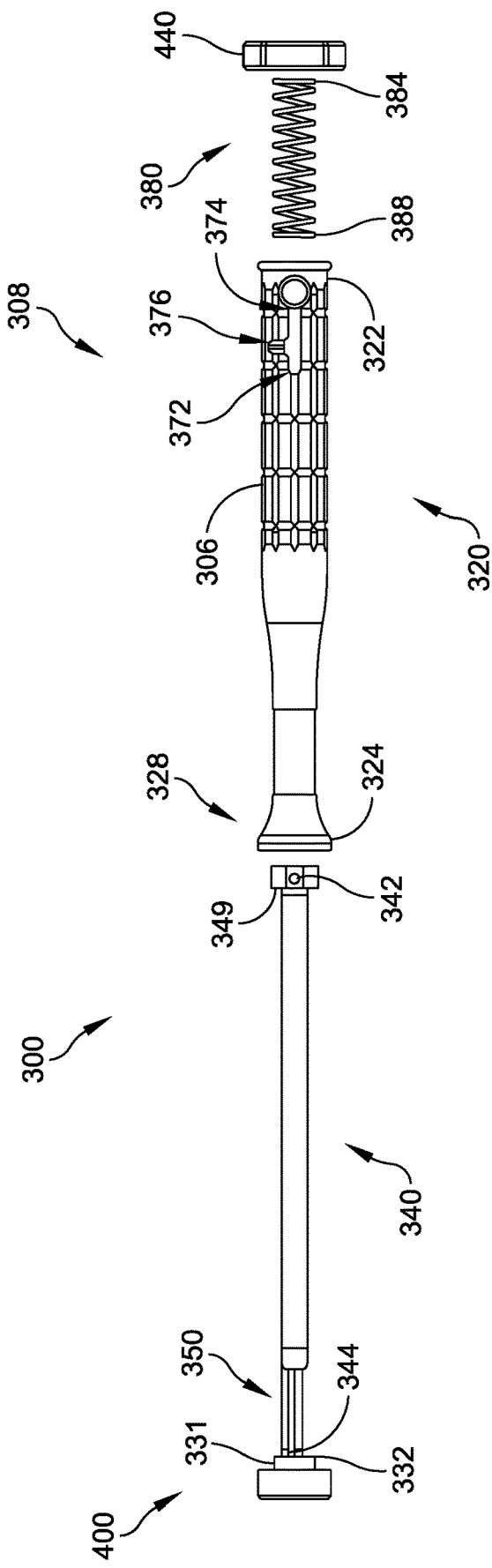
FIG. 7 is an exploded view of the inserter illustrated in FIG. 6.
Figure 8:
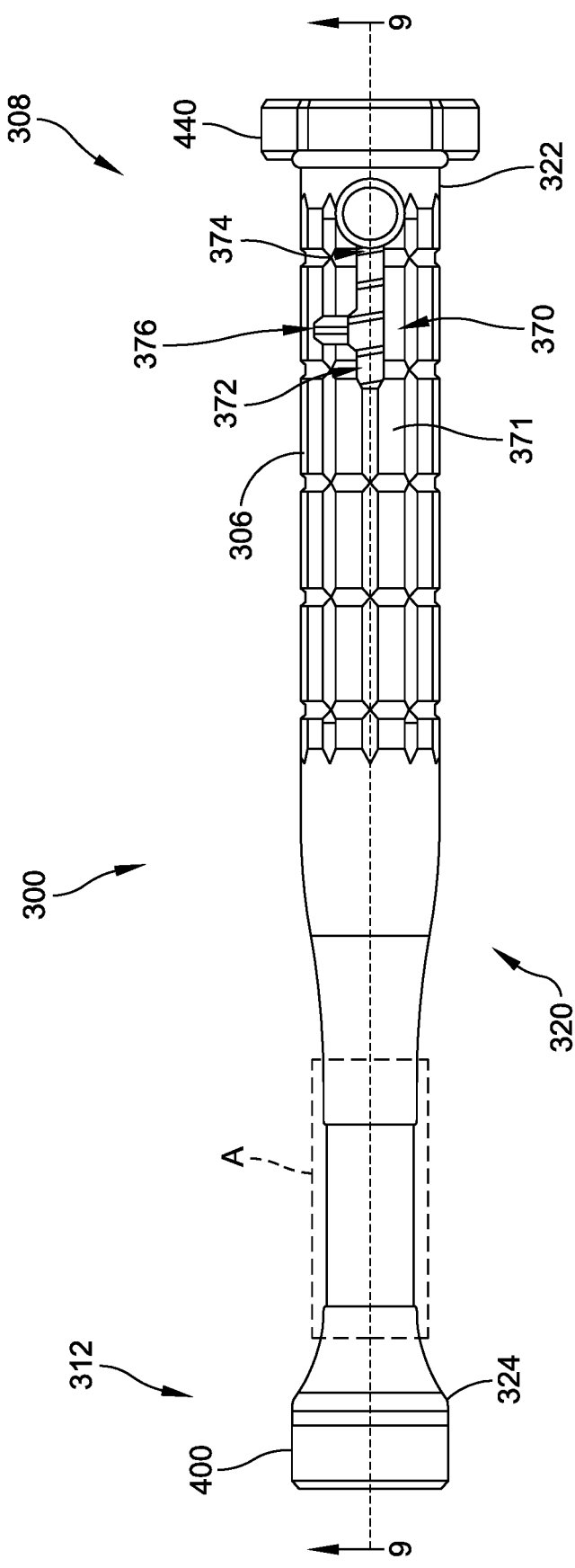
FIG. 8 is a side view showing an actuator configured to manipulate a retention portion disposed at a tip of the inserter of FIG. 6.
Figure 9:
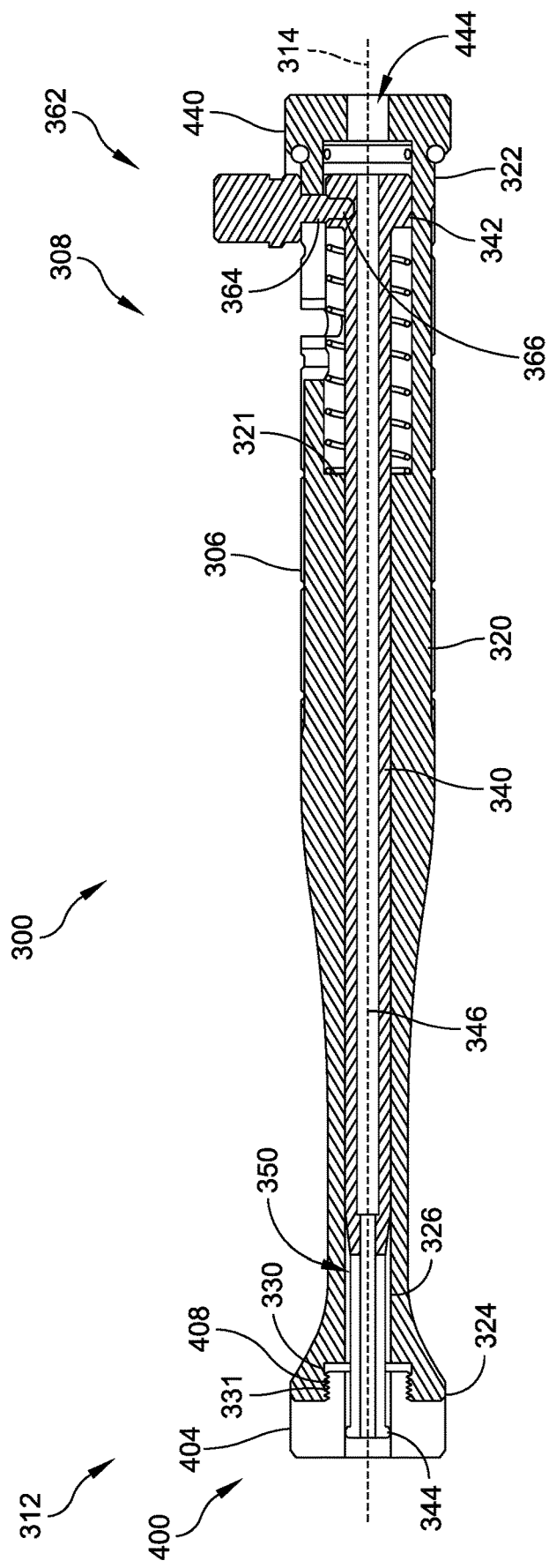
FIG. 9 is a cross-sectional view of the inserter of FIG. 6 taken at the section plane 9-9 shown in FIG. 8.

FIGS. 5A and 5B shows the baseplate 158 and the glenosphere 116 implanted in the scapula. The baseplate 158 can be secured to the scapula by the anchor member 104 and a plurality of screws that extend through peripheral holes 192 (e.g., one, two three, four or more than four such holes). The holes 192 can be formed through internal members that can swivel within the baseplate 108 to help direct the peripheral screws. After the baseplate 158 is secured to the scapula the glenosphere 116 can be attached thereto. The glenosphere 116 is placed against the baseplate 158. A handling tool such as an inserter such as those discussed below, which can optionally also be an impactor, can be used to engage the surfaces 156, 248 with each other initially. Thereafter a locking screw 256 (see FIGS. 3 and 4) can be advanced using a driver D (see FIG. 5B). In some embodiments, the locking screw 256 has a blind hole. In some embodiments, the locking screw 256 has a lumen from proximal end to distal end to allow access by a handling tool control member, such as may be included in the inserter 300, the inserter 300A or the inserter 300B discussed further below. The locking screw 256 can be accessed through the central aperture 128 by traversing a proximal (or lateral) portion of the cavity 127 within the glenosphere 116. FIG. 4 illustrates how the advancement of the locking screw 256 can greatly enhance the frictional engagement between the internal surface 248 of the glenosphere 116 and the peripheral surface 156 of the baseplate 158. The locking screw 256 also secures the baseplate 108 against rotation that could cause the connection between the scapula and the reverse glenoid implant assembly 100 to be loosened. FIG. 3 shows how the locking screw 256 can be coupled with the glenosphere 116, e.g., through a compression washer 260 and a threaded member 264. The locking screw 256, compression washer 260 and the threaded member 264 can collectively be a locking structure 112. Other locking structures can be used to connect the locking screw 256 to the baseplate 108. Although the locking screw 256 is shown as solid with a blind recess on the proximal side, the screw 256 can be cannulated with a lumen extending all the way through the screw from a proximal end to a distal end.

FIG. 5B is illustrative of the manner of securing the glenosphere 116 to the baseplate 158 but in a patient the presence of soft tissue makes secure handling of the glenosphere 116 very important to a simpler and in some cases a more successful surgery. The inserters may be used as impactors and as such may be referred to herein as impactors. These instruments are examples of handling tools discussed and claimed below facilitate such handling. After the glenosphere 116 is engaged with the scapula, an articular surface of a humeral assembly can be placed thereon to provide shoulder joint motion.

FIG. 5C illustrate that the baseplate 108A has a bone engaging surface that results from a varying medial-lateral thickness, e.g., providing a partial wedge shape. The baseplate 108A can compensate for bone loss, thereby augmenting the bone of the scapula. The baseplate 108A has an augment portion 150A that is non-uniform in thickness. The augment portion 150A can be formed in any suitable way, for example by additive manufacturing producing a porous metal structure. The augment portion 150A presents a first thickness, t1, along a first peripheral side of the baseplate 108A and a second thickness, t2, along a second peripheral side of the baseplate. The second thickness is larger than the first thickness. The second thickness can be provided by progressively thickening the augment portion 150A in a lateral direction (e.g., downward in FIG. 5C). In the illustrated embodiment, the thickness of the augment portion 150A linearly increases from a mid-section of the baseplate 108A toward the first peripheral side of the baseplate 108A. In the illustrated embodiment, a distal surface 148A is provided that engages the surface of the scapula, e.g., at the glenoid. The surface 148A has a first peripheral portion 146A that is parallel to a proximal surface 144A of the baseplate 108A. The surface 148A has a second peripheral portion 149A that is disposed at an angle relative to the proximal surface 144A. The angle between the second peripheral portion 149A and the proximal surface 144A can be selected based on the amount of bone to be replaced or supplemented by the augment portion 150A. The first peripheral portion 146A of the surface 148A can be located closer to the proximal surface 144A than is the second peripheral portion 149A of the surface 148A. The augment portion 150A provides a partial wedge, e.g., a half-wedge configuration. The augment portion 150A is for augmenting bone degeneration and/or disease in the location beneath a glenoid implant including the baseplate 108A.

The baseplate 108A can be used where uneven wear or disease is provided. The baseplate 108A can be advantageously used in a bone preserving manner such that the un-or less worn portions which would be disposed beneath the first peripheral portion 146A. This region need not be reamed or otherwise removed to accommodate the baseplate 108A. The entire distal portion of the baseplate 108A can be made of a porous structure, e.g., of a porous titanium structure, as discussed herein. The porous titanium structure can be formed by additive manufacturing. The augment portion 150A can be made of a porous structure, e.g., of titanium formed by additive manufacturing.

The baseplate 108A should be accurately rotationally positioned about the axis 120 relative to the scapula prior to securing the baseplate 108A to the scapula. For example, the thicker portion of the baseplate 108A should be aligned with the more worn part of the scapula which the baseplate is configured to augment.

FIG. 5D illustrates a variation of a baseplate 108B that can be accurately inserted with an inserter instrument such as disclosed below in connection with FIGS. 13-13A. The baseplate 108B includes a porous layer mark 110 disposed in a porous layer portion of the second peripheral portion 149A. In some embodiments, the porous layer mark 110 can include a groove formed in the porous portion of the baseplate 108B. In some embodiments, the porous layer mark 110 can include a surface level mark formed on the porous portion of the baseplate 108B that provides only a visual indication. In some embodiments, the porous layer mark 110 can include a projection or a boss that protrudes radially from the surface of the porous portion of the baseplate 108B thus providing a visual as well as a tactile indication. The surgeon can visually align the porous layer mark 110 with the more worn portion of the glenoid prior to securing the baseplate 108B to the glenoid. FIG. 5D shows that the baseplate 108B can also or can alternatively have a taper layer mark 112. The taper layer mark 112 can be formed on a taper surface of the baseplate 108B, e.g., a conical peripherally configured to form a Morse taper with a glenosphere. The taper layer mark 112 can include a groove formed in the tapered portion of the baseplate 108B. In some embodiments, the taper layer mark 112 can include a surface level mark formed on the taper portion of the baseplate 108B. In some embodiments, the taper layer mark 112 can include a projection or a boss that protrudes radially from the surface of the taper portion of the baseplate 108B.

In one variation, the porous layer mark 110 is provided without providing the taper layer mark 112. This variation is advantageous in that the surface area and finish of the taper layer is preserved. In another variation, the taper layer mark 112 is provided without providing the porous layer mark 110. This variation is advantageous in that the formation of screw holes in the porous layer has little or no effect on the taper layer mark 112. Providing both the porous layer mark 110 and the taper layer mark 112 can provide a longer mark to enhance visibility and accuracy.

Although providing a mark directly on the implant is advantageous, one approach discussed further below in connection with FIGS. 13-17B is to provide an instrument with a rotation guide 604 that controls position of the baseplate 108A (or other rotationally asymmetric baseplate) with reference to a guide wire 742 without requiring a positioning mark on the baseplate.

I. Glenosphere Inserter Instruments

FIGS. 6-10 show an inserter 300 that can be used for convenient handling of the glenosphere 116. The inserter 300 is one example of a handling tool disclosed herein. The inserter 300 can include a handle assembly 304 that includes a handle member 306 disposed at a proximal end 308 of the inserter 300. In the context of the inserter 300, "proximal" and the proximal direction is at or toward the handle member 306 and "distal" or the distal direction of the inserter 300 is toward an impaction tip 400 (discussed below). The inserter 300 includes a distal end 312. A longitudinal axis 314 extends along the inserter 300, including from the proximal end 308 to the distal end 312. The proximal end 308 provides for surgeon handling and for application of an impaction force or load, e.g., at a strike plate 440 (discussed below). The distal end 312 interfaces with the glenosphere 116, e.g., by engaging the glenosphere and retaining it against the impaction tip 400 in a hands-free manner. For example, the inserter 300 can generate a proximally directed force against a glenosphere 116 to press the glenosphere against the impaction tip 400. The impaction tip 400 can provide a reaction force that holds the glenosphere 116 in place between the impaction tip 400 and a tip portion of the inserter 300 as discussed below.

The handle assembly 304 can include an outer elongate body 320 that extends from a proximal end 322 to a distal end 324 thereof. The outer elongate body 320 can include a lumen 326 that extends along the longitudinal axis 314 between the proximal end 322 and the distal end 324. The lumen 326 can vary in size with a smaller diameter portion for slideable support of a slender shaft of an inner elongate body 340 and a larger diameter portion for slideable support of an enlarged portion at the proximal end thereof. The larger diameter portion of the lumen 326 can also enable a spring or other compression member to be disposed therein between the outer elongate body 320 and the inner elongate body 340. The handle assembly 304 can include the strike plate 440. The strike plate 440 can be integrally formed with the outer elongate body 320. The strike plate 440 can be removably mounted to the outer elongate body 320. The strike plate 440 can be configured to provide access to the lumen 326, as discussed further below.

The handle assembly 304 can include a distal portion 328 configured to couple with the impaction tip 400. The impaction tip 400 can be removably mounted to the distal portion 328 of the outer elongate body 320. In one example, the distal portion 328 includes a concave distal opening 330 that is configured to receive a proximal projection 331 of the impaction tip 400. Engagement of the proximal projection 331 with the concave distal opening 330 can be by any suitable structure, such as threads 332. The proximal projection 331 can be connected with the concave distal opening 330 by a bayonet connection or by snap-fit, such as using a c-ring or other flexible connector.

In one example, the distal portion 328 of the outer elongate body 320 includes an enlarged outer profile. For example, the diameter of the distal end 324 of the outer elongate body 320 can be larger than an outer diameter of the outer elongate body 320 at a location proximal to the distal end 324. A mid-span of the outer elongate body 320 can be a reduced profile compared to the distal end 324. The mid-span of the outer elongate body 320 can be a reduced profile compared to the proximal end 322. The mid-span of the outer elongate body 320 can be a reduced profile compared to both the proximal end 322 and the distal end 324. A reduced profile mid-span can allow the inserter 300 to be inserted through a small incision in the area within the dashed box A (see FIG. 8). The inserter 300 can be widened at or toward the distal end 324 to provide good engagement with the glenosphere 116. The inserter 300 can be widened in a direction toward the proximal end 322 to enable the handle member 306 to be comfortably grasped by the surgeon. The side profile of the inserter 300 include a continuous concave curve as seen in FIGS. 7-10. The continuous concave curvature allows for moving soft tissue away from the inserter 300 in a less traumatic manner.

FIGS. 7 and 9-10H show that the inserter 300 can have an inner elongate body 340 which can comprise a unitary or monolithic body or can include an assembly. The inner elongate body 340 can include a proximal end 342 and a distal end 344. The inner elongate body 340 can include a lumen 346 extending therethrough, e.g., from the proximal end 342 to the distal end 344. The inner elongate body 340 can be centered on the longitudinal axis 314. The lumen 346 can be centered on the longitudinal axis 314. The lumen 346 can provide for direct access between the proximal end 308 to the distal end 312 of the inserter 300. The lumen 346 can be used to deliver a surgical wire or other control member, as discussed further below. A surgical wire is one example of a control member that can be separated from or can be separable from other components of the inserter 300. A variation of the inserter can include an integrated control member that can be moved to engage and disengaged the inner elongate body 340 with a glenosphere.

The inner elongate body 340 also can include an enlarged portion 348 at or adjacent to the proximal end 342. The enlarged portion 348 can include a distal facing surface 349. The outer elongate body 320 can include a proximal facing surface 321 disposed therein, e.g., within the region of the handle member 306. An enlarged portion of the lumen 326 within the region of the handle member 306 can allow the enlarged portion 348 to slide therein. The enlarged portion can extend proximally from the proximal facing surface 321 of the outer elongate body 320.

In some cases, the position of the enlarged portion 348 is at least partially controlled by operation of a compression spring 380 or other spring member. The compression spring 380 or other spring or resilient member can be configured to apply a traction force (e.g., a proximally oriented force) to the inner elongate body 340, e.g., to the distal facing surface 349. The compression spring 380 can be compressed between the proximal facing surface 321 of the outer elongate body 320 and the distal facing surface 349 of the inner elongate body 340. When the enlarged portion 348 is moved forward, the distal facing surface 349 acts on a first end 384 of the compression spring 380 to move the first end 384 of the compression spring 380 and to compress the spring against the proximal facing surface 321 of the outer elongate body 320. The proximal facing surface 321 is in contact with a second end 388 of the compression spring 380. The results is the storing of strain energy in the compression spring 380 which can be released as the compression spring 380 is restored upon moving the enlarged portion 348 and the rest of the inner elongate body 340 proximally within the lumen 326 of the outer elongate body 320. The traction force can be applied by the inner elongate body 340 to the glenosphere 116 and toward the handle member 306 when the glenosphere is coupled with the inner elongate body 340, e.g., is coupled with a deflectable tip portion 350 disposed at the distal end 344 thereof.

The lumen 346 can provide access to a space 352 in the vicinity of the deflectable tip portion 350. In one example, the space 352 allows the deflectable tip portion 350 to deflect when the space 352 is not occupied. Deflection of the deflectable tip portion 350 is restricted, reduced or eliminated when the space 352 is occupied. The space 352 can comprise a distal portion of the lumen 346, e.g., can be an area within the inserter 300 that is aligned with the lumen 346 along the longitudinal axis 314. The space 352 can be accessed by advancing a control member or device through an aperture 444 strike plate 440. The aperture 444 can be aligned with the lumen 346 to provide access from the strike plate 440 to the distal end 344 of the inner elongate body 340. As discussed further below, the aperture 444 and the lumen 346 can be configured to receive a surgical wire 460 (or other control member) to occupy or leave open the space 352 to control the deflection of the deflectable tip portion 350 in various phases of use of the inserter 300.

As noted above, the inner elongate body 340 is moveable within the lumen 326 of the outer elongate body 320. A device can be provided to facilitate this movement. For example, an actuator 362 can be provided that can be accessed from outside the outer elongate body 320 to move the inner elongate body 340 between multiple positions or along a range of positions. The actuator 362 can include an inner potion 364 that extends through the outer elongate body 320 and into the lumen 326. The inner portion 364 can extend to an inner end 366 engaged with the inner elongate body 340, e.g., with the enlarged portion 348. The inner end 366 can be a threaded end that can be threaded into a threaded hole in the enlarged portion 348. The inner end 366 can be secured to the enlarged portion 348 by other techniques, such as adhesive or interference fit. The actuator 362 can include an outer end 368 that is configured for finger actuation. The outer end 368 can include a profile that is enlarged compared to the inner portion 364. The outer end 368 can include a knurled surface to enhance finger gripping in use.

The inserter 300 can have a control feature to provide clear, tactile indications of the position of the actuator 362. The indication of the position of the actuator 362 can indicate to the user the position or state of the deflectable tip portion 350 which can be used to grip, hold or retain the glenosphere 116. In one example a slot 370 is provided in a side surface 371 of the outer elongate body 320. The slot 370 can be elongate in a direction corresponding to the longitudinal axis 314 of the inserter 300. The slot 370 can have a width in a direction transverse to the elongate direction of the slot 370 that is wide enough to allow the actuator 362 to pass therethrough. The slot 370 can have a first position 372 and a second position 374 disposed proximally, e.g., proximal of the first position 372, along the longitudinal axis 314 of the inserter 300. For example, the slot 370 can have an elongate oval configuration in which the first position 372 is at a distal end of the oval and in which the second position 374 is at a proximal end of the oval. The slot 370 can have a third position 376 disposed longitudinally between the first position 372 and the second position 374. The third position 376 can be circumferentially displaced from the first position 372, the second position 374. The third position 376 can be circumferentially offset from the slot 370 or another track disposed between the positions 372, 374. The third position 376 can provide a hands-free spring-loaded position, e.g., where the deflectable tip portion 350 is extended to engage a glenosphere 116. The inner elongate body 340 can be released from the third position 376 toward the second position 374 after engaging the glenosphere 116 to draw the glenosphere into engagement with an impaction tip 400, as discussed further below.

Although the inserter 300 is shown with one circumferentially displaced position, e.g., the third position 376, there can be provided a plurality of circumferentially off-set positions corresponding to different degrees of extension of the deflectable tip portion 350 from the tip of the outer elongate body 320. If more than one circumferentially offset position is provided, one can be circumferentially off set in a first direction and another can be provided in a second direction different from, e.g., opposite of, the first direction.

As will be discussed in greater detail below, the positions 372, 374, 376 provide different control positions of the inserter 300. In one example, the first position 372 is the most fully advanced position of the actuator 362 of the inserter 300. When the actuator 362 is in the first position 372 the distal portion 328 is fully extended from the impaction tip 400 of the inserter 300. The movement of the actuator 362 to the first position 372 causes the enlarged portion 348 of the inner elongate body 340 to move distally. Such movement moves the distal facing surface 349 toward the proximal facing surface 321 within the lumen 326. This movement causes the compression spring 380 to be compressed between the proximal facing surface 321 of the outer elongate body 320 and the distal facing surface 349 of the inner elongate body 340. The actuator 362 can be moved from the first position 372 to the third position 376. When in the third position 376 some but not all of the strain energy stored in the compression spring 380 is released. However, the remaining strain energy in the compression spring 380 provides an on-going traction load toward the proximal end 308 of the inserter 300. Before or after delivery of the glenosphere, the actuator 362 can be placed in the second position 374 in which the strain energy that may be stored in the compression spring 380 can be substantially released upon movement of the enlarged portion 348 and the rest of the inner elongate body 340 toward the proximal end 308 of the inserter 300.

In one embodiment an inner assembly 382 of the inserter can be provided that includes the inner elongate body 340, the deflectable tip portion 350, and the enlarged portion 348. These components can be integrally formed, e.g., as a monolith. Some or all of these components can be separate components that can be assembled together.

In some embodiments an outer assembly 442 of the inserter can be provided that includes the outer elongate body 320, the handle member 304, and the impaction tip 400. The outer assembly 442 can include the strike plate 440 in some embodiments.

The impaction tip 400 can include a distal portion 404 and a proximal portion. The distal portion 404 can be flat or can have a curvature configured to match one or more sizes of the glenosphere 116.

Figure 10:
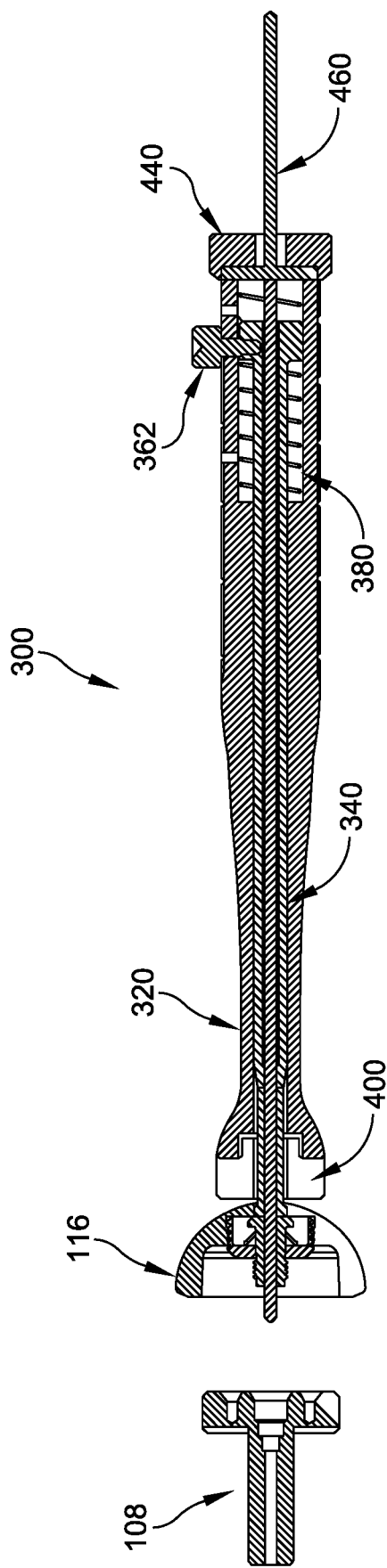
FIG. 10 is a cross-sectional view similar to that of FIG. 9 illustrating how a glenosphere component can be held at a distal portion of the inserter of FIG. 6.
Figure 10A:
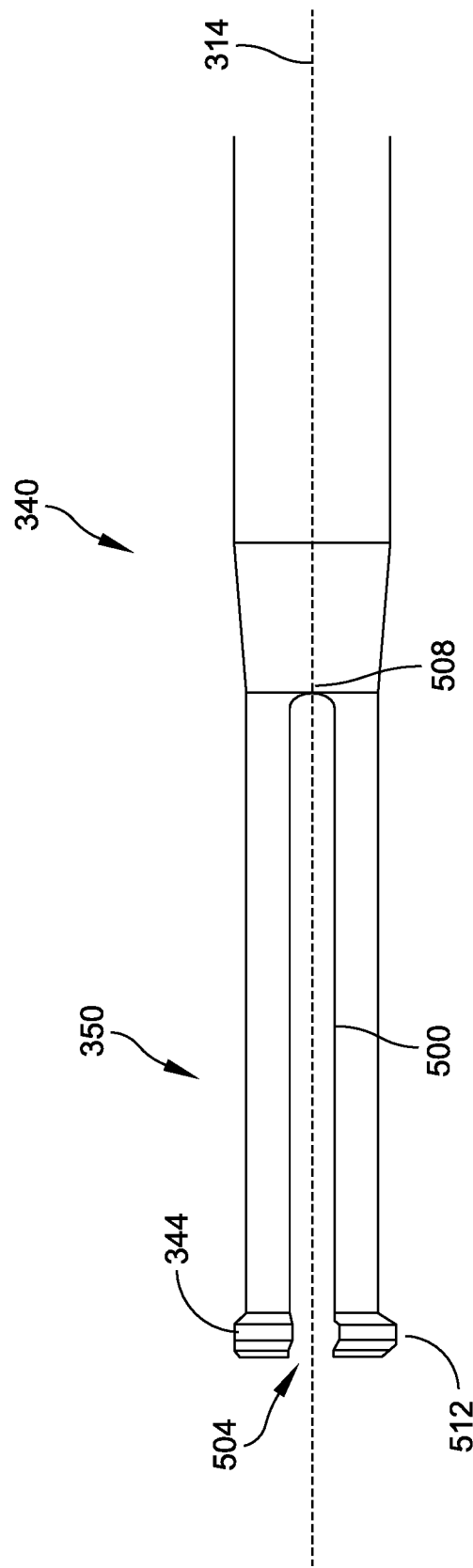
FIG. 10A is a side view of a deflectable tip that can provide a retention portion to a handling too, such as the inserter of FIG. 6.
Figure 10B:
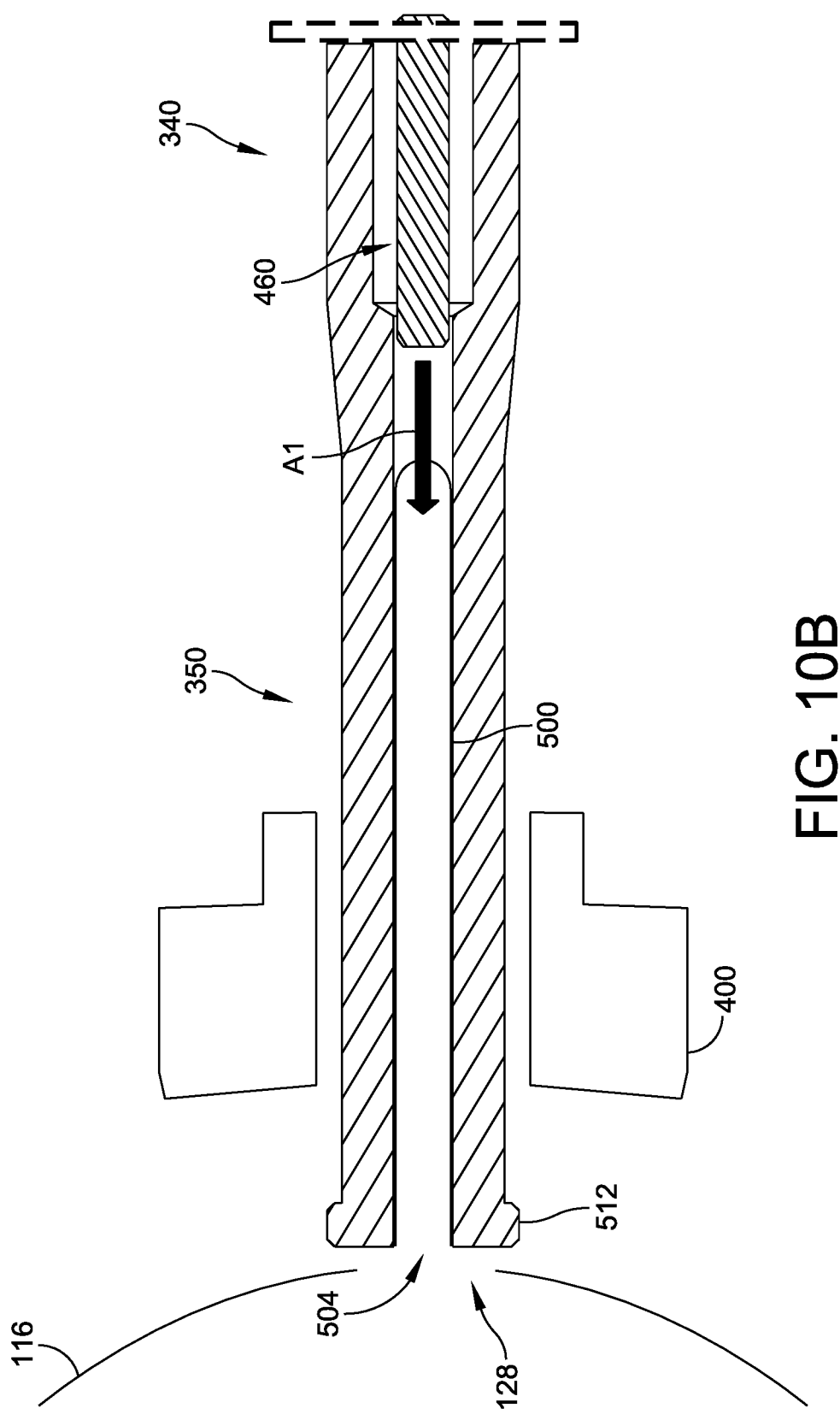
FIG. 10B is schematic showing a cross-section of the deflectable tip portion of the inserter of FIG. 6 with a distal portion of a surgical wire disposed proximal thereto and a distal end thereof being disposed adjacent to a glenosphere.
Figure 10C:
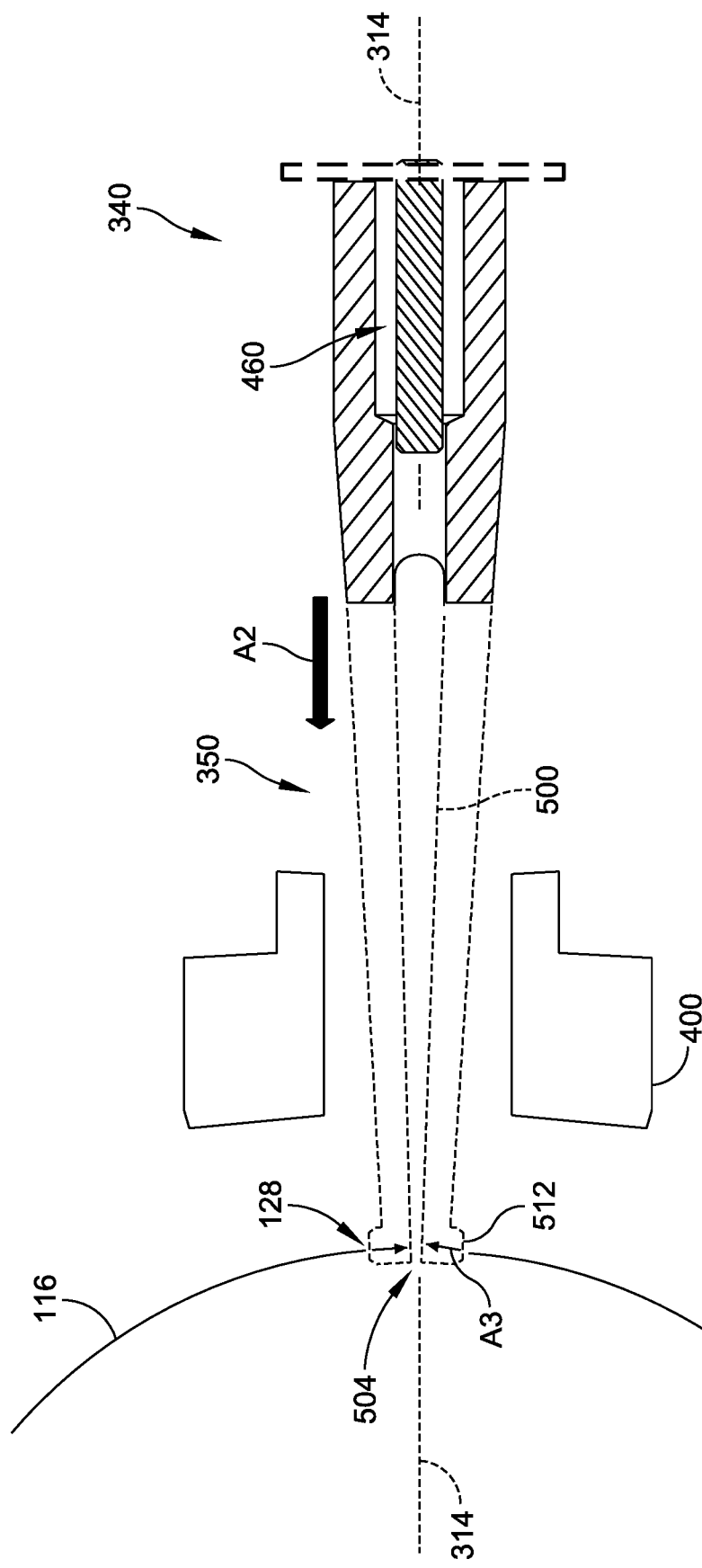
FIG. 10C shows deflection of the tip portion of the inserter of FIG. 6 following engagement of the tip portion with an opening in the glenosphere.
Figure 10D:
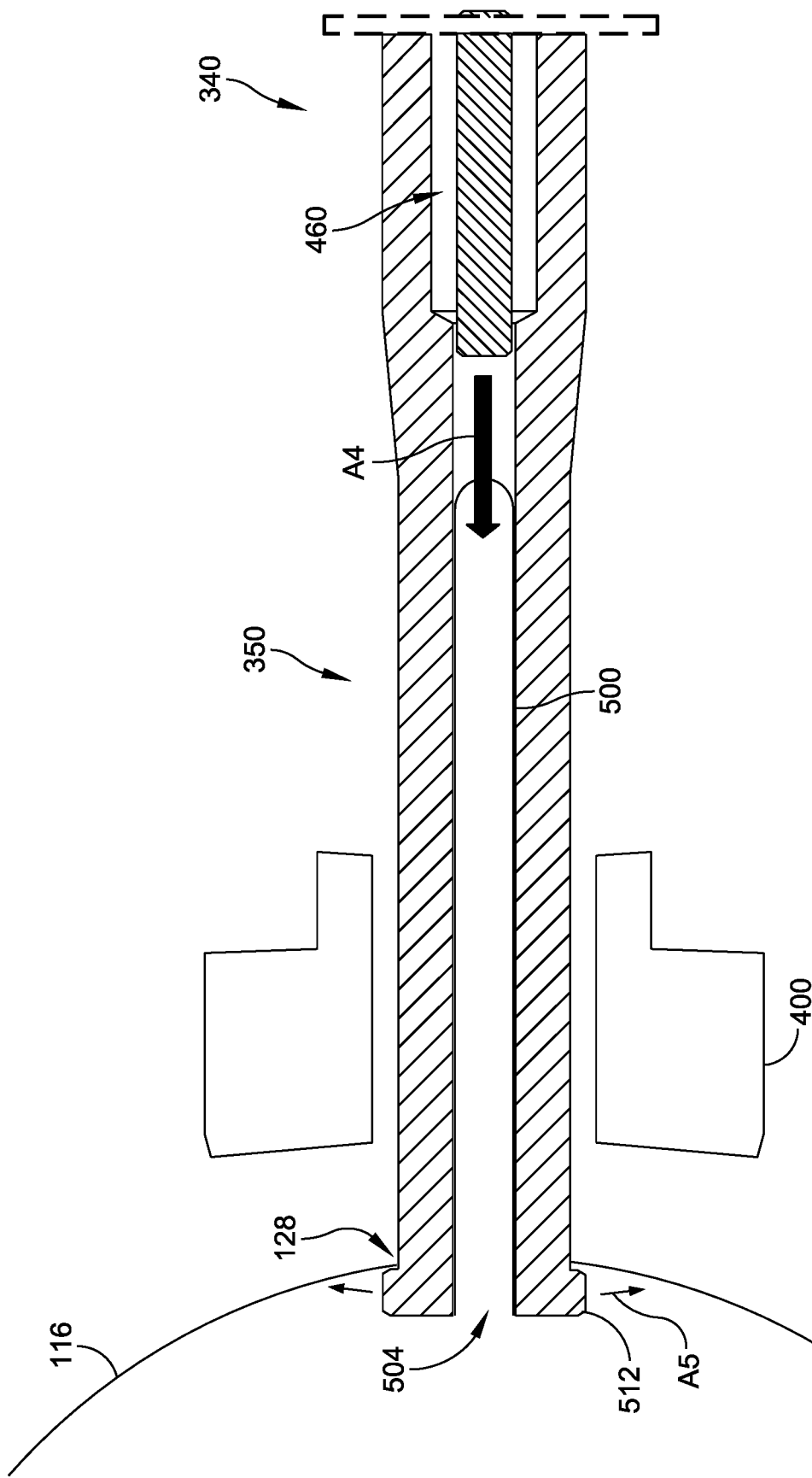
FIG. 10D shows restoration of (e.g., expansion of) at least some of the deflection of the tip portion of the inserter of FIG. 6 following advancement of the tip portion through the opening in the glenosphere.
Figure 10E:
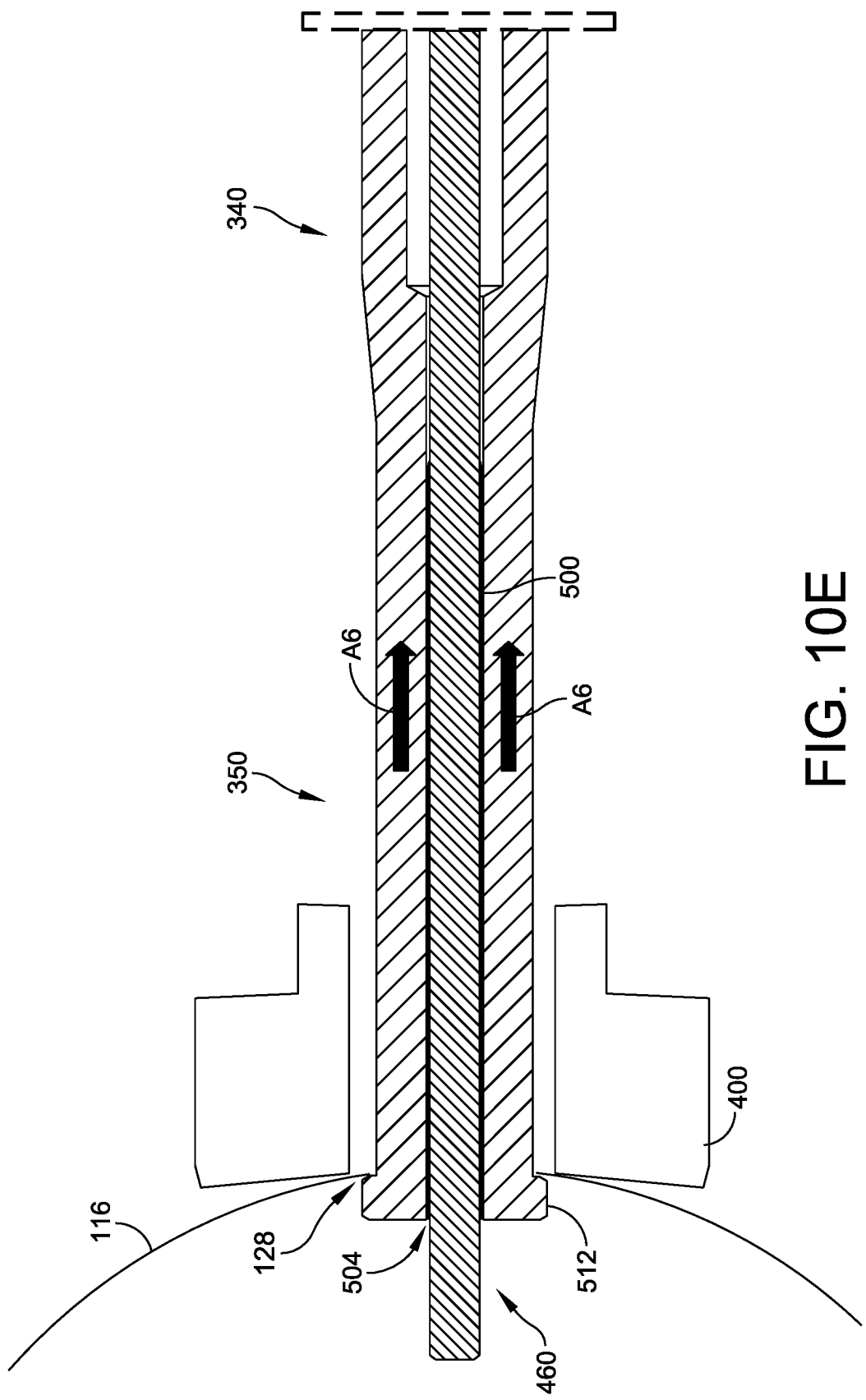
FIG. 10E shows the surgical wire positioned in or distal to the deflectable tip portion and an impaction tip of the inserter of FIG. 6 engaged with a glenosphere.
Figure 10F:
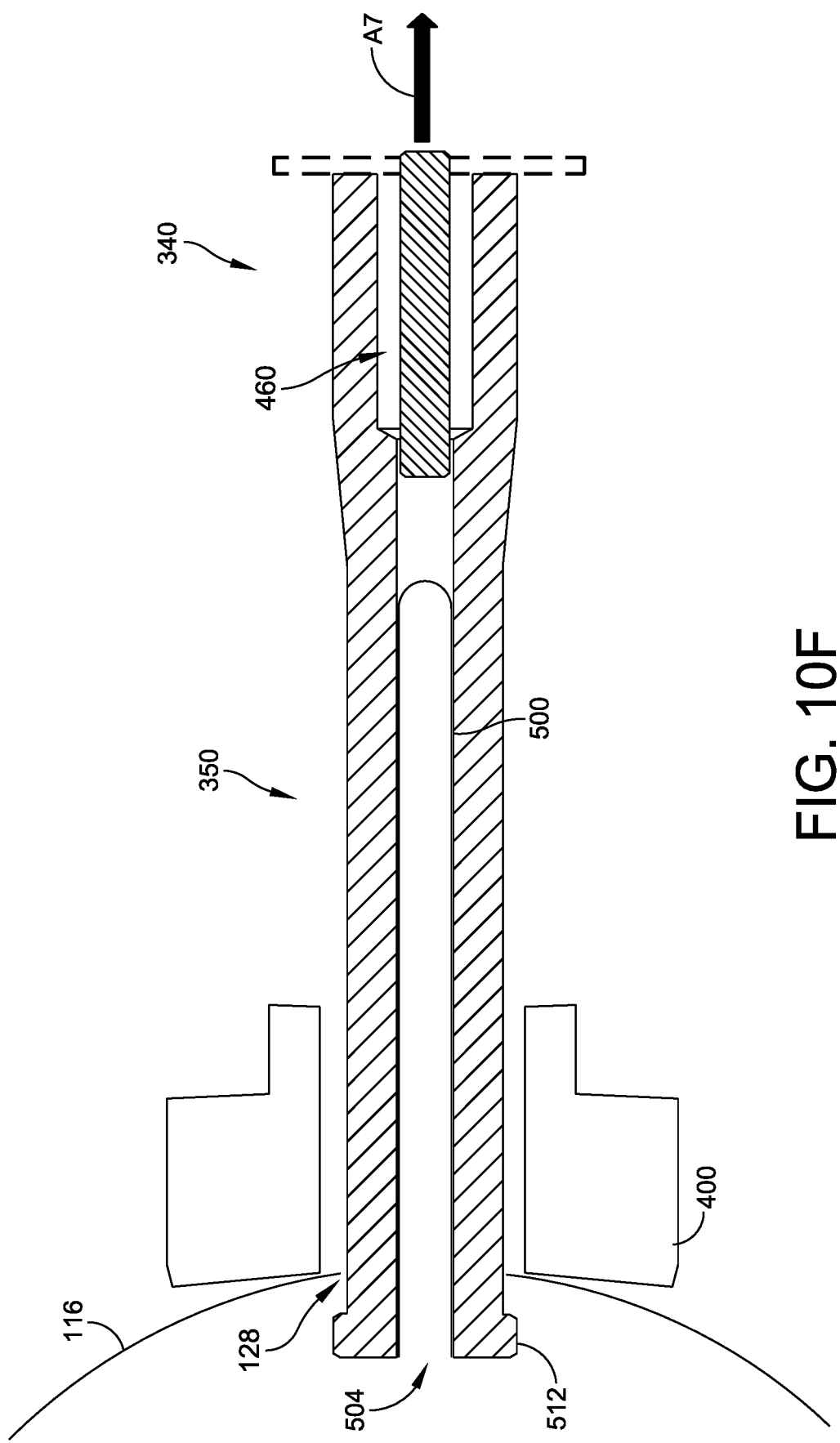
FIG. 10F shows the surgical wire withdrawn out of the deflectable tip portion of the inserter of FIG. 6, just prior to impaction.

FIGS. 10-10F show the inserter 300 and how it can be used as a handling tool to handle and to deliver a glenosphere 116 to a baseplate mounted to a glenoid surface. FIG. 10 shows components of the inserter 300 assembled and the inserter in a configuration for holding the glenosphere 116. FIG. 10 also shows a baseplate 108 that would be implanted separately (see FIG. 5A). The baseplate 108 can be secured to the scapula using the anchor 104 and one or more peripheral screws, or by other techniques. The glenosphere 116 can be secured to the baseplate 108A or the baseplate 108B. The baseplates disclosed herein can be placed using the instrument discussed in connection with FIGS. 13-17B. Although the discussion of the method of using the inserter 300 generally refers to the baseplate 108, the same or a similar method can be applied to the baseplate 108A or the baseplate 108B. Although only the baseplate 108 may be referenced, the same description applied to the rotationally asymmetric baseplates unless otherwise stated. The glenosphere 116 can be temporarily but securely retained by the inserter 300 in methods illustrated in FIGS. 10A-10F.

Figure 11:
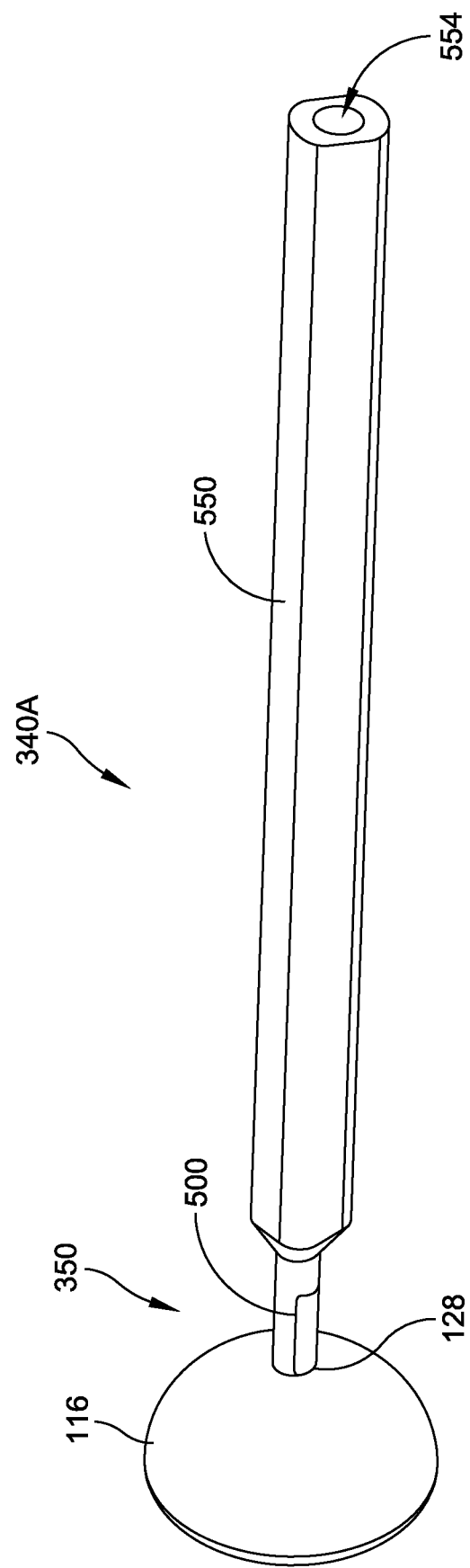
FIG. 11 shows an embodiment of a handling tool that includes an elongate body that can be combined with and/or separable from an outer elongate body or other impaction load delivering structure.
Figure 12:
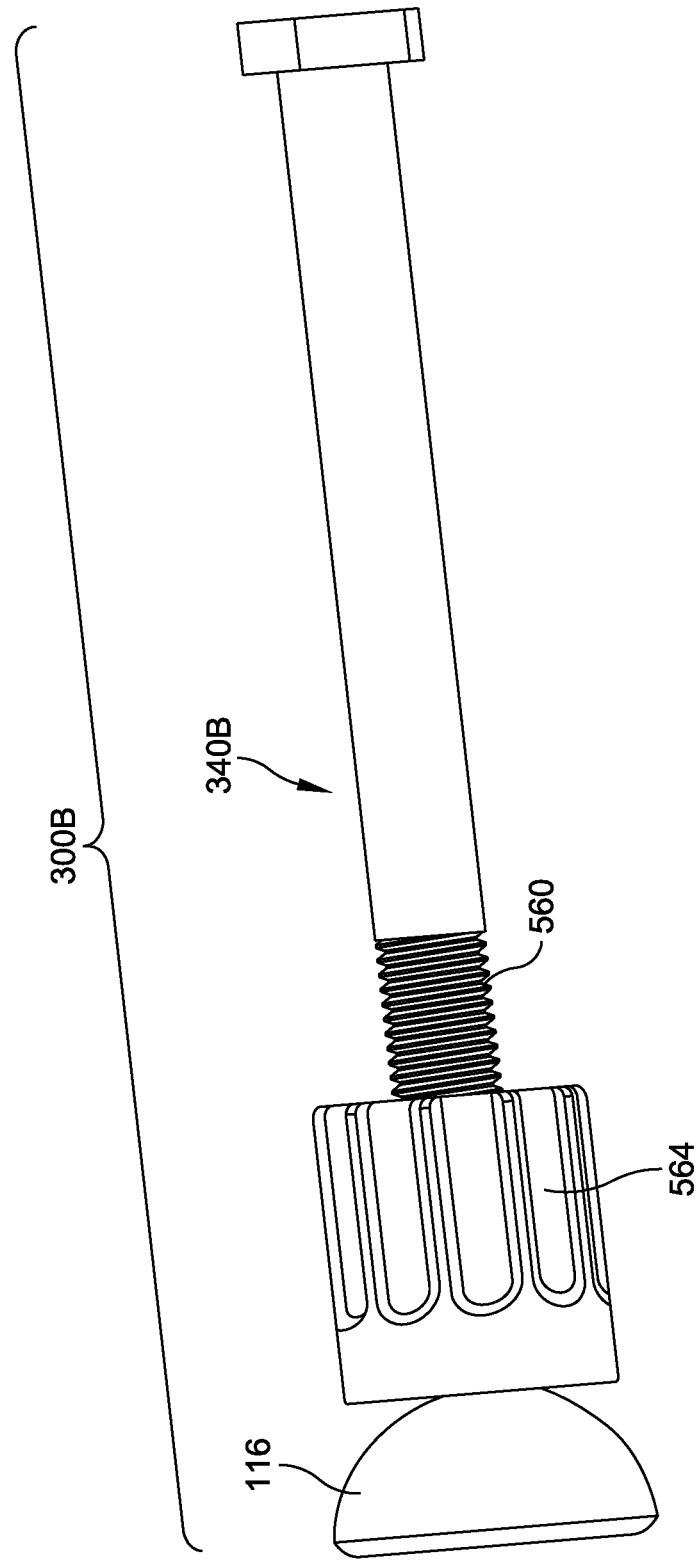
FIG. 12 shows another embodiment of a handling tool that can include a separator that is coupled with a threaded surface of an elongate body to disengage a glenosphere from the elongate body.

FIG. 10A shows a partial view of a distal portion of the inner elongate body 340. Although the discussion of the use of the inner elongate body 340 in these methods is in the context of the inserter 300, the elongate body is present in other handling tools that may not include the outer elongate body 320, e.g., as shown in FIGS. 11-12. However, some aspects of these methods also apply to the embodiments of FIGS. 11-12. The inner elongate body 340 has a deflectable tip portion 350 that is adjacent to, e.g., extending proximally from a distal end 344 of the inner elongate body 340. The deflectable tip portion 350 can have any suitable structure to make it flexible. For example, the deflectable tip portion 350 can include one or more, e.g., two slots 500. FIG. 10A shows that the slot(s) 500 can extend from a distal end 504 to a proximal end 508 of the slot(s) within the deflectable tip portion 350. The slot(s) 500 allow the distal end 504 to be deflected toward the longitudinal axis 314 of the inserter 300. The proximal end 508 can include a radius portion, e.g., a rounding to facilitate the resilient deflection of distal end 504.

The deflectable tip portion 350 can include an enlarged portion 512 disposed at the distal end 344. The enlarged portion 512 can be used to deflect the deflectable tip portion 350 as discussed in greater detail below. The profile, e.g., diameter, of the deflectable tip portion 350 can vary from that of a portion of the inner elongate body 340 disposed proximally of the deflectable tip portion 350. For example, the inner elongate body 340 can have an outer diameter in a proximal section and in a tapered portion between the proximal section and the deflectable tip portion 350. The portion of the deflectable tip portion 350 along the slot 500, e.g., between the proximal end 508 and the enlarged portion 512 can have a smaller diameter than that of the tapered portion of the inner elongate body 340. The smaller diameter of the deflectable tip portion 350 provides clearance between the deflectable tip portion 350 and the inner periphery of the central aperture 128 of the glenosphere 116. The clearance can allow the deflectable tip portion 350 to slide within the aperture 128 in an undeflected or minimally deflected state.

FIG. 10B shows the deflectable tip portion 350 of the inner elongate body 340 and also shows the impaction tip 400 schematically. The outer elongate body 320 and other components of the outer assembly 442, which can include the handle member 304 and the strike plate 440, have been removed to simplify the drawing. But these components generally are present as discussed further below. The enlarged portion 512 of the deflectable tip portion 350 can be advanced relative to the impaction tip 400 such that the enlarged portion 512 is exposed at the distal end 312 of the inserter 300. This can be achieved by any suitable approach, such as by advancing the actuator 362 within the slot 370 to or toward the first position 372. As the actuator 362 is moved toward the first position 372 of the slot 370 the enlarged portion 512 can be sufficiently advanced relative to a distal face of the impaction tip 400 to allow the enlarged portion 512 to engage the glenosphere 116. For example, the distal face of the enlarged portion 512 can be advanced toward the surface of the glenosphere 116 around the aperture 128. The open status of the lumen 346 in the vicinity of the deflectable tip portion 350 allows the tip portion to be deflected.

The actuator 362 can be positioned within the slot 370 to a position in which it is held in place, or locked. Such a position can be any in which the surgeon need not continue to hold the actuator 362 and yet the inner elongate body 340 is advanced relative to the outer elongate body 320. As discussed above, some embodiments can have a compression spring 380 that stores strain energy when the inner elongate body 340 is advanced. Accordingly, a force may be needed to hold the actuator 362 in a distal position corresponding to the position inner elongate body 340 shown in FIG. 10B. For example, the actuator 362 can be shifted circumferentially into the third position 376 such that a circumferential surface of the slot 370 can apply a force opposing the spring force of the compression spring 380. This allows the surgeon to release the actuator 362 and to focus on other aspects of the method of impacting the glenosphere 116.

In one technique, an arrow A1 shows movement of a surgical wire 460 in the lumen 346 to a location proximal to the deflectable tip portion 350. A distal end of the surgical wire 460 can be placed just proximal to the proximal end 508 of the slot 500, in one example. With the surgical wire disposed adjacent to the deflectable tip portion 350 the surgical wire 460 can be ready to be moved to a position within or distal to the deflectable tip portion 350.

FIG. 10C shows an arrow A2 corresponding to a distally directed movement or force applied to the inserter 300 upon contacting the enlarged portion 512 with the surface of the glenosphere 116 around the aperture 128. The movement of force corresponding to arrow A2 causes the distal end 504 at, within and proximal to the enlarged portion 512 to be deflected toward the longitudinal axis 314. The deflection of the enlarged portion 512 can be facilitated by an angled or chamfered surface at the distal face of the enlarged portion 512. The movement of the enlarged portion 512 is shown by an arrow A3. The arrow A3 shows a load being applied to the enlarged portion 512. The load can result in strain energy being stored in the deflectable tip portion 350. The strain energy can be stored until the enlarged portion 512 is disposed distal of the aperture 128 and within a cavity (see FIG. 4) within the glenosphere 116.

FIG. 10D shows a restoring of the deflectable tip portion 350 toward an undeflected position or configuration. An arrow A5 shows the movement of the deflectable tip portion 350 corresponding to strain energy being released from the deflectable tip portion 350. As noted above, the undeflected state or configuration of the deflectable tip portion 350 can result when the enlarged portion 512 is disposed beyond (e.g., distal to) the aperture 128 of the glenosphere 116. In this position the portion of the deflectable tip portion 350 with the smaller diameter is aligned with the aperture 128. There can be a clearance provided that allows the deflectable tip portion 350 to be fully undeflected. In some embodiments, the clearance can be minimal or negative such that when the enlarged portion 512 is disposed within the cavity of the glenosphere 116 the deflectable tip portion 350 is somewhat deflected toward the longitudinal axis 314.

FIG. 10D shows an arrow A4 that corresponds to moving the surgical wire 460 distally within the lumen 326 of the outer elongate body 320. The movement of the surgical wire 460 according to the arrow A4 can include shifting a distal end of the surgical wire 460 from proximal to the proximal end 508 of the slot 500 to a location at or distal to the enlarged portion 512. If the clearance between the outer diameter of the deflectable tip portion 350 proximal of the enlarged portion 512 and the surface of the glenosphere 116 around the aperture 128 is negligible or negative, e.g., the deflectable tip portion 350 is somewhat deflected when the enlarged portion 512 is in the cavity of the glenosphere 116 then the advancement of the surgical wire 460 may result in some compression of the outer surface of the deflectable tip portion 350 adjacent to the enlarged portion 512 and as a result a gripping of the periphery of the aperture 128.

FIG. 10E shows the surgical wire 460 fully advanced through the enlarged portion 512 to a position within the cavity of the glenosphere 116. FIG. 10 shows that the distal end of the surgical wire 460 can be distal to an assembly including the glenosphere 116. For example, the distal end of the surgical wire 460 can extend through the deflectable tip portion 350, the compression washer 260 and the threaded member 264 which retains the compression washer in the interior of the glenosphere 116. The surgical wire 460 can even be inserted into the locking screw when it is pre-assembled in the glenosphere 116. The surgical wire 460 can be advanced into a blind hole or a lumen that extends from a proximal end to a distal end of the locking screw 256.

In an advanced position or configuration, the surgeon can control the glenosphere 116 from the proximal end 308 of the inserter 300, e.g., by grasping the actuator 362 handle member 306. In one step between what is shown in FIGS. 10D and 10E the surgical wire 460 may be advanced distally as in FIG. 10E but the impaction tip 400 may be spaced proximally from the glenosphere 116 as in FIG. 10D. To move the impaction tip 400 into contact with the convex surface of the glenosphere 116, the actuator 362 can be moved out of the third position 376 of the slot 370 and can be allowed to return toward the second position 374 of the slot. The movement from the third position 376 to the second position 374 can result in a motion indicated by an arrow A6 resulting in the gap between a distal surface of the impaction tip 400 and the convex articular surface of the glenosphere 116 shown in FIG. 10D being closed such that there is contact between these surfaces, as shown in FIG. 10E. The compression spring 380 can release strain energy such that the closing of the gap can be automatic, e.g., without any continued movement by the surgeon. Of course, the inserter 300 could be configured without a spring such that the movement of the actuator 362 could be by surgeon finger action in another embodiment. Providing a release of strain energy from the compression spring 380 can result in a continued force (also in the direction of the arrow A6) being applied at the interface between the distal surface of the impaction tip 400 and the convex articular surface of the glenosphere 116, which can provide positive control of the position, location and orientation of the glenosphere 116 while the glenosphere 116 is engaged with the inner elongate body 340 and the actuator 362 is in the third position 376 of the slot 370.

The control provided in the configuration of FIG. 10E allows the surgeon to move the glenosphere 116 through an incision in the patient skin toward the baseplate 108 and onto the baseplate which has been placed on or adjacent to the glenoid (see FIG. 5A). In the case of the rotationally asymmetric baseplates 108A, 108B the baseplates are positioned such that any augment portion is secured at a worn portion of the scapula, e.g., according to a pre-operative plan. The glenosphere 116 can be placed on the baseplate 108 such that mating tapered surface 156 of the baseplate 108 and 248 of the glenosphere 116 can be contacting each other. Initially, these tapered surfaces loosely contact each other and the surgeon can remove or reposition the glenosphere 116 on the baseplate 108 or even remove a first glenosphere 116 and place another one, e.g., of a different size.

FIG. 10F shows that the surgical wire 460 can be removed as indicated by an arrow A6 just prior to initially securing the glenosphere 116 to the baseplate 108. In this position the surgeon can maintain the initial contact between the tapered surfaces of the baseplate 108 and the glenosphere 116 by applying a distally (or medially) directed force through the outer elongate body 320 and the impaction tip 400 to the convex surface of the glenosphere 116. Once the surgical wire 460 has been withdrawn from the deflectable tip portion 350 the inserter 300 can be impacted at the strike plate 440. The surgical wire 460 can be fully withdrawn from the inserter 300, e.g., out of the aperture 444 thereof.

In FIG. 10G, the application of an impaction force is indicated by an arrow A8. The force applied can be by an impactor striking the strike plate 440. The force can be conveyed through the outer elongate body 320 to the impaction tip 400. As discussed above, the inner elongate body 340 is slideable within the outer elongate body 320. The slideable coupling and the compression spring 380 substantially isolate the inner elongate body 340 from the load applied to the strike plate 440. As a result, there can be some distal displacement of the impaction tip 400 relative to the enlarged portion 512 upon application of the impaction force. In some cases, an impaction load on the strike plate 440 can simultaneously engage a glenosphere with a glenoid baseplate (e.g., any of the baseplates 108, 108A, 108B) and disengage the retention portion from the glenosphere. The movement is facilitated by the length of the slot 370 in the side surface 371 of the handle member 306 and the travel of the actuator 362 therein. As the impaction tip 400 moves relative to the enlarged portion 512 the deflectable tip portion 350 is allowed to deflect toward the longitudinal axis 314 as indicated by an arrow A9. The deflection toward the longitudinal axis 314 decreases the profile of the enlarged portion 512 such that it is smaller than the aperture 128 of the glenosphere 116.

Figure 10H:
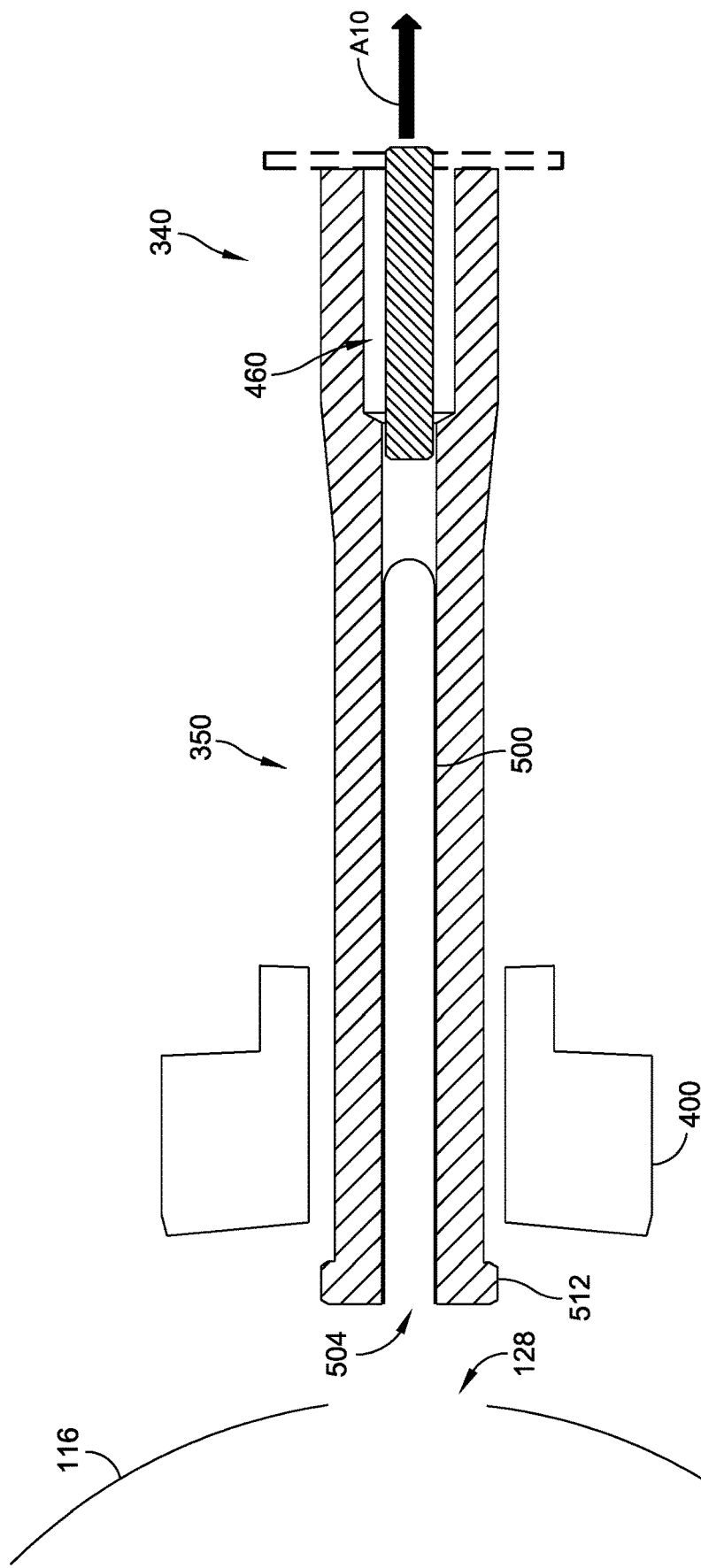
FIG. 10H shows removal of the inserter from a surgical site following impaction.

FIG. 10H shows the removal of the inserter 300 from the surgical incision as indicated by an arrow A10. The surgeon can grasp the handle member 306 and withdraw the entire inserter 300 out of an incision through which the inserter 300 is placed.

After the glenosphere 116 has been impacted onto the baseplate 108 the reverse glenoid implant assembly 100 is initially assembled. If the reverse glenoid implant assembly 100 is to be completely assembled the locking screw 256 can be advanced using a driver, as illustrated in FIG. 5B. The locking screw 256 can be advanced following removal of the inserter 300 from the surgical incision.

FIG. 11 shows another handling tool in which an elongate body 340A can hold and control the glenosphere 116 and can be used separately from an impaction load applying device or structure. The elongate body 340A is similar to the inner elongate body 340 except as described differently below. The elongate body 340A includes a deflectable tip portion 350 which can be made flexible by a slot 500. The elongate body 340A can have an outer surface 550 that can be exposed in use. The elongate body 340A can be used to advance the glenosphere 116 through an incision and onto a baseplate 108. The control of the glenosphere 116 on the elongate body 340A can be similar to that described above in connection with the inserter 300. For example, the surgical wire 460 can be advanced through a control lumen 554 of the elongate body 340A to a position within the deflectable tip portion 350 to prevent deflection toward a longitudinal axis of the elongate body 340A. In other embodiments, the deflectable tip portion 350 can apply sufficient control force to the glenosphere 116 without use of a surgical wire 460. In one case, the deflectable tip portion 350 can be deflected toward the longitudinal axis of the elongate body 340A by advancing the surgical wire 460 or another control member into the control lumen 554. In another approach, an impacting device can be advanced over the outer surface 550 of the elongate body 340A, e.g., after the elongate body has been placed through the incision and the glenosphere 116 placed onto the baseplate 108. The impacting device can push the glenosphere 116 off of the deflectable tip portion 350 of the elongate body 340A, in a manner similar to that discussed above. The elongate body 340A can be combined with an impacting member to from an inserter assembly 300A along with the impacting member.

FIG. 12 shows another example of a glenoid handling tool, which can include an inserter assembly 300B that includes an elongate body 340B similar to the inner elongate body 340. The elongate body 340B can include similar structures, such as the deflectable tip portion 350. The elongate body 340B can include a control lumen extending from a proximal end to a distal end thereof. The elongate body 340B can include a threaded surface 560 disposed adjacent to a distal end thereof. The inserter assembly 300B also can include a separator 564 disposed on a distal end of the inserter assembly 300B. The separator 564 can have a threaded passage therein such that rotation of the separator 564 can be advanced by rotation of the separator 564 about the longitudinal axis of the elongate body 340B. Such rotation can cause a distal surface of the separator 564 to engage the convex articular surface of the glenosphere 116. The engagement of these surfaces can provide relative motion between the elongate body 340B and the glenosphere 116 to move a distal end of the elongate body 340B out of engagement of the glenosphere 116. The elongate body 340B can include the deflectable tip portion 350 and advancement of the separator 564 can cause the enlarged portion 512 to be deflected toward the longitudinal axis of the elongate body 340B to allow the enlarged portion 512 to be moved out of the glenosphere 116.

II. Baseplate Inserter Instruments

As discussed above, part of treating shoulder joint conditions can involve implanting a baseplate 108, 108A, 108B at the glenoid. FIGS. 13-17B illustrate embodiments and variants of baseplate inserters that can be used to accurately and conveniently implant baseplates.

Figure 13:
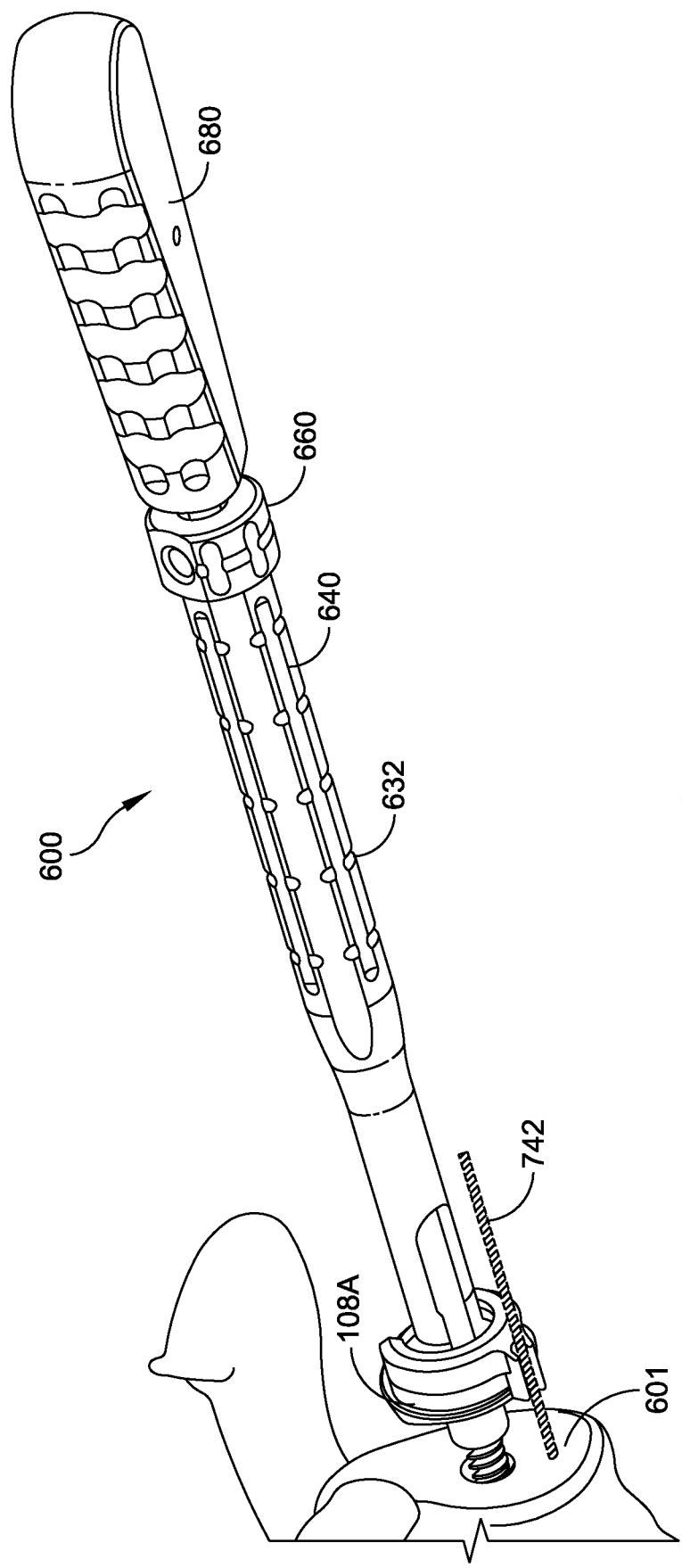
FIG. 13 shows a perspective view of one embodiment of a baseplate inserter with a rotation guide being used to insert a baseplate into a glenoid.

FIG. 13 shows a glenoid cavity 601 onto and/or onto which a baseplate 108A is to be implanted. The glenoid cavity 601 can have an opening formed therein to receive the anchor member 104. In some techniques, the baseplate 108A and the anchor member 104 can be delivered together by the baseplate inserter 600. The anchor member 104 can be a unit with the baseplate 108A or a separate, separately moveable component.

Figure 13A:
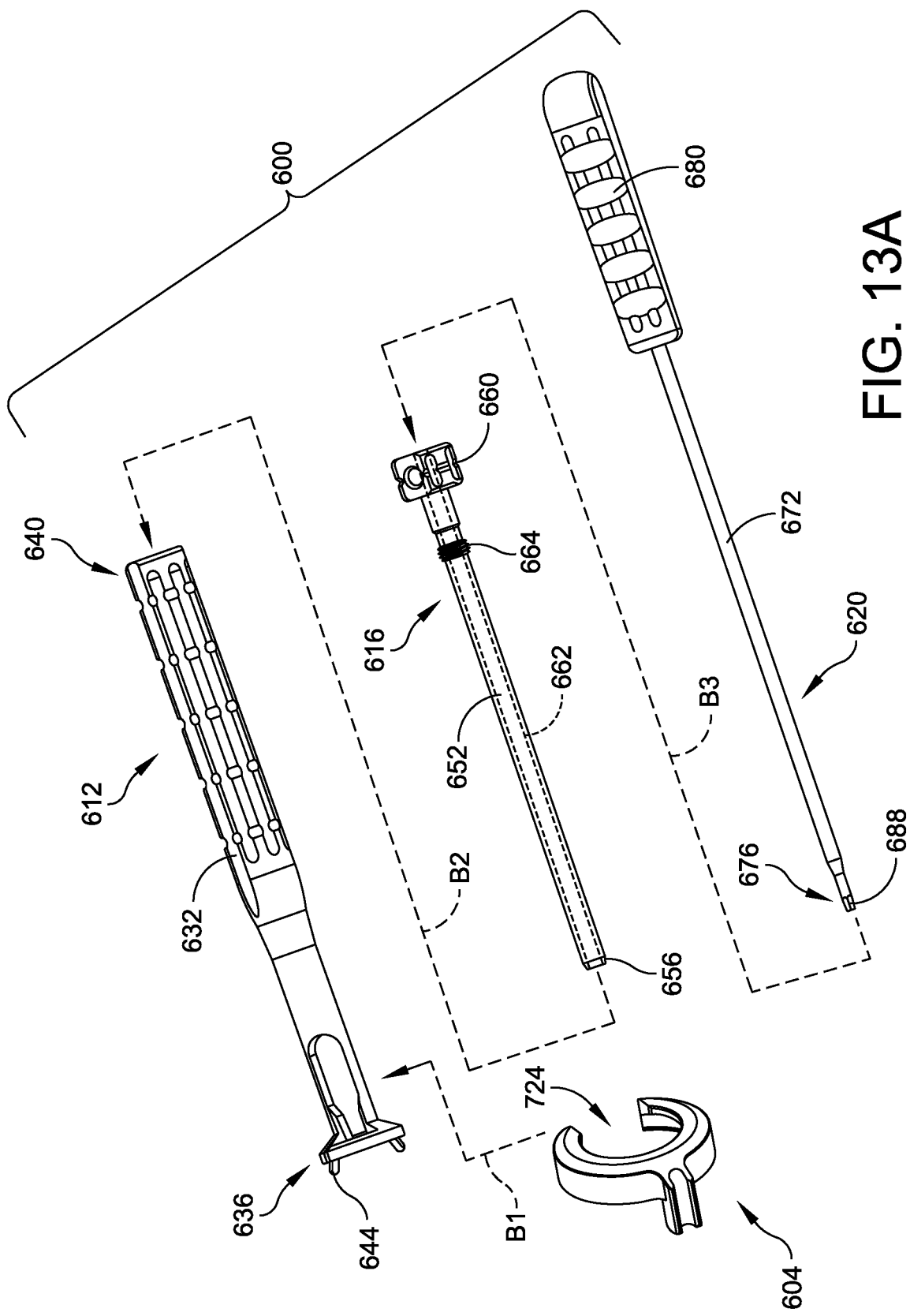
FIG. 13A is an exploded view of one embodiment of a baseplate inserter of FIG. 13 including the rotation guide configured to rotationally align a baseplate.

FIGS. 13 and 13A show that the baseplate inserter 600 can include separable components. The baseplate inserter 600 can include a rotation guide 604 that can be applied to components of the baseplate inserter 600 to assist in placement of a rotationally asymmetric baseplate 108A. The rotation guide 604 can include a portion to secure to the baseplate inserter 600 and a portion to guide the orienting of the baseplate 108A relative to the glenoid cavity 601. The baseplate inserter 600 can include an outer shell 612, an inner shell 616, and an inner shaft assembly 620. The inner shaft assembly 620 can be disposed in, e.g., removably inserted into, a lumen 662 of the inner shell 616. The inner shaft assembly 620 can be used to control a position of an anchor member 104 and/or the baseplate 108A. The inner shell 616 can be slideably disposed in the outer shell 612. The inner shell 616 can have a first position and a second position within the outer shell 612. The first position can dispose a first end 656 of the inner shell 616 closer to a first end 636 of the outer shell 612 than is the position of the first end 656 when the inner shell 616 is in the second position. The second position is shown in FIG. 14D below. The first position is discussed in greater detail below in connection with FIG. 14D. The inner shell 616 can be configured to actuate a glenoid implant retention feature 644 to a retention configuration when the inner shell 616 is in the first position.

FIG. 13A shows additional detail of the outer shell 612. The outer shell 612 includes an elongate body 632 that extends between the first end 636 and a second end 640. The outer shell 612 includes the glenoid implant retention feature 644, which is disposed on or at a first end 636 of the elongate body 632. The glenoid implant retention feature 644 in FIG. 13A includes prongs or projections and a slotted ring configuration that can be deflected from a release configuration to a retention configuration. The release configuration is for disengaging the baseplate 108A. The retention configuration is for securely holding the baseplate 108A. The prongs of the glenoid implant retention feature 644 can be angled away from each other and can be configured to be received in angled channels from on a lateral side of any of the baseplates 108, 108A, 108B. The prongs of the glenoid implant retention feature 644 can be mounted to an expandable retention end portion that can expand, e.g., be deflected, to cause the prongs to engage corresponding channels in the baseplate 108A. The rotation guide 604 can be used with other inserter structures that may not include the prong and channel engagement provided by the glenoid implant retention feature 644 to retain and control the position of the baseplates 108, 108A, 108B.

FIG. 13A shows additional detail of the inner shell 616. The inner shell 616 includes an elongate body 652 that extends between the first end 656 and a second end 660. The elongate body 652 includes the lumen 662 disposed therethrough. The lumen 662 can extend from the first end 656 to the second end 660. The lumen 662 can allow passage of a distal portion of the inner shaft assembly 620 therethrough. The elongate body 652 can have a shell interface 664 disposed on an outer surface thereof. The shell interface 664 can include any feature configured to axially secure the inner shell 616 to the outer shell 612. The shell interface 664 can include threads to engage corresponding threads formed or disposed on an inside surface of the elongate body 632, e.g., in a lumen thereof. The second end 660 can include an enlarged body or other handle structure configured to facilitate rotation of the inner shell 616 to engage the shell interface 664 disposed on the outer surface of the elongate body 652 with a corresponding feature on the inside of the elongate body 632.

The inner shaft assembly 620 can include an elongate body 672 that extends between a first end 676 and a second end 680. The elongate body 672 can include an inner shaft 684 configured to be disposed in the lumen 662 of the inner shell 616. The inner shaft assembly 620 can have a torque interface 688 on an end thereof disposed at the first end 676. The second end 680 can include an enlarged portion forming a handle. The torque interface 688 can include a hex head to engage a corresponding hex recess in the anchor member 104.

FIG. 13A illustrates the assembly of the baseplate inserter 600. The rotation guide 604 can be advanced over a portion of the elongate body 632 disposed adjacent to the first end 636 as indicated by the arrow B1. As discussed further below, the rotation guide 604 can include an access gap 724 to allow the elongate body 632 to be passed therethrough. The rotation guide 604 can be passed transversely to a longitudinal axis of the elongate body 632. The elongate body 632 can be passed in a direction transverse to a longitudinal axis of the elongate body 632 through the access gap 724. In one technique, the inner shell 616 can thereafter be advanced into the outer shell 612 as indicated by the arrow B2. The outer shell 612 can be moved over the first end 656 of the inner shell 616 opposite the direction of the arrow B2. As discussed further below, full advancement of the first end 656 as indicated by the arrow B2 can actuate the glenoid implant retention feature 644 from a release configuration to a retention configuration. The shell interface 664 can hold the first end 656 within the glenoid implant retention feature 644 to retain the baseplate 108 as discussed further below.

The inner shaft assembly 620 can be disposed in the lumen 662. If the inner shaft assembly 620 is fully advanced in the lumen 662 along the arrow B3 the torque interface 688 can be advanced out of the first end 656 of the inner shell 616. The torque interface 688 can engage the anchor member 104, the baseplate 108A or both the anchor member 104 and the baseplate 108A. In one embodiment the glenoid implant retention feature 644 can be actuated to a retention configuration to hold the baseplate 108A in place while allowing the inner shaft assembly 620 to freely rotate within the lumen 662 to allow the anchor member 104 to rotate relative to the baseplate 108A for embodiments in which the anchor member 104 can be threaded and can advance into the scapula medially of the glenoid cavity 601. Free relative rotation can allow full seating of the anchor member 104 and proper rotational orientation of the baseplates 108A, 108B as discussed below.

Figure 14:
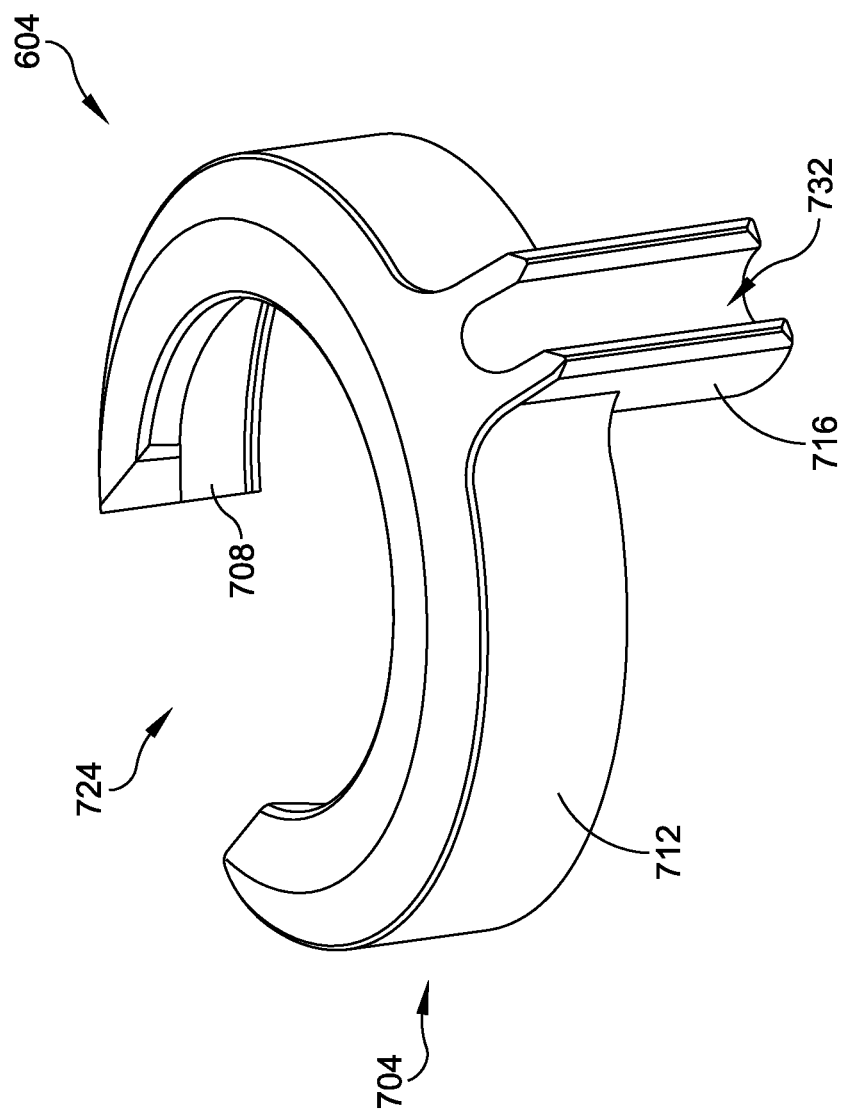
FIG. 14 is a perspective view of one embodiment of a rotation guide.
Figure 14A:
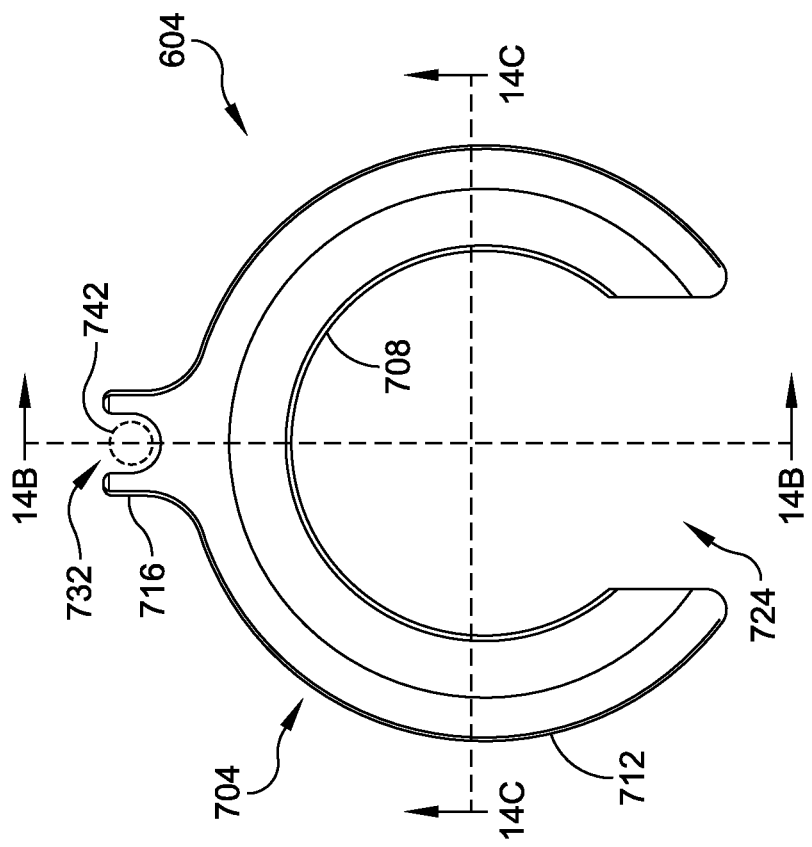
FIG. 14A is a top view of the rotation guide of FIG. 14.
Figure 14E:
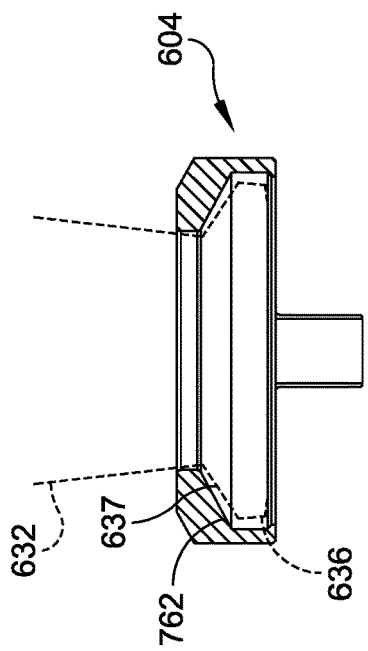
FIGS. 14D-14F shows steps of coupling the baseplate inserter of FIG. 13 to the rotation guide of FIG. 14.
Figure 14F:
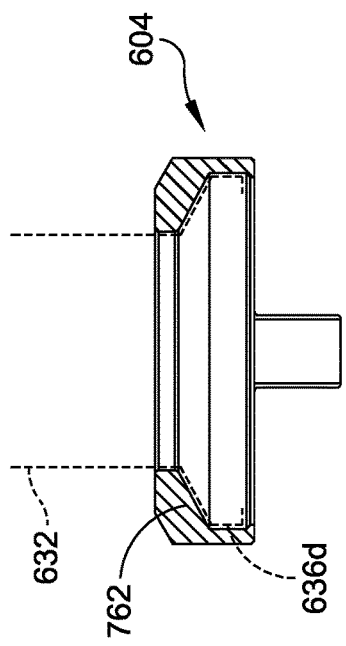
Figure 14D:
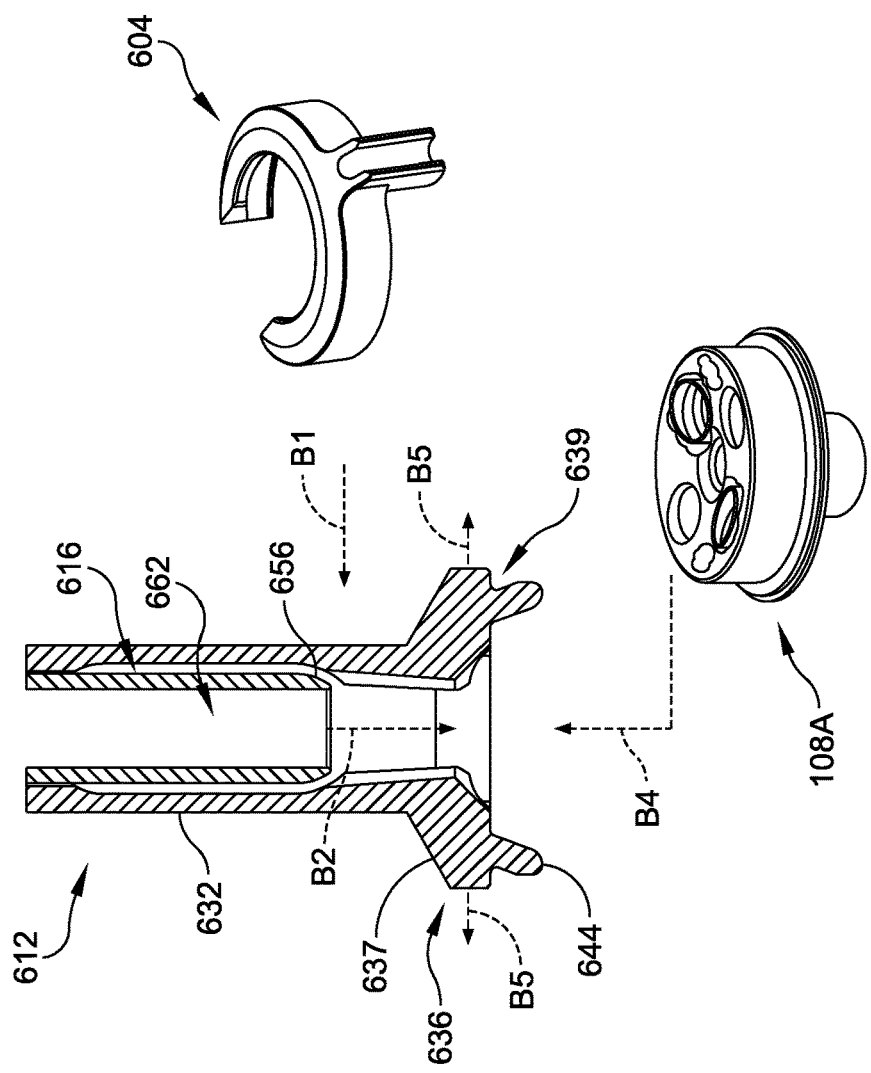

FIGS. 14-14F illustrate examples of the rotation guide 604 and use thereof. The rotation guide 604 can include a peripheral body 704. The peripheral body 704 can be disposed about a portion of the baseplate inserter 600, e.g., a distal portion of the elongate body 632 of the outer shell 612. The peripheral body 704 can have an access gap 724 that can allow access to a central space of the rotation guide 604. The peripheral body 704 can have an inner periphery 708 surrounding the central space. The peripheral body 704 can have an outer periphery 712 disposed around the inner periphery 708. The peripheral body 704 can extend between the inner periphery 708 and the outer periphery 712. The peripheral body 704 can extend from the inner periphery 708 to the outer periphery 712.

An orientation feature 716 can be disposed on the outer periphery 712. The orientation feature 716 can be configured to be aligned with a position corresponding to an augmented portion of the baseplate 108A. As discussed further below, the inner periphery 708 can be removably disposed about the first end 636 of the elongate body 632, e.g., about the glenoid implant retention feature 644. The inner periphery 708 can be intraoperatively disposed about the first end 636 of the elongate body 632, e.g., about the glenoid implant retention feature 644. When so disposed, the inner periphery 708 can engage the glenoid implant retention feature 644 when the glenoid implant retention feature is in the retention configuration. The inner periphery 708 can engaged an outer surface of the glenoid implant retention feature 644 while the prongs of the glenoid implant retention feature 644 secure the baseplate 108A. The inner periphery 708 may engage the first end 636 of the elongate body 632, e.g., in connection with an inserter that engages a baseplate without requiring any prong connection. If the orientation feature 716 is aligned with an augmented portion of the baseplate 108A or disposed at a preoperatively defined angular offset therefrom, the surgeon can more easily and more accurately control the rotational position of the augmented portion.

The orientation feature 716 can include an open channel 732 disposed on or facing away from the outer periphery 712 of the peripheral body 704. FIG. 14A shows that the open channel 732 can be configured to at least partially or completely receive a guide wire 742. The open channel 732 can have a depth, as measured in a radial direction (vertically on FIG. 14A) that is equal to or greater than a diameter of the guide wire 742. As such the guide wire 742 can be received in the open channel 732. The guide wire 742 can be surrounded by the orientation feature 716 other than in a radially outer-most position of the rotation guide 604, which can be open. The rotation guide 604 as viewed from a lateral side (as in FIG. 14A) can provide an open gun sight view in the medial direction. FIG. 14B shows that the orientation feature 716 can have a distal projection 736 configured to engage the guide wire 742. The distal projection 736 can extend below a medial side of the peripheral body 704. The open channel 732 can extend from a medial-lateral position within the thickness of the peripheral body 704 to a medial-lateral position disposed medial of a medial side of the peripheral body 704.

FIGS. 14B and 14C show additional features of the inner periphery 708 of the rotation guide 604. The inner periphery 708 can include a profile 710 configured to match an outer profile of the first end 636 of the elongate body 632, e.g., an outer profile adjacent to or of the glenoid implant retention feature 644 of the baseplate inserter 600. The profile 710 can surround an edge of the first end 636 adjacent of the elongate body 632, e.g., an edge adjacent to or of the glenoid implant retention feature 644. The inner periphery 708 can have a proximal face 758. In one embodiment the proximal face 758 includes a distal-facing conical surface 762. In one embodiment, the proximal face 758 includes a conical surface 762. The inner periphery 708 can include a distal portion 766 configured to restrain medial-lateral motion of the rotation guide 604. The distal portion 766 can include a lip 774 configured to be disposed over a distal edge of the first end 636 of the elongate body 632, e.g., a distal edge of a split ring of the glenoid implant retention feature 644. The profile 710 can have a cylindrical portion disposed between the lip 774 and the conical surface 762.

FIGS. 14D-14F show operation of the baseplate inserter 600 in greater detail. The inner shell 616 can be advanced within a lumen of the elongate body 632 of the outer shell 612 until the first end 656 of the inner shell 616 is adjacent to the first end 636 of the elongate body 632. The rotation guide 604 can be advanced over the elongate body 632, e.g., by passing the elongate body 632 through the access gap 724 (see arrow B1). The conical surface 762 of the profile 710 can rest on a conical surface 639 of the first end 636 of the elongate body 632. The lip 774 can rest under an underside 636 of the first end 636. The baseplate 108A can be advanced according to arrow B4 toward and onto the glenoid implant retention feature 644. FIG. 14D shows the baseplate inserter 600 in a release configuration. In this configuration, the prongs of the glenoid implant retention feature 644 can be moved by hand force in a direction opposite the arrow B5 due to the split ring configuration to allow the prongs to slide into corresponding recesses on the proximal face of the baseplate 108A. The prongs may be defected away from the inner periphery 708 of the rotation guide 604 on such movement.

After the baseplate 108A is held on the prongs of the glenoid implant retention feature 644, the rotation guide 604 can be moved into position. In a pre-operative plan, it may be determined that a guide pin is to be placed in the scapula, as shown in FIG. 13, at a 12 o'clock position and the augment portion of the baseplate 108A may be at a 3 o'clock position. Accordingly, the surgeon may move the peripheral body 704 relative to the augmented portion of the baseplate 108A such that the orientation feature 716 is at the 12 o'clock position when the augmented portion of the baseplate 108A is at the 3 o'clock position. Any other position may be provided according to the pre-operative plan. The rotation guide 604 allows any rotational position about the axis 120 that is needed for a particular patient according to the pre-operative plan.

After the pre-operatively determined relative rotational position is provided between the peripheral body 704 and the first end 636 of the elongate body 632 of the baseplate inserter 600, the inner shell 616 can be advanced according to the arrow B2 until the first end 656 is disposed in the first end 636, e.g., at or distal to the conical surface 637 within the first end 636, which is the first position of the inner shell 616. The distal movement of the first end 656 contacts a constricted inner space of the first end 636 causing motion according to the arrow B5. The inner shell 616 resists radially inward deflection and thus prevents the glenoid implant retention feature 644 from moving in the direction opposite the arrows B5 when the first end 656 is disposed in the first end 636. This provides a glenoid implant retention configuration of the baseplate inserter 600.

FIGS. 14E and 14F illustrate this mechanism in further detail. The elongate body 632 is shown schematically with the conical surface 637 spaced away from the conical surface 762 of the profile 710. This configuration corresponds to the release configuration in which opposite sides of the first end 636 can move toward each other. FIG. 14F shows the elongate body 632 actuated such that the first end 636 and in particular the conical surface 637 is urged outward into contact with the conical surface 762 of the peripheral body 704. Outward movement of the conical surface 637 can be by any configuration, including the movement of the inner shell 616 downward into the distal area of the outer shell 612. FIG. 14F illustrates a retention configuration of the baseplate inserter 600.

Figure 15:
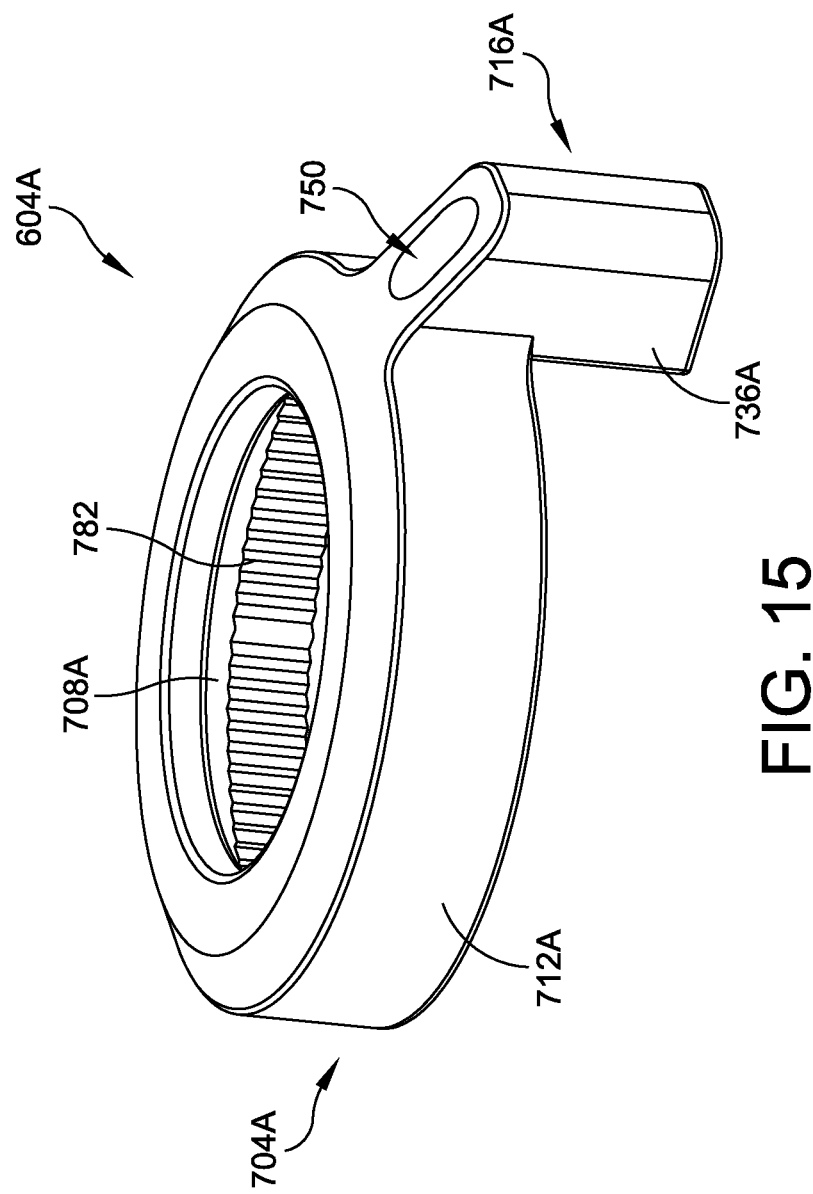
FIG. 15 is a perspective view of another embodiment of a rotation guide.
Figure 16B:
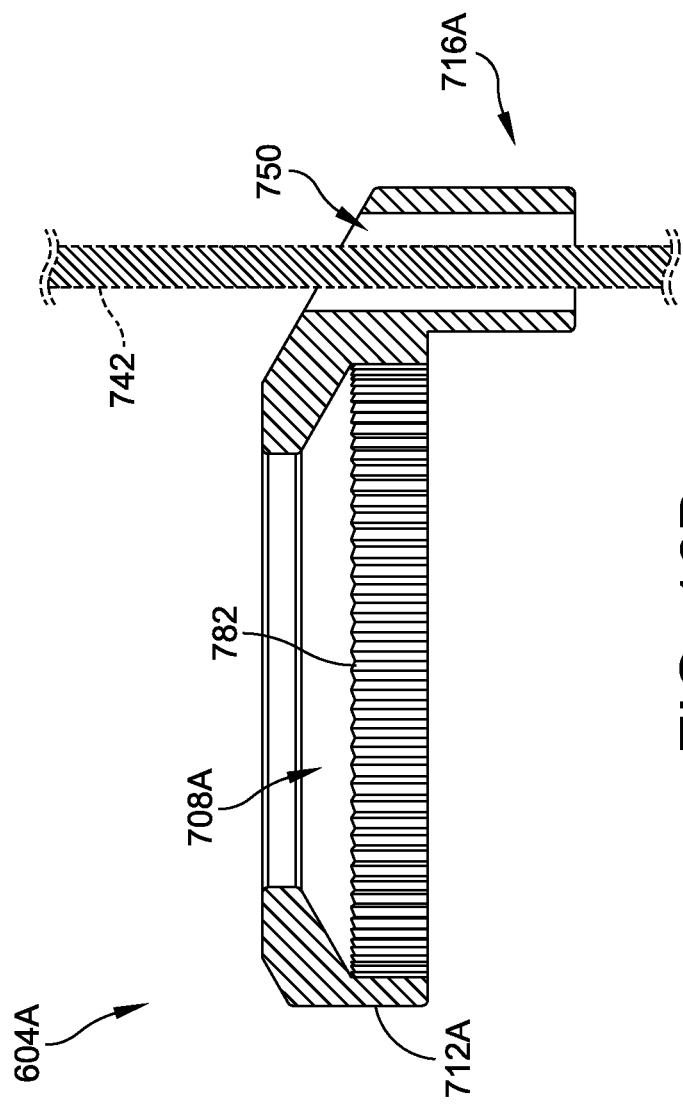
FIG. 16B is a cross-sectional view of the rotation guide of FIG. 16A taken at the section plane 16A-16A.

FIGS. 15-16B show a rotation guide 604A that is similar to the rotation guide 604 except as described differently below. The rotation guide 604A includes a peripheral body 704A that is provided between and an inner periphery 708A and an outer periphery 712A. The peripheral body 704A can be continuous, e.g., lacking an access gap in outer periphery 712A or the inner periphery 708A. A central opening is configured to be advanced over a proximal end or a distal end of the elongate body 632 of the baseplate inserter 600. The rotation guide 604A can be assembled over the second end 640 of the elongate body 632 along the arrow B2 before the inner shell 616 is advanced along the arrow B2. The central opening within the peripheral body 704A can have a diameter or transverse dimension larger than the proximal portion of the elongate body 632.

The rotation guide 604A includes an orientation feature 716A that includes a distal projection 736A. The distal projection 736A is similar to the distal projection 736 except as set forth below. The distal projection 736A includes an enclosed aperture 750. The enclosed aperture 750 is similar to the open channel 732 in that the enclosed aperture is adapted to receive the guide wire 742 as shown in FIG. 16A. The guide wire 742 is fully enclosed in the radial direction by enclosed aperture 750. The open channel 732 is advantageous in that the rotation guide 604 can be side loaded on the guide wire 742. The enclosed aperture 750 is advantageous in that the guide wire 742 is retained within the enclosed aperture 750 upon advancing the rotation guide 604A over the guide wire 742 or by advancing the guide wire 742 through the enclosed aperture 750.

The inner periphery 708A of the rotation guide 604A also includes serrations 782 configured to engage an outer surface of the first end 636 of the elongate body 632 adjacent to the glenoid implant retention feature 644. The serrations 782 can engage and grip an external periphery of the first end 636 adjacent to the retention feature 644. The serrations 782 can grip the external periphery at any rotational position of the rotation guide 604A relative to the external surface of the baseplate inserter 600 adjacent to the glenoid implant retention feature 644. FIG. 16B shows that the serrations 782 can extend to a medial end of the inner periphery 708A of the rotation guide 604A. A conical surface inside surface of the rotation guide 604A can engage the conical surface 637 of the baseplate inserter 600.

Figure 17:
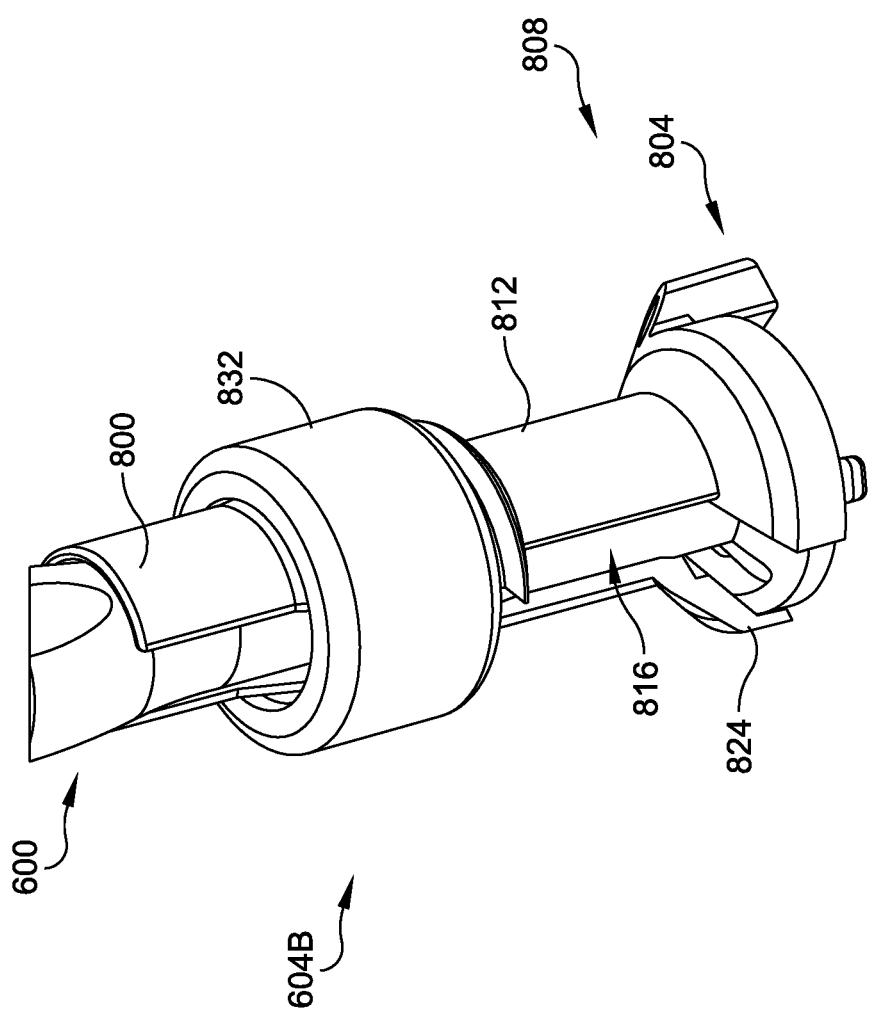
FIG. 17 is a perspective view of a baseplate inserter with another embodiment of a rotation guide.

FIGS. 17-17B show another embodiment in which a rotation guide 604B is provided that engages or grips the baseplate inserter 600 in a different manner. The rotation guide 604B comprises a slotted guide body 800 and a clamping ring 832. The slotted guide body 800 includes an alignment foot 804 and an alignment guide body 808. The alignment foot 804 is an example of an orientation feature. The alignment guide body 808 includes a sleeve 812 having a slot 816 formed there along. The slot 816 extends from a peripheral body 824 to a lateral end of the alignment guide body 808. The slot 816 allows the alignment guide body 808 to expand about the baseplate inserter 600 to allow the inserter to be fitted therein. In some variations, the rotation guide 604B is advanced over the second end 640 of the elongate body 632 and need not allow expansion of the slot 816 to allow insertion of the elongate body 632 therethrough. The peripheral body 824 has an inner periphery that can be similar to the inner periphery 708 and can have a profile similar to the profile 710. The sleeve 812 of the alignment guide body 808 can include a collet portion 820 that is disposed proximally of the peripheral body 824. The collet portion 820 of the sleeve 812 can be configured to engage an outer surface of the elongate body 632 away from the first end 636, e.g., away from the glenoid implant retention feature 644.

FIG. 17A shows the rotation guide 604B fitted about the baseplate inserter 600. The alignment guide body 808 can be fitted about the baseplate inserter 600 by advancing the elongate body 632 through the slot 816. The alignment guide body 808 can be fitted about the baseplate inserter 600 by advancing the alignment guide body 808 over the second end 640 of the elongate body 632 along the arrow B2 before inserting the inner shell 616 into the outer shell 612. Thereafter the peripheral body 824 can be advanced over and onto the first end 636 of the elongate body 632, e.g., over the slotted ring of the glenoid implant retention feature 644. An inner periphery of the peripheral body 824 can be disposed about the first end 636 as shown. The peripheral body 824 can be disposed close to and radially outward of an outer surface of the first end 636 of the elongate body 632. The peripheral body 824 can have a profile that includes a conical surface and a cylindrical surface. The conical surface can come to rest on the conical surface 637 of the first end 636. The cylindrical surface can be disposed radially outward of a cylindrical surface of the first end 636. In one modified embodiment, the peripheral body 824 can include a lip as in the rotation guide 604.

The clamping ring 832 can be engaged with the alignment guide body 808 to secure the rotation guide 604B to the baseplate inserter 600. The alignment guide body 808 can extend from the peripheral body 824 proximally to a proximal end (sometimes referred to as a lateral end) of the slotted guide body 800. The alignment guide body 808 can include a collet portion 820 and a threaded outer surface 840 disposed on the sleeve 812. The threaded outer surface 840 can be configured to engage a clamping ring 848. The clamping ring 832 can include inner threads 836 configured to engage the threaded outer surface 840. The clamping ring 832 can include a tapered surface 848 and the collet portion 820 of the sleeve 812 can include a corresponding tapered surface. Advancing the clamping ring 832 along the tapered surface of the collet portion 820 of the sleeve 812 creates frictional engagement between an inner surface of the collet portion 820 of the sleeve 812 and the elongate body 632 of the baseplate inserter 600. In particular the tapered surface 848 can urge the sleeve 812 into contact with and enhance normal force against the elongate body 632. The clamping ring 832 can be advanced by engaging the inner threads 836 of the clamping ring 832 with the threaded outer surface 840 disposed on the sleeve 812. The collet portion 820 is disposed proximally of the threaded interface. In a modified embodiment, the collet portion 820 is disposed distally of the threaded interface. In this modified embodiment, the clamping ring 832 includes a taper portion disposed distally of the inner threads 836.

FIGS. 17A-17B show that the rotation guide 604B can be configured to be advanced over the guide wire 742 to control the position of the baseplate inserter 600 as the baseplate 108A is advanced toward the scapula. The alignment foot 804 can be structured similar to the orientation feature 716A, e.g., projecting beyond the medial side of the peripheral body 824. The alignment foot 804 can have an enclosed aperture 750. The enclosed aperture 750 can allow the guide wire 742 to slide therein such that the rotation guide 604B can be advanced toward the scapula along the guide wire 742. The guide wire 742 thus controls one or more, e.g., three degrees of freedom of the rotation guide 604B, the baseplate inserter 600 and the baseplate 108A coupled therewith. The guide wire 742 can control translation in at least two directions transverse thereto and can control direction of movement there along, e.g., can limit movement of the baseplate 108,108A, 108B, to a direction along or parallel to a longitudinal axis of the guide wire 742. This control prevent rotation of the plate about the axis 120 to an orientation that would cause the augmented portion to be misaligned from the pre-operative plan.

Terminology

Although certain embodiments have been described herein with respect to an anatomic component or a reverse component, the implants and methods described herein can interchangeably use any articular component, including the anatomic and reverse components described herein, as the context may dictate.

As used herein, the relative terms "proximal" and "distal" shall be defined from the perspective of the implant. Thus, proximal refers to the direction of the articular component and distal refers to the direction of the base plate when the implant is assembled.

Note that the terms "first" and "second" articular components can be used interchangeably and to refer to the anatomic components or the reverse components. Accordingly, the "first" and "second" openings can be used interchangeably and to refer to any one of the openings in the baseplate.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, the terms "approximately," "about," and "substantially" may refer to an amount that is within less than 10% of the stated amount, as the context may dictate. As an example, in certain embodiments, the term "generally perpendicular" refers to a value, amount, or characteristic that departs from exactly perpendicular by less than about 10 degrees.

Although certain embodiments and examples have been described herein, it will be understood by those skilled in the art that many aspects of the glenoid implants shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Any methods disclosed herein need not be performed in the order recited. The methods disclosed herein include certain actions taken by a practitioner; however, they can also include any third-party instruction of those actions, either expressly or by implication. For example, actions such as "inserting a base plate into a glenoid cavity" include "instructing insertion of a base plate into a glenoid cavity."

What is claimed is:

1. An instrument for implanting a glenoid baseplate, comprising:
   a first end, a second end, and an elongate body disposed therebetween;
   a glenoid implant retention feature disposed at or adjacent to the first end, the glenoid implant retention feature comprising a release configuration for disengaging a glenoid baseplate and a retention configuration for engaging and retaining a glenoid baseplate;
   a rotation guide configured to be disposed at or adjacent to the first end, the rotation guide comprising a peripheral body comprising:
     an inner periphery;
     an outer periphery; and
     an orientation feature disposed adjacent to or on the outer periphery, the orientation feature configured to be aligned with a position corresponding to an augmented portion of a glenoid baseplate;
   wherein the inner periphery is configured to be disposed around the glenoid implant retention feature when the glenoid implant retention feature is in the retention configuration.

2. The instrument of claim 1, wherein the glenoid implant retention feature defines an access gap that extends from the outer periphery to the inner periphery, the access gap sized and configured to allow the elongate body to be passed therethrough when the rotation guide is moved transversely to a longitudinal axis of the elongate body.

3. The instrument of claim 1, wherein the orientation feature comprises an open channel disposed on the outer periphery.

4. The instrument of claim 1, wherein the orientation feature comprises a distal projection configured to engage a guide wire.

5. The instrument of claim 4, wherein the distal projection comprises an open channel facing away from the peripheral body.

6. The instrument of claim 4, wherein the distal projection comprises an enclosed aperture.

7. The instrument of claim 1, wherein the inner periphery is configured to be slidable over the glenoid implant retention feature when the glenoid implant retention feature is in the release configuration and to be secured to the glenoid implant retention feature when the glenoid implant retention feature is in the retention configuration.

8. The instrument of claim 1, wherein the inner periphery of the rotation guide comprises a profile configured to match an outer profile of the glenoid implant retention feature.

9. The instrument of claim 1, wherein a proximal face of the inner periphery comprises a distal-facing conical surface.

10. The instrument of claim 1, wherein a distal portion of the inner periphery comprises a lip configured to be disposed over a distal edge of the glenoid implant retention feature.

11. The instrument of claim 1, wherein the inner periphery of the rotation guide comprises serrations configured to engage an outer surface of the glenoid implant retention feature.

12. The instrument of claim 1, wherein the inner periphery of the rotation guide comprises a continuous periphery.

13. The instrument of claim 1, wherein the inner periphery is configured to be positioned at any position over a continuous range of positions over the glenoid implant retention feature.

14. The instrument of claim 1, wherein the rotation guide comprises a sleeve that comprises a collet portion that is disposed proximally of the peripheral body, the collet portion of the sleeve configured to engage an outer surface of the elongate body away from the glenoid implant retention feature.

15. The instrument of claim 14, further comprising a clamping ring comprising inner threads, wherein the sleeve further comprises outer threads configured to engage the clamping ring and the collet portion comprises an outer tapered surface, wherein advancing the clamping ring along the outer tapered surface creates frictional engagement between an inner surface of the collet portion of the sleeve and the elongate body of the instrument.

16. The instrument of claim 15, wherein the inner threads of the clamping ring are configured to engage the outer threads as the clamping ring is advanced by engagement of the inner threads and the outer threads to create enhanced force of the collet portion of the sleeve against an outer surface of the elongate body.

17. An instrument for implanting a glenoid baseplate, comprising:
   a first end, a second end, and an elongate body disposed therebetween;
   an expandable glenoid implant retention feature disposed at or adjacent to the first end, the expandable glenoid implant retention feature comprising an expandable retention end portion for expanding into engagement with a glenoid baseplate in an expanded state;
   a rotation guide configured to be disposed adjacent to the expandable glenoid implant retention feature, the rotation guide comprising a peripheral body comprising:
     an inner surface;
     an outer surface; and
     an orientation feature disposed adjacent to or on the outer surface;
   wherein the inner surface is configured to restrain rotation of the rotation guide about the glenoid implant retention feature when the glenoid implant retention feature is expanded.

18. The instrument of claim 17, further comprising a lip disposed at a distal portion of the rotation guide to restrain proximal-distal motion of the rotation guide relative to the glenoid implant retention feature.

19. The instrument of claim 17, wherein the rotation guide is configured to be disposed around an outer surface of the elongate body such that the inner surface of the rotation guide contacts an outer surface of the elongate body.

20. The instrument of claim 17, wherein the orientation feature defines at least one of an aperture and a channel and having an aperture having an axis that is parallel to a longitudinal axis of the elongate body.

* * * * *